(12) United States Patent
Kinzer

(10) Patent No.: US 11,369,937 B2
(45) Date of Patent: Jun. 28, 2022

(54) ELECTROMAGNETIC REACTOR

(71) Applicant: Dwight Eric Kinzer, Sedgwick, KS (US)

(72) Inventor: Dwight Eric Kinzer, Sedgwick, KS (US)

( * ) Notice: Subject to any disclaimer, the term of this patent is extended or adjusted under 35 U.S.C. 154(b) by 37 days.

(21) Appl. No.: 16/786,999

(22) Filed: Feb. 10, 2020

(65) Prior Publication Data

US 2020/0254420 A1    Aug. 13, 2020

Related U.S. Application Data

(60) Provisional application No. 62/803,588, filed on Feb. 10, 2019.

(51) Int. Cl.
*B01J 19/08* (2006.01)
*H01Q 1/26* (2006.01)

(52) U.S. Cl.
CPC .............. *B01J 19/087* (2013.01); *H01Q 1/26* (2013.01)

(58) Field of Classification Search
CPC ........ B01J 19/087; B01J 19/08; B01J 19/088; B01J 19/126; B01J 2219/1227; H01Q 1/26; H01Q 1/366; H01Q 1/428; H01Q 15/246; H01Q 1/42; H01Q 1/528; H01Q 1/36; H05H 1/0062; H05H 1/18; H05H 1/30; H05H 1/461; H05B 6/62; H05B 6/50; H05B 2214/03; H05B 6/782; H05B 2206/046; H05B 2206/045; H05B 6/78; H05B 6/6402; H05B 6/704; H05B 6/72; H05B 6/707; H05B 6/705; H05B 2206/044; H05B 6/808; H05B 6/686; E21B 43/2401; F26B 3/347; F26B 17/20; A61L 2/08; A61L 11/00; B09B 3/00; B09B 3/0091; B09C 1/06; A62D 2203/10; G01R 21/002;
(Continued)

(56) References Cited

U.S. PATENT DOCUMENTS 2,428,090 A    9/1947  Naeher et al.
3,474,209 A   10/1969  Parker
(Continued)

FOREIGN PATENT DOCUMENTS

GB             1379116          2/1975
WO  PCT/SE2000/000367          9/2000
WO     WO 2001/54519            8/2001

*Primary Examiner* — Xiuyu Tai
(74) *Attorney, Agent, or Firm* — Schmeiser, Olsen & Watts, LLP

(57) ABSTRACT

An apparatus for exposing a bulk volume of particles, such as free-flowing or semi-flowable grains, ore, or powders, or a non-flowing mass such as sewage or wet-chopped biomass so all of the particles receive near-uniform exposure to a radio frequency (RF) electric and/or magnet (EM) field, preferably without any preference of exposure to a surface or side of particulate. The invention relates to an antenna that can be metallic or plasma for transmitting RF EM radiation into a mechanical mechanism used to convey, or preferably to mix a bulk volume of particles. Embodiments of the apparatus include the ability to adjust the level of EM radiation comprised of one or more frequencies between 30 Hz and 30 EHz to regulate either or both the magnitude of temperature rise and the rate of temperature rise, or to regulate either or both the magnitude of chemical reaction, or rate of reaction.

20 Claims, 34 Drawing Sheets

(58) Field of Classification Search
CPC ..... Y02B 40/00; Y02B 40/143; C23C 16/511; H01J 37/32192; H01J 37/3222; H01J 2237/3321
See application file for complete search history.

(56) References Cited

U.S. PATENT DOCUMENTS

| | | | |
|---|---|---|---|
| 3,701,670 A | 10/1972 | Pierce | |
| 4,296,298 A | 10/1981 | MacMaster et al. | |
| 4,546,226 A | 10/1985 | Trembly et al. | |
| 4,631,380 A | 12/1986 | Tran | |
| 4,882,851 A | 11/1989 | Wennerstrum et al. | |
| 5,024,145 A | 6/1991 | Bailey et al. | |
| 5,174,864 A | 12/1992 | Arbizzani et al. | |
| 5,392,698 A | 2/1995 | Sprecher et al. | |
| 5,400,524 A | 3/1995 | Leconte et al. | |
| 5,487,873 A | 1/1996 | Bridges et al. | |
| 6,118,407 A | 9/2000 | Anderson | |
| 6,303,166 B1 | 10/2001 | Kolbe et al. | |
| 6,657,173 B2 | 12/2003 | Flugstand et al. | |
| 6,784,405 B2 | 8/2004 | Flugstand et al. | |
| 6,914,226 B2 | 7/2005 | Ottaway | |
| 7,091,460 B2 | 8/2006 | Kinzer | |
| 7,292,191 B2 | 11/2007 | Anderson | |
| 7,453,403 B2 | 11/2008 | Anderson | |
| 8,561,314 B2 | 10/2013 | Kruger | |
| 2005/0199386 A1* | 9/2005 | Kinzer | H05B 6/62 166/248 |
| 2007/0215613 A1* | 9/2007 | Kinzer | E21B 43/2401 219/764 |
| 2008/0207979 A1* | 8/2008 | Parosa | B09B 3/0066 588/310 |
| 2011/0314730 A1* | 12/2011 | Gomez | F23K 1/04 44/620 |
| 2014/0027445 A1 | 1/2014 | Scheurs et al. | |
| 2017/0084988 A1* | 3/2017 | Lavin | H01Q 1/428 |
| 2019/0140342 A1* | 5/2019 | Lim | H01Q 1/42 |

\* cited by examiner

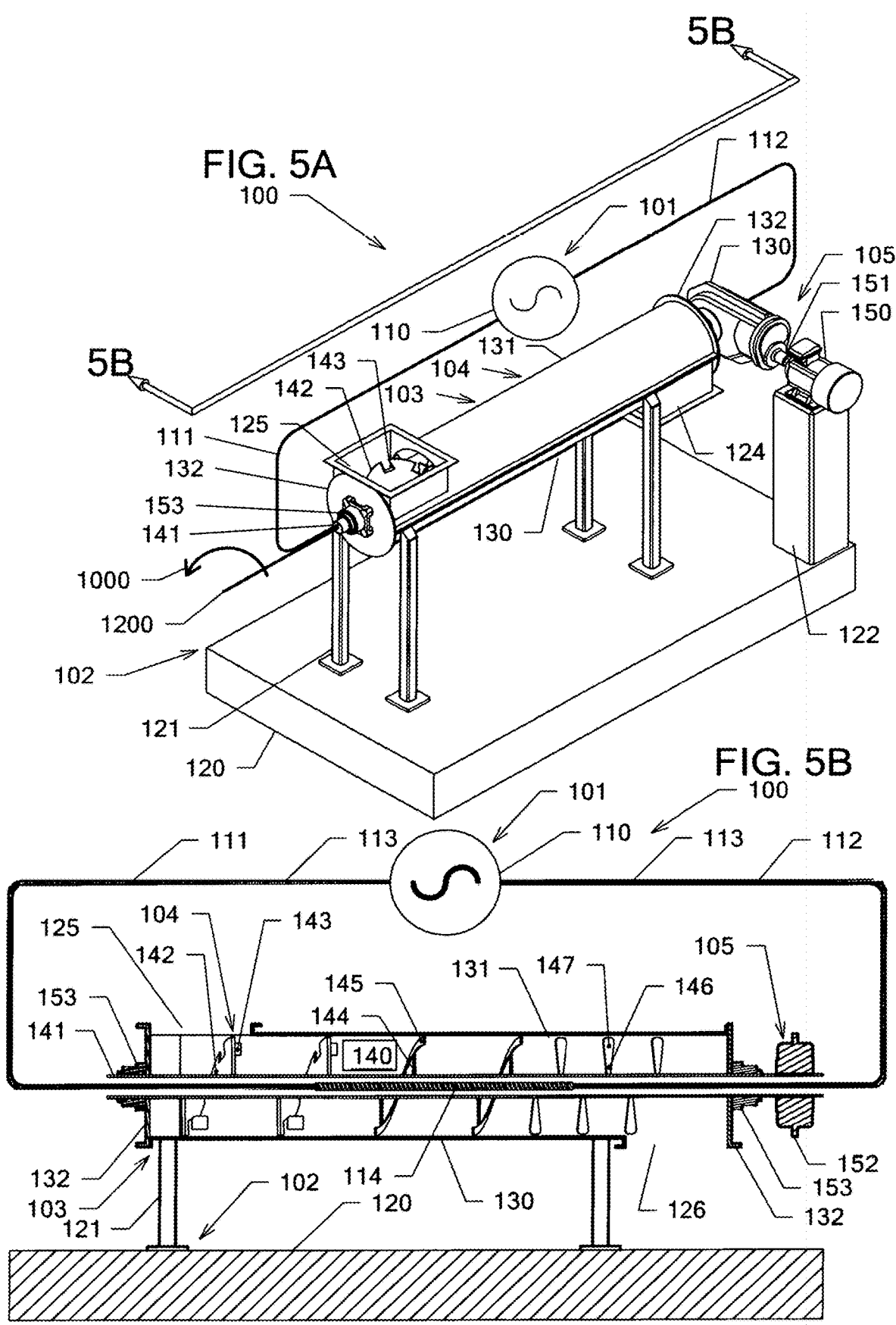

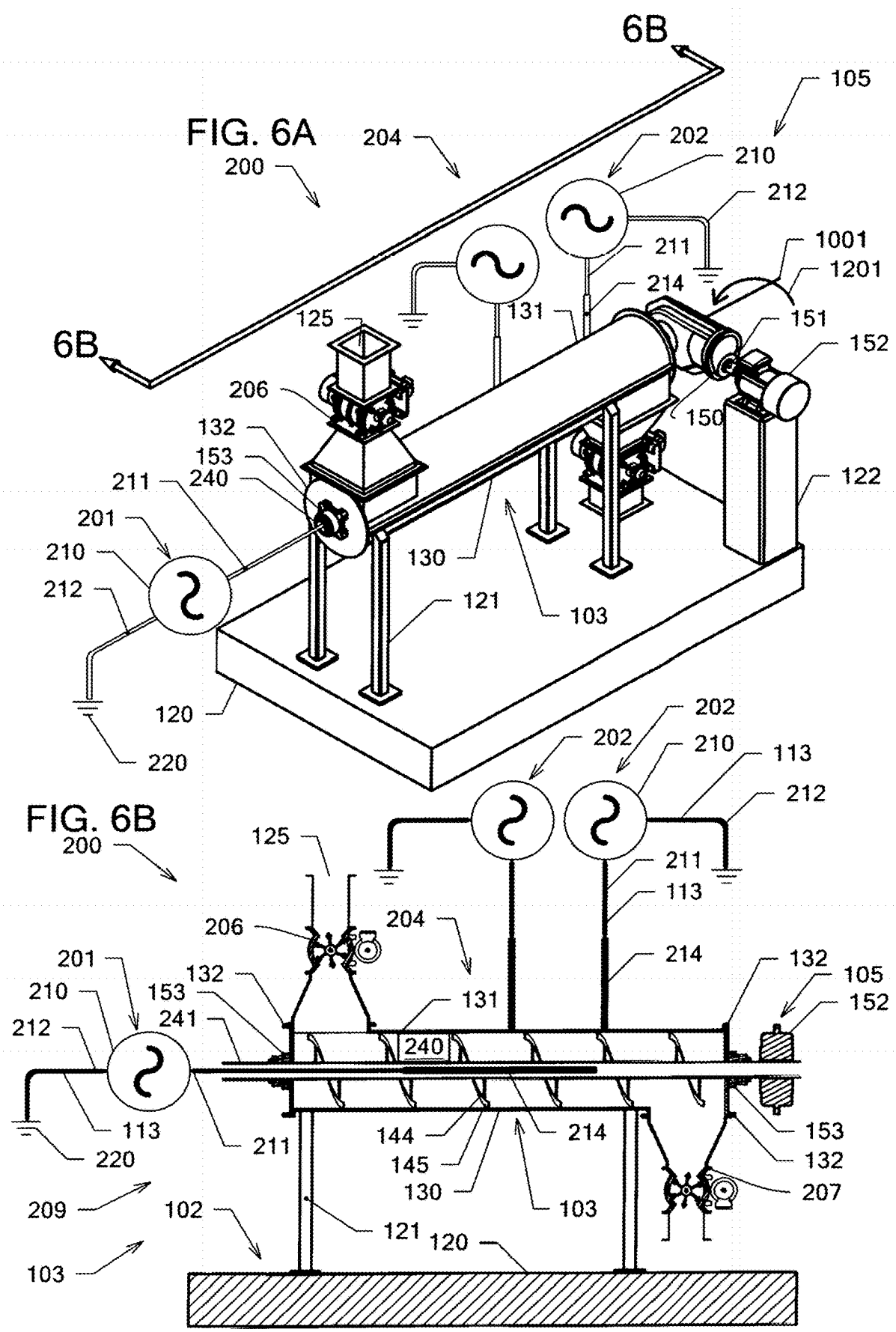

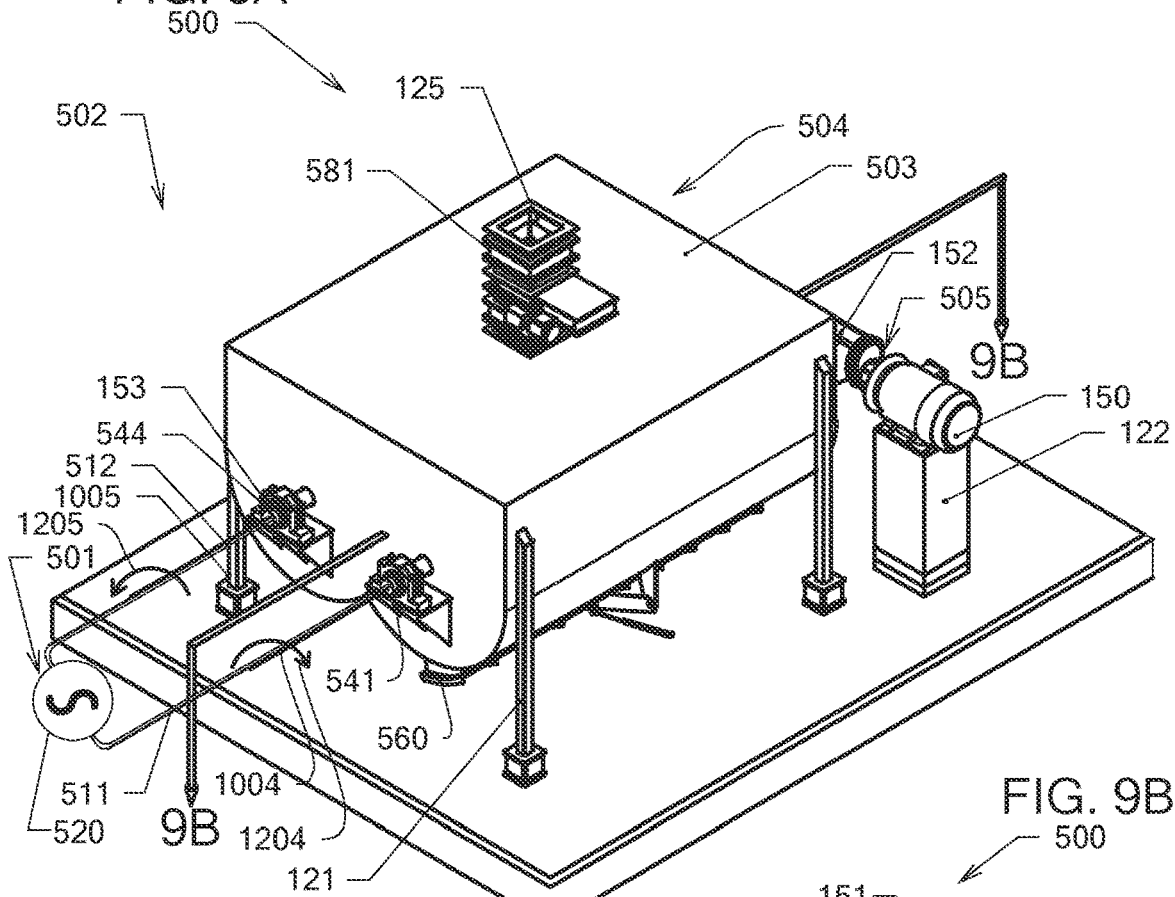
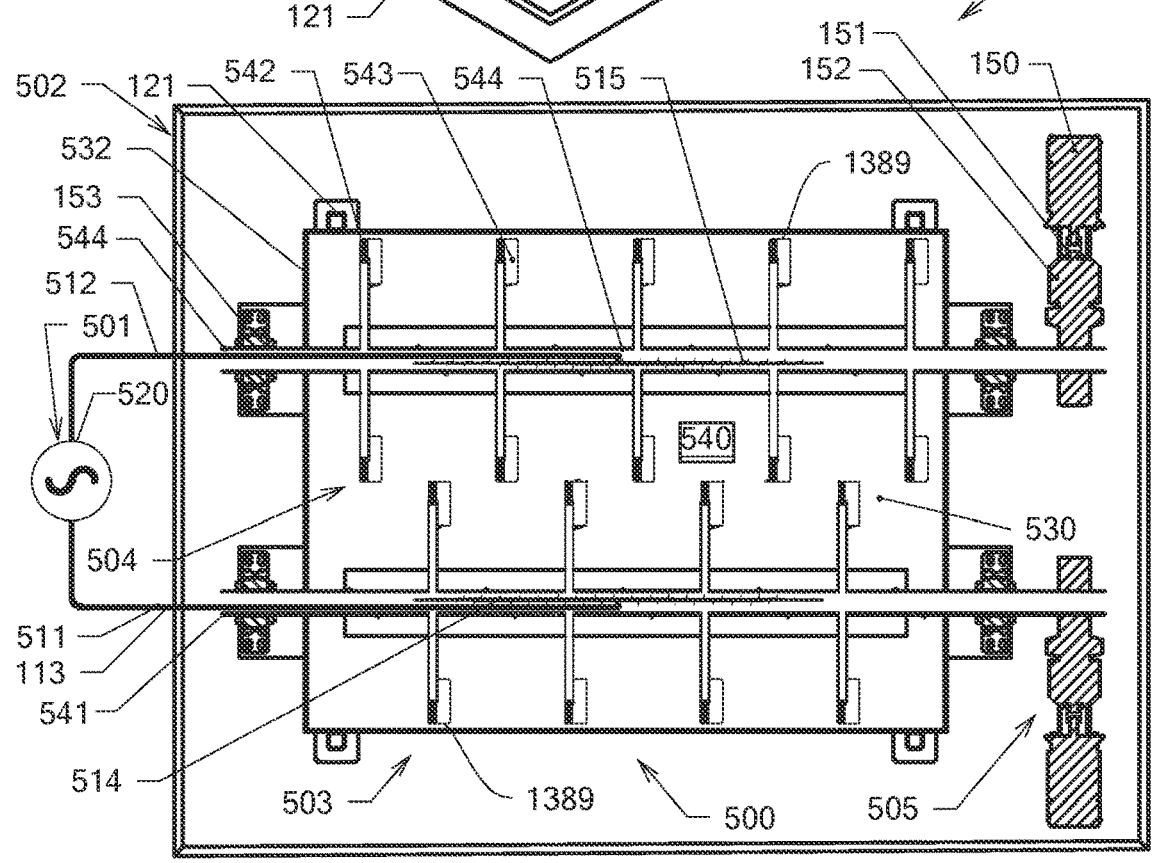

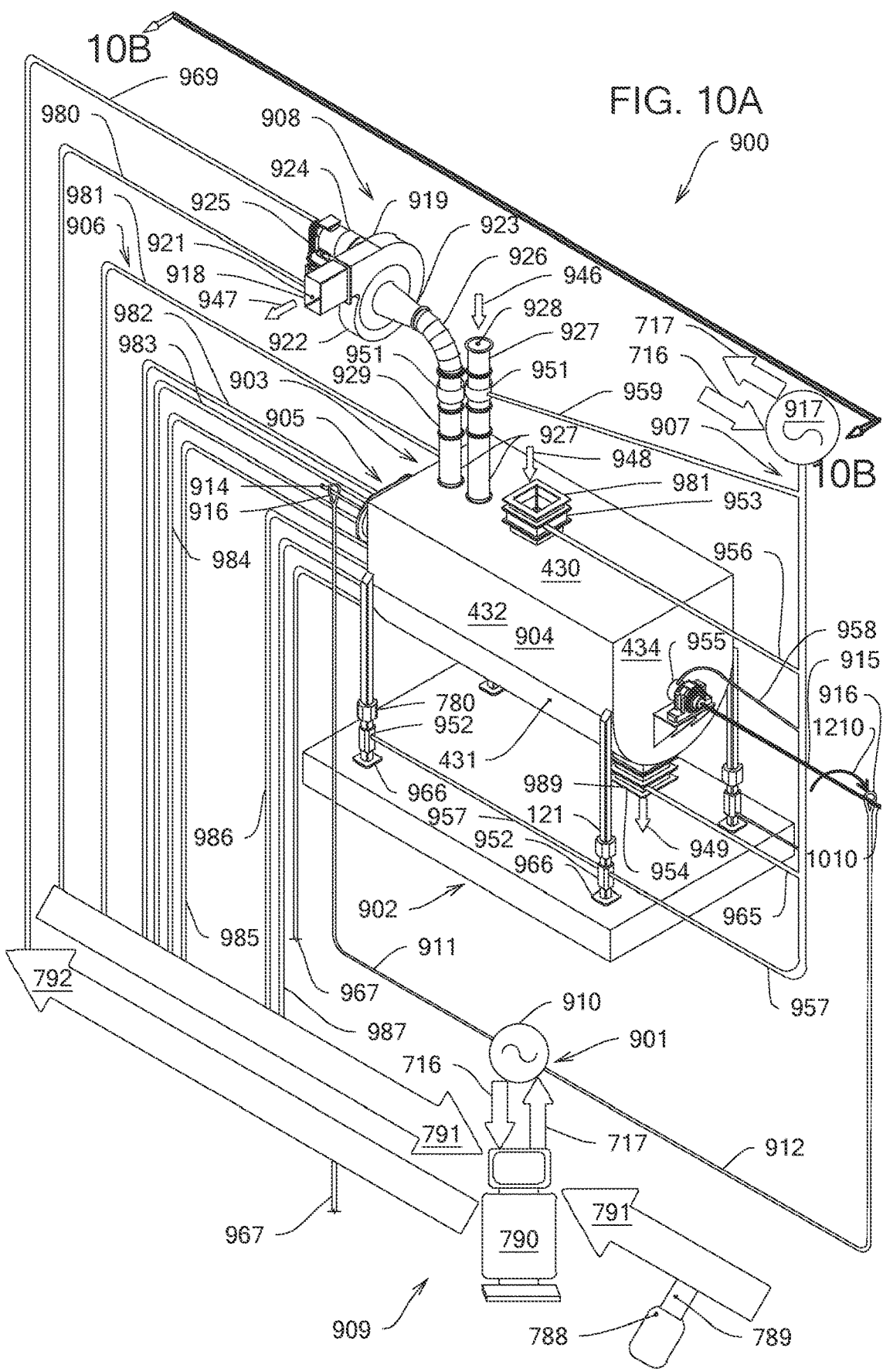

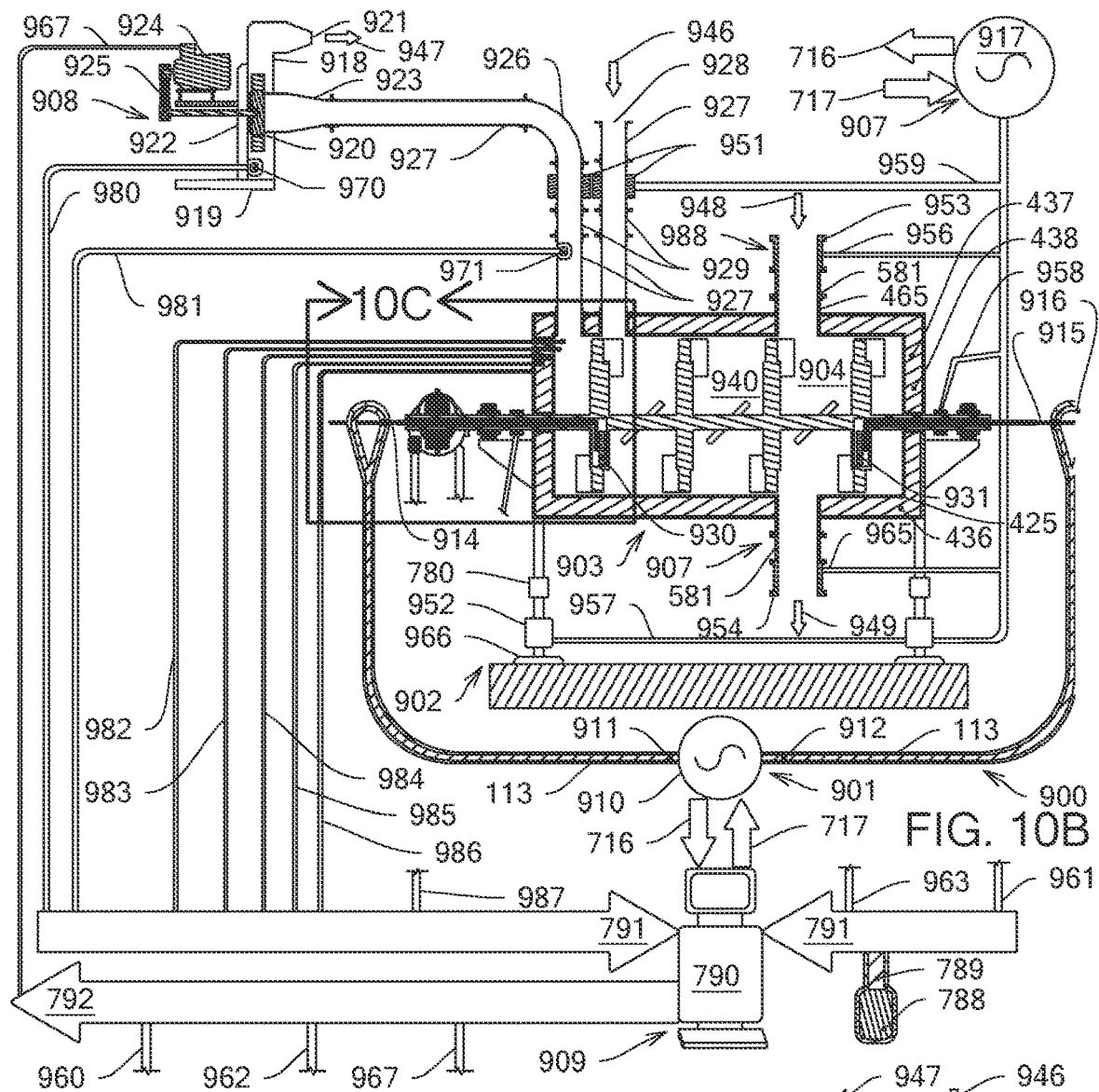
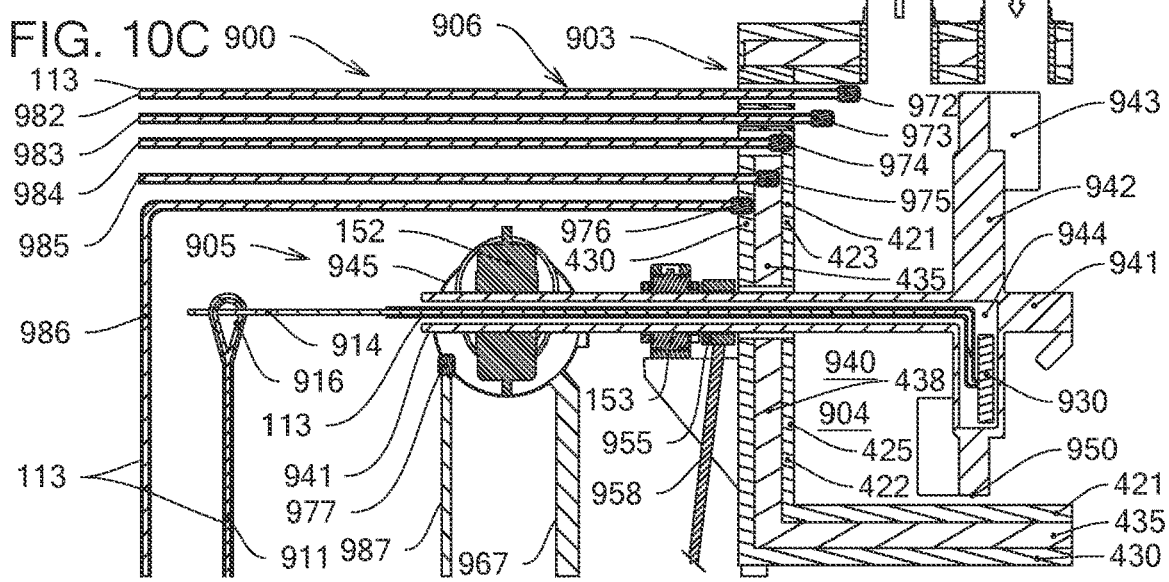

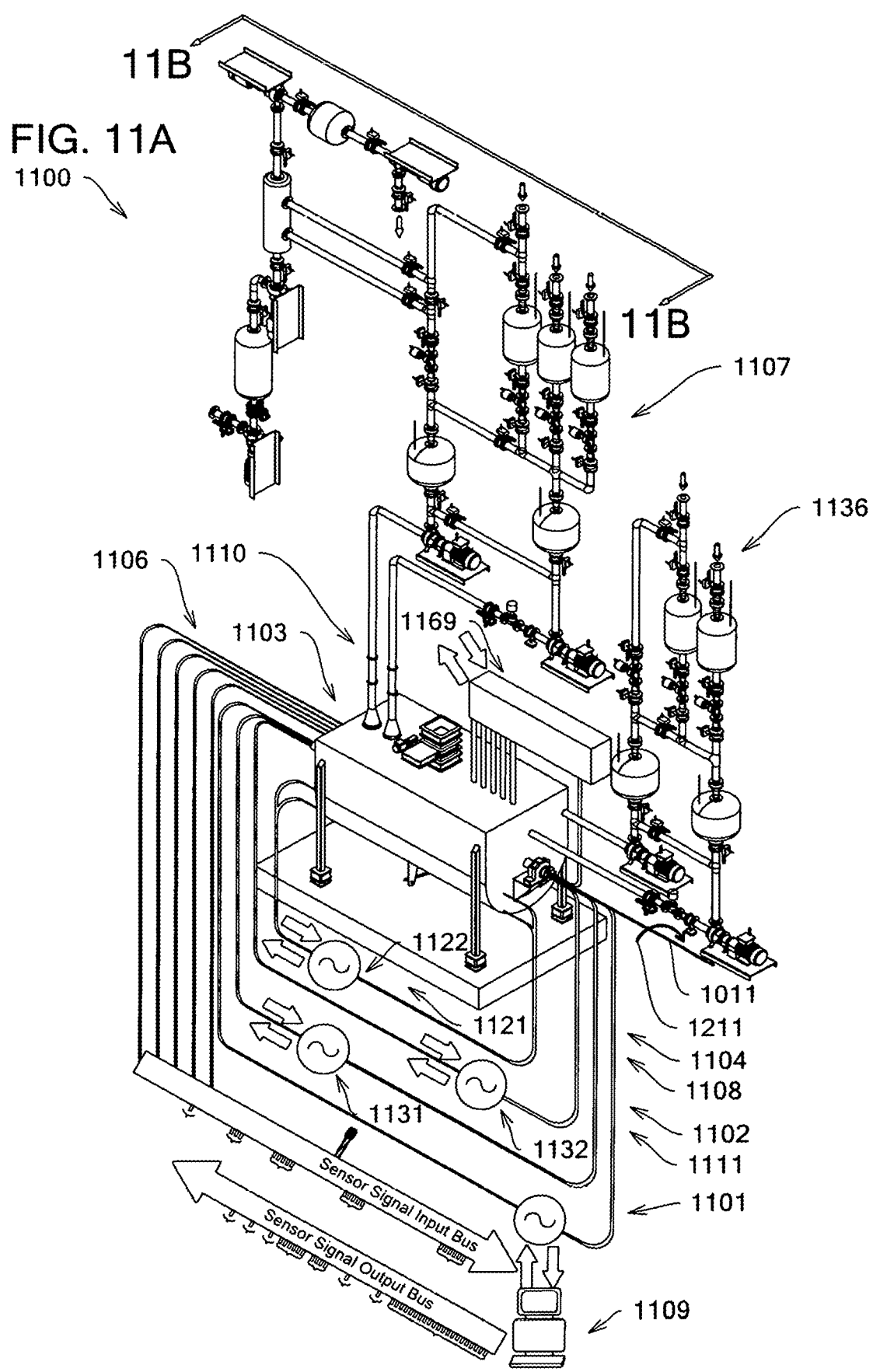

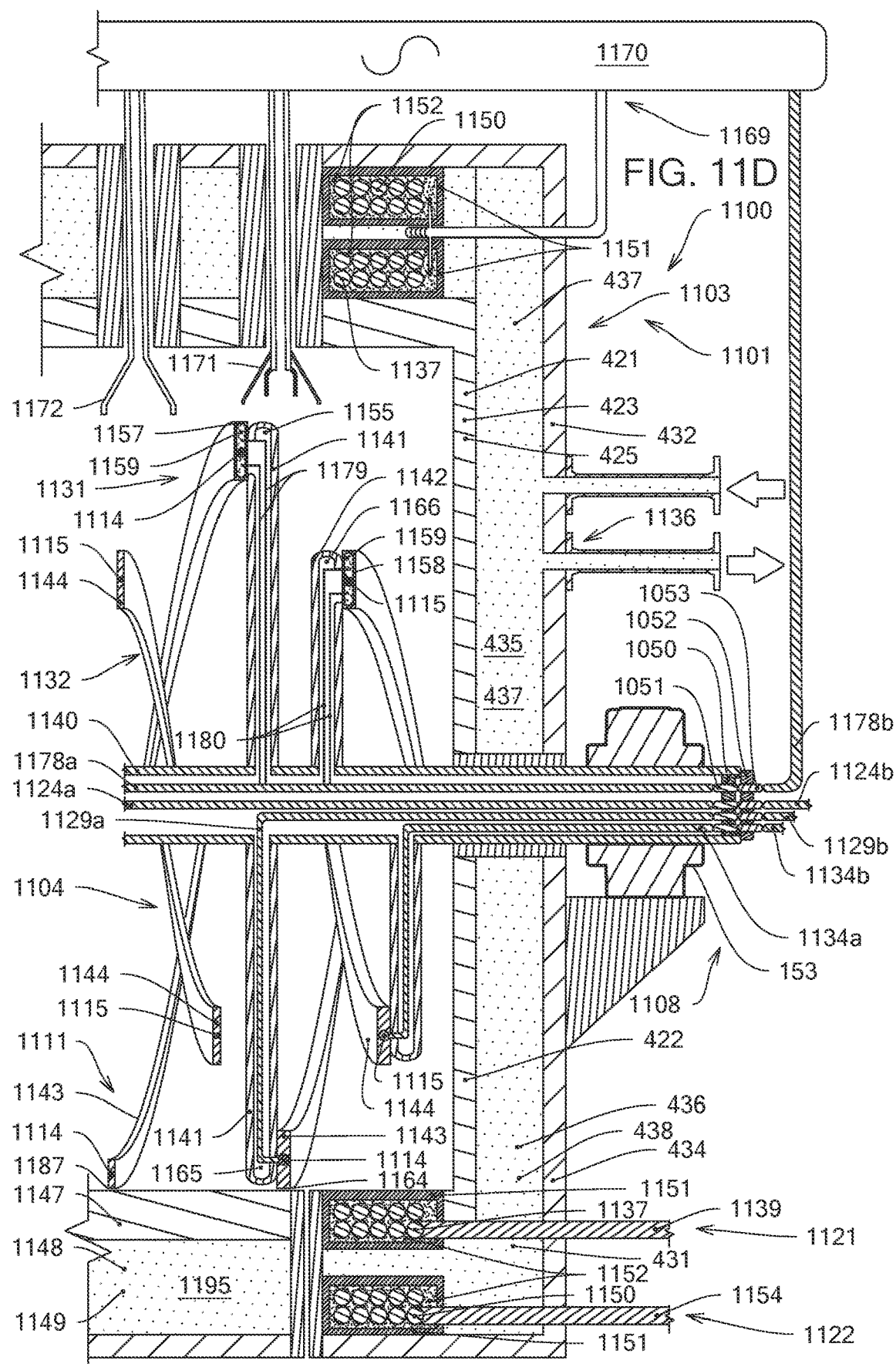

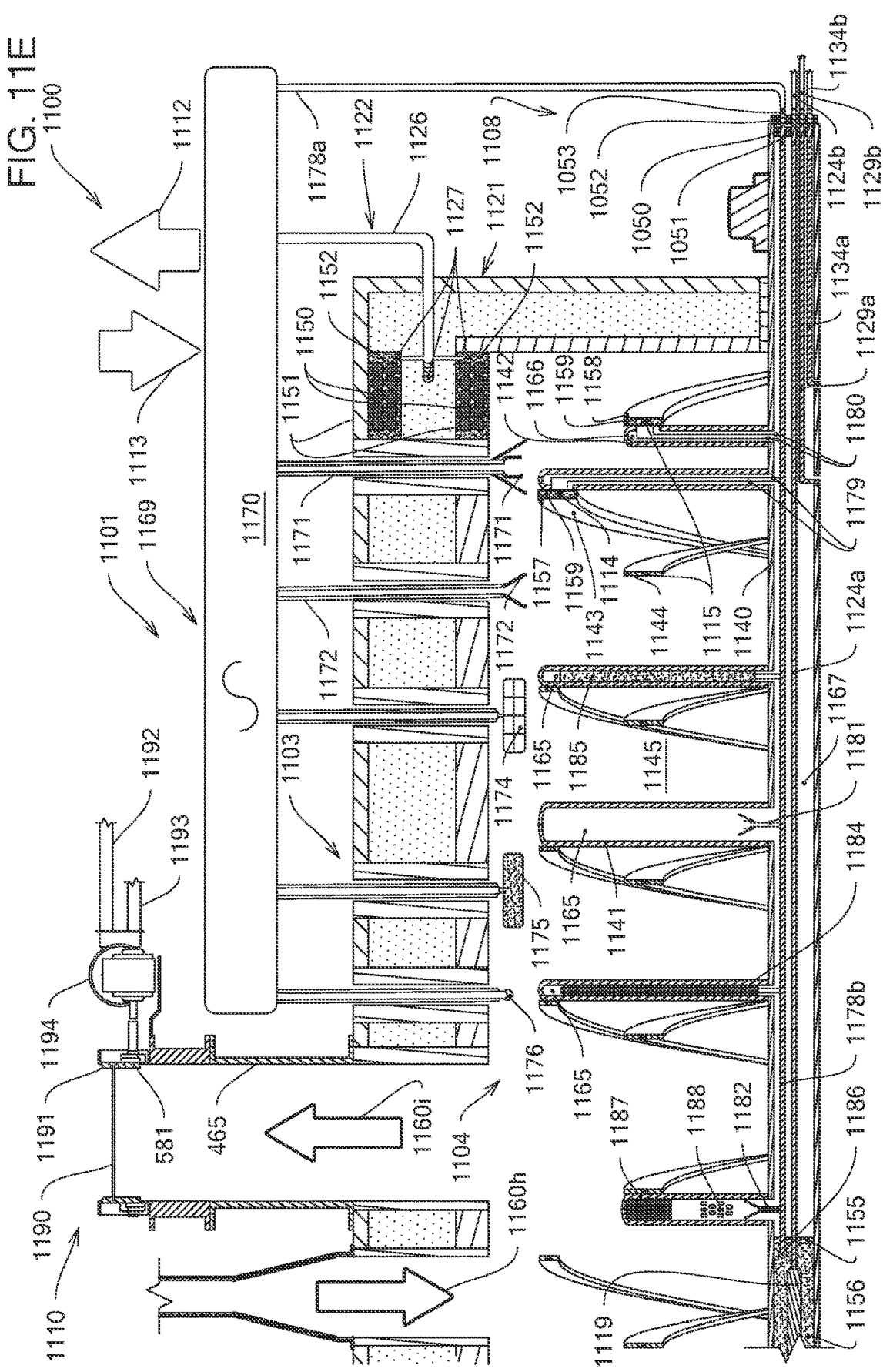

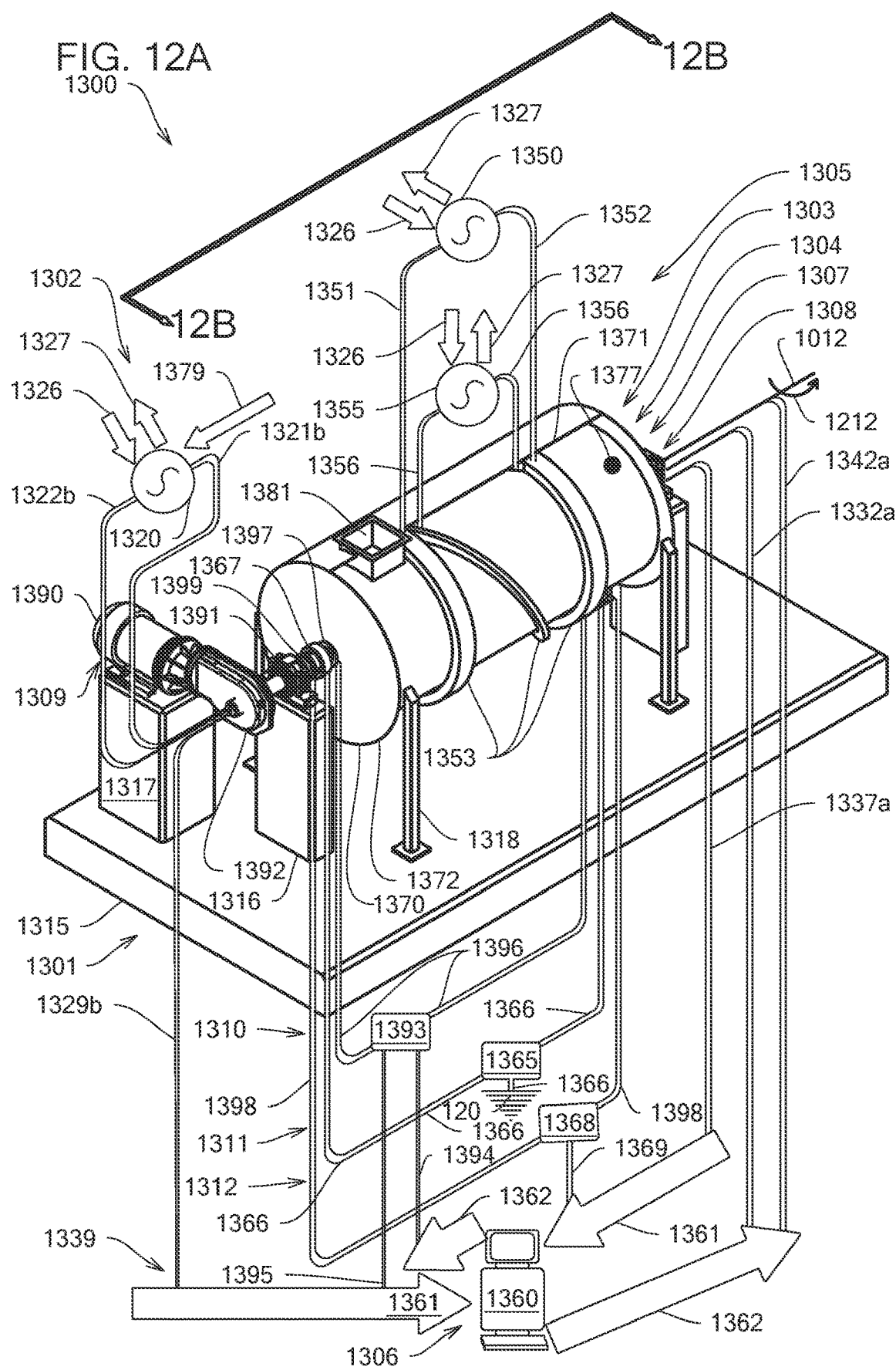

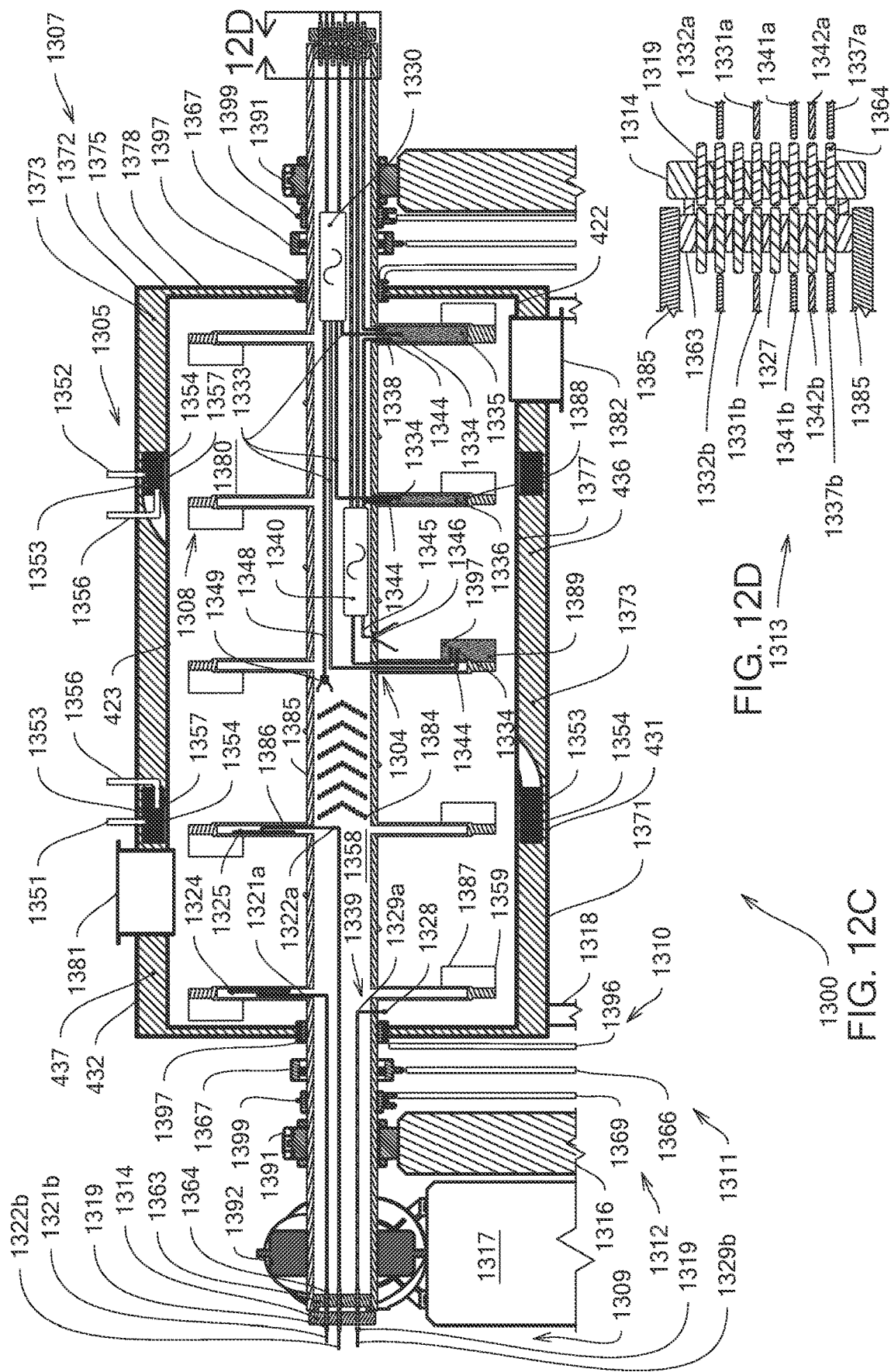

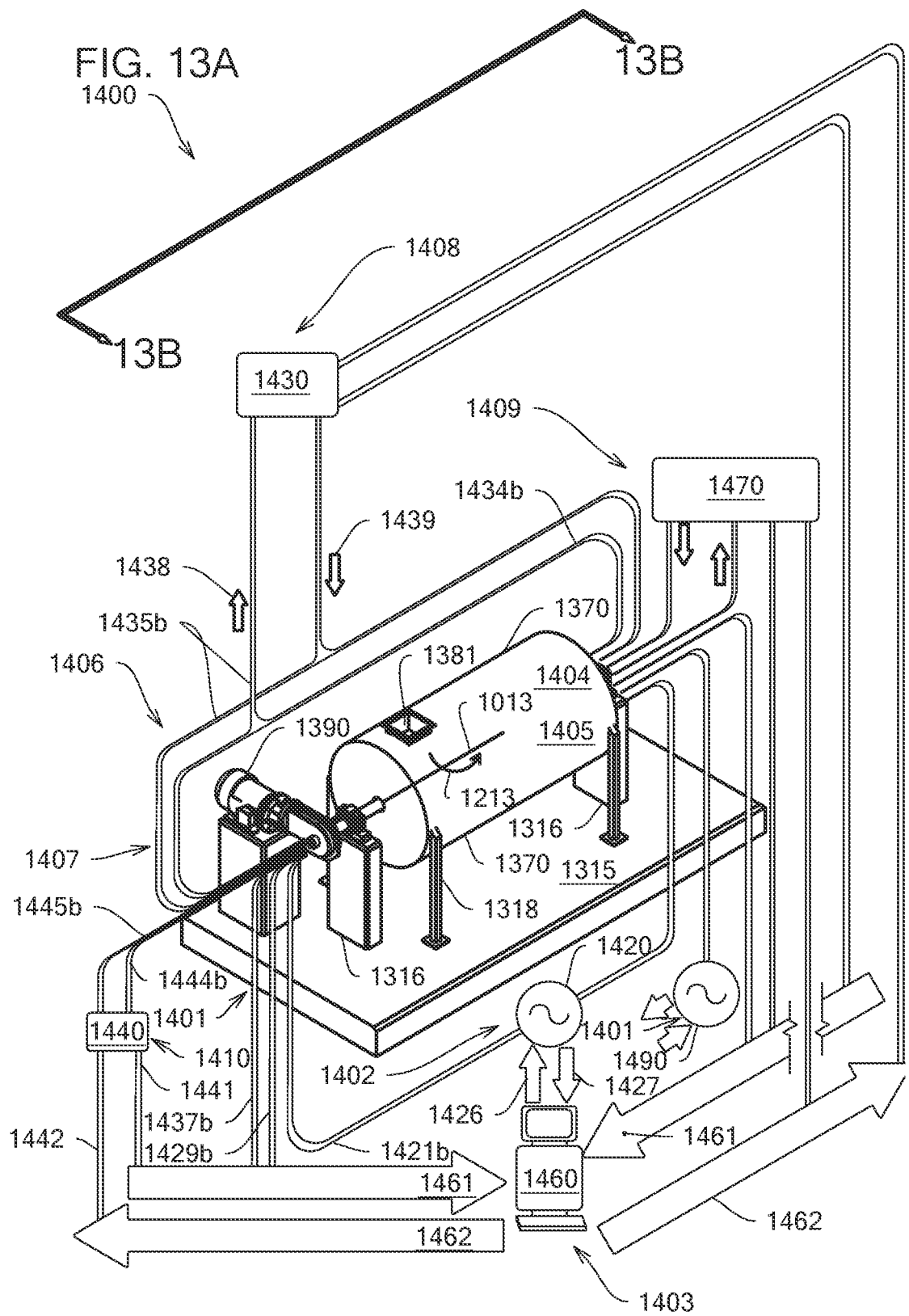

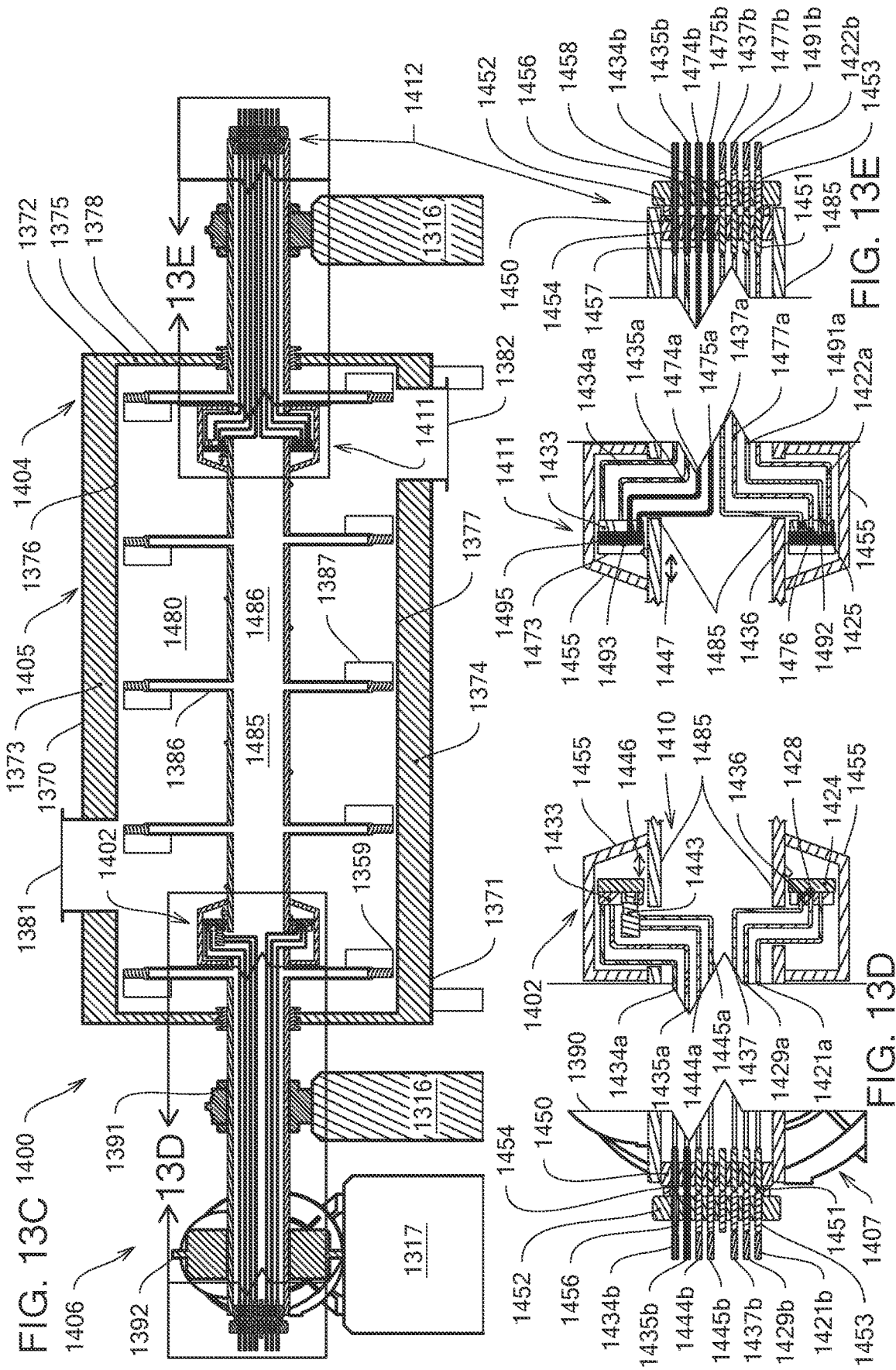

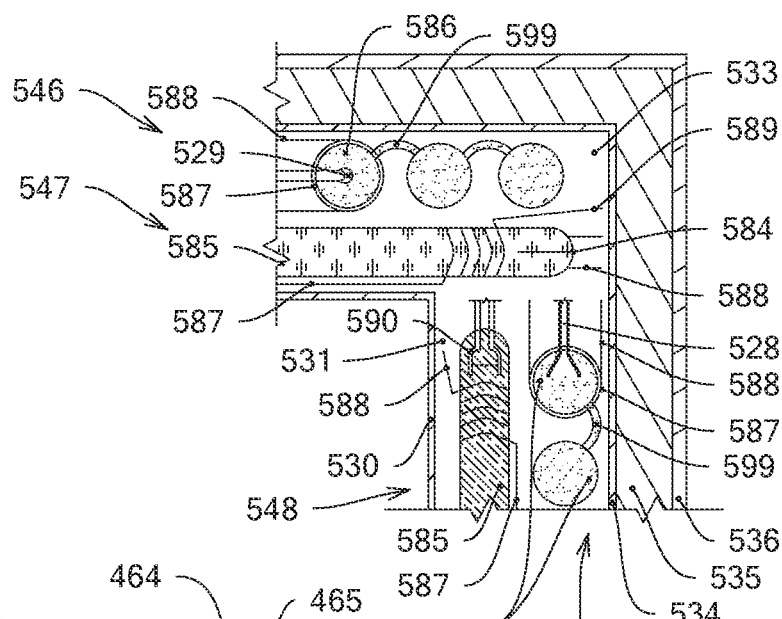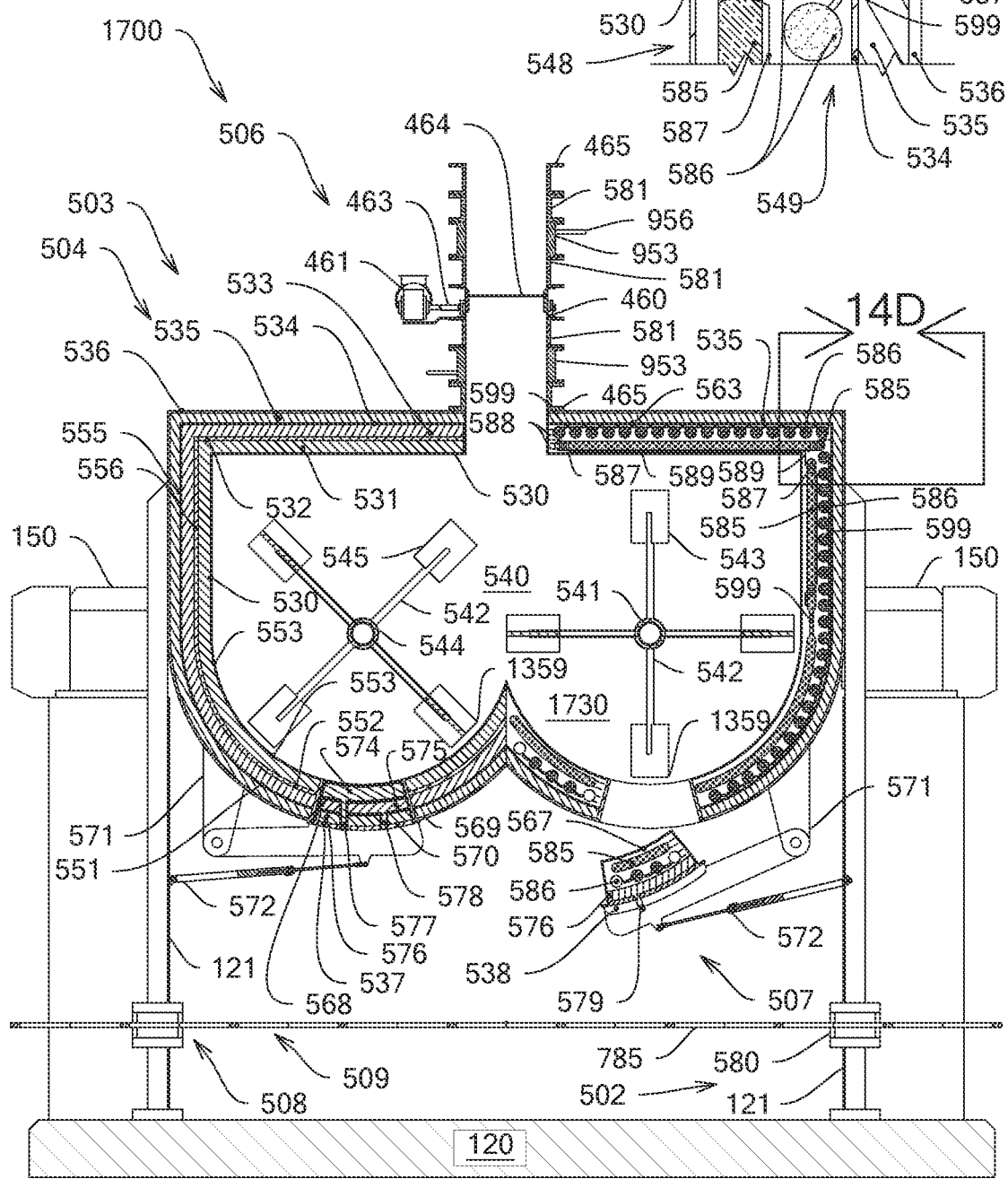

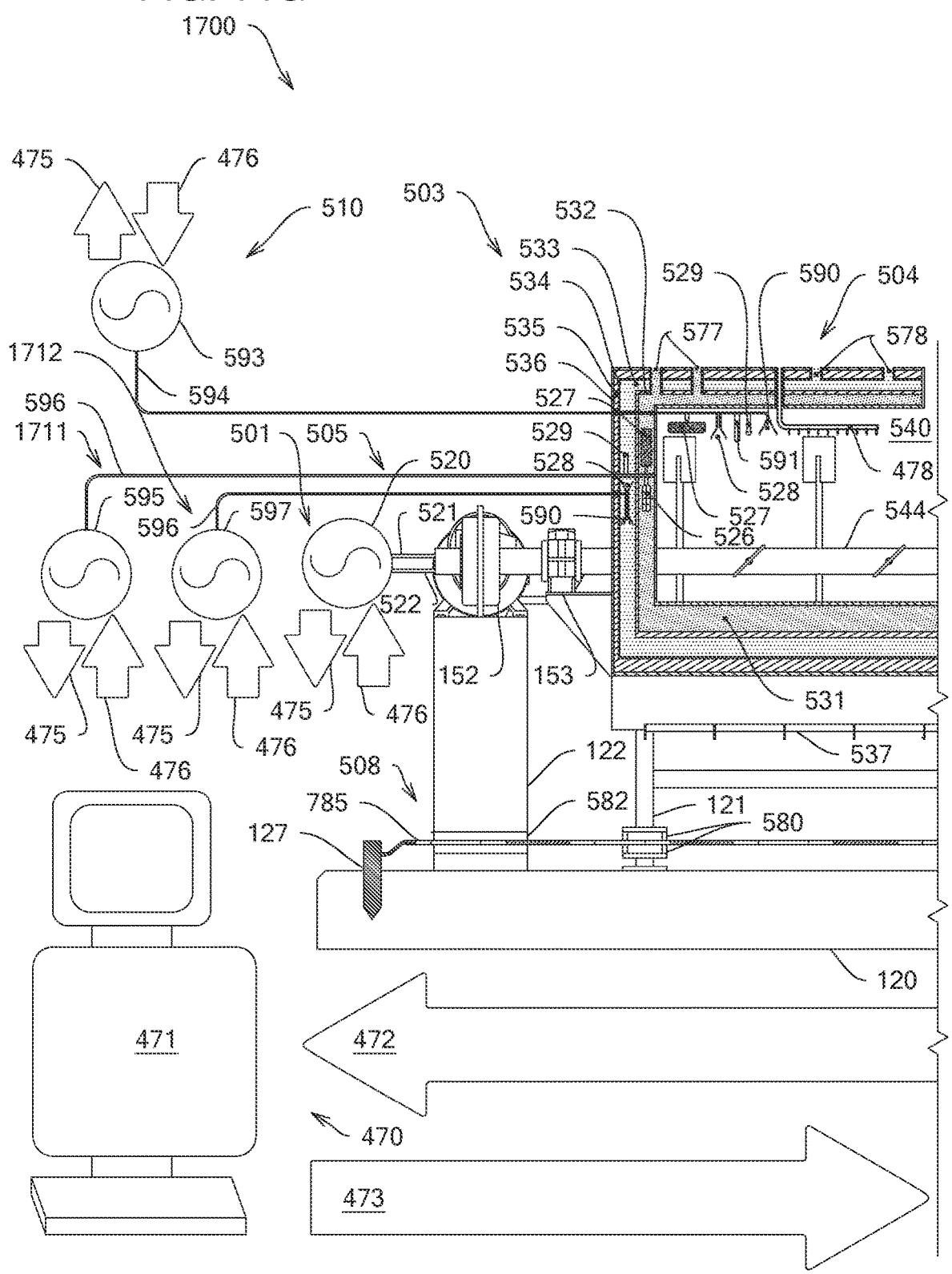

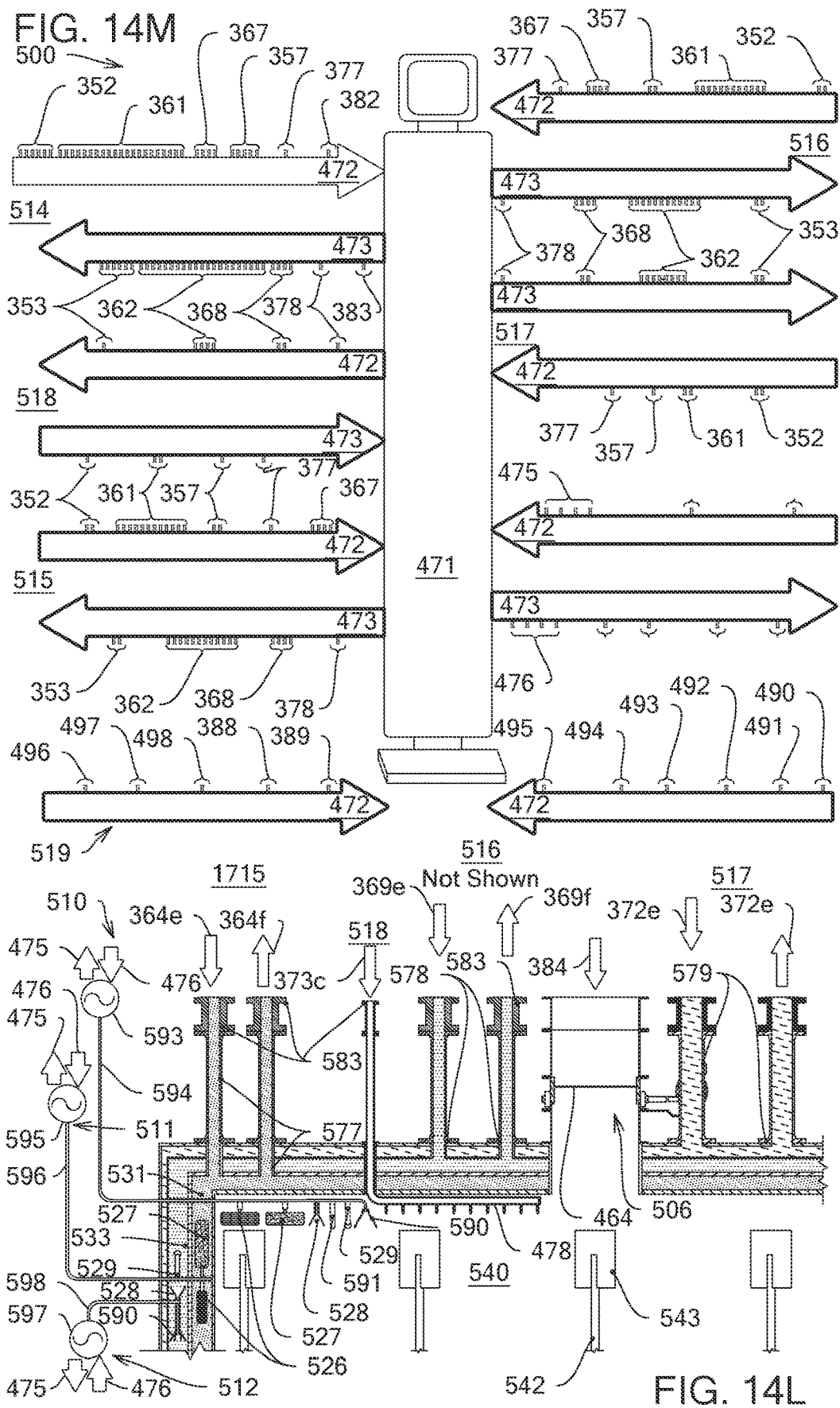

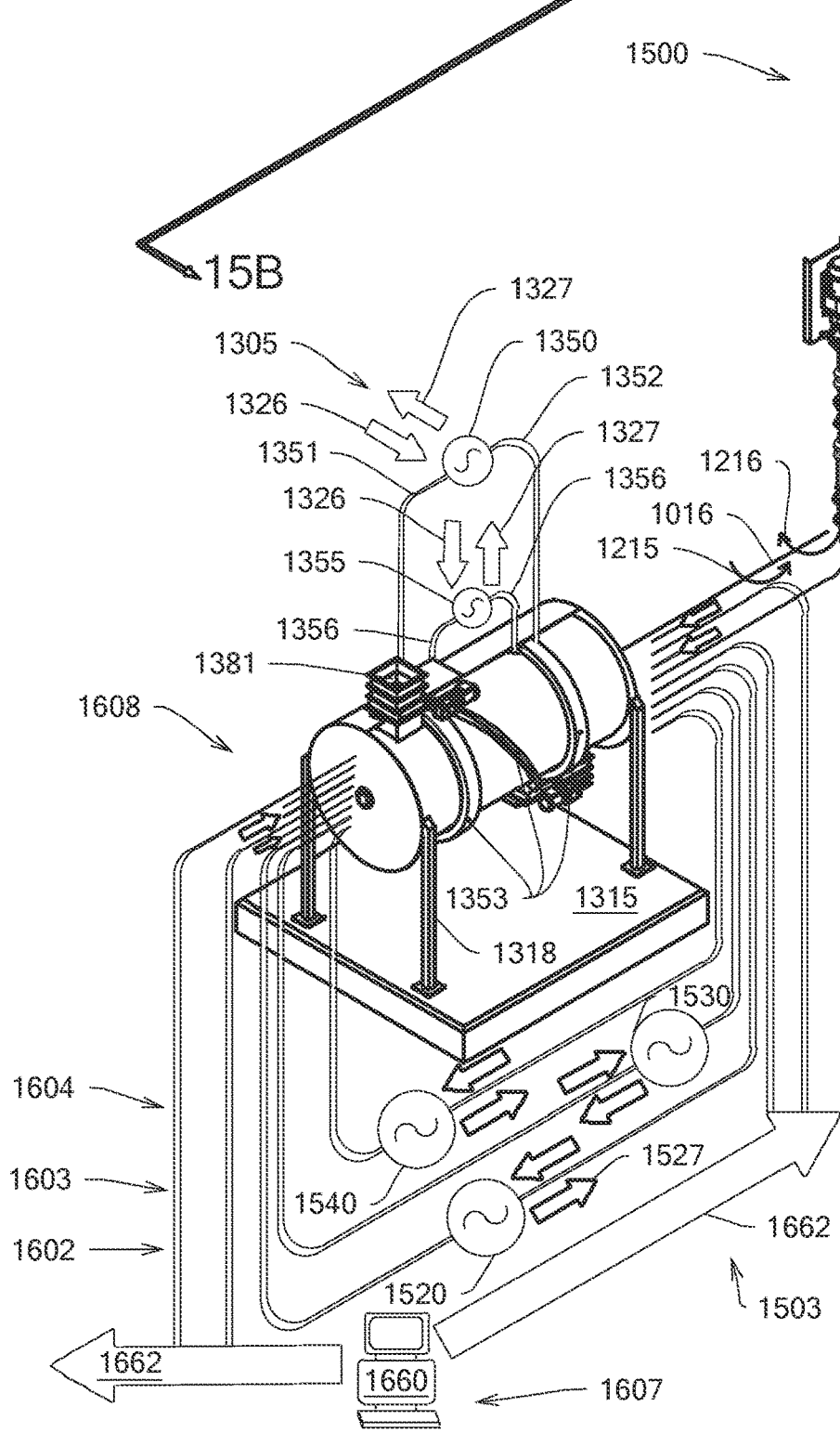

ELECTROMAGNETIC REACTOR

CROSS-REFERENCE TO RELATED APPLICATIONS

This application claims the benefit of U.S. Provisional Application Ser. No. 62/803,588, filed Feb. 10, 2019.

FEDERALLY SPONSORED RESEARCH

Not applicable

SEQUENCE LISTING OR PROGRAM

Not applicable

BACKGROUND OF THE INVENTION

Field of the Invention

This invention relates to dielectric heating and processing substances, specifically to uniform dielectric heating of moving bulk volume of particles.

Discussion of Prior Art

Like microwaves, radio-frequency (RF) dielectric technology heats non-conducting materials from the inside outward. RF heating methods were first employed in food processing as early as 1940. Although RF heating has been employed in different industrial applications, the majority of these systems are designed to heat loads up to moderate temperatures usually below 100° C. when dielectric heating has the theoretical capability to quickly heat some substances, such as hydrocarbons to hundreds of degrees C.

The radio spectrum is the part of the electromagnetic spectrum with frequencies from 3 Hz to 30 EHz. Electromagnetic waves in this frequency range are called radio waves. The dielectric heating systems according to the present invention operate at these radio spectrum frequencies. A time varying electromagnetic field has both an electric and magnetic field and the relations between the two fields are described by Maxwell's equations. From the heating perspective, heat is generated in dielectric and metallic materials principally by the interaction of the electric field and charge.

Heat is generated in a material from molecular agitation. Based on how agitation is created in the material, heating methods can be broadly classified into two categories: conventional (convection) and electromagnetic. In conventional heating, a heat source is applied outside the material and thermal energy transfers by convection through the material from a region of high temperature to low temperature. An example of conventional heating is a kitchen oven where heating coils are the source and heat is conducted through the material created by the temperature gradient between the source and load. Drawbacks of conventional heating are uneven heating across the load because of the thermal conduction gradient and some substances have a slow rate of thermal transfer.

The second method of heating uses time varying electromagnetic fields. In an electromagnetic heating process, the electric field interacts directly with the molecules in the load and increases the kinetic energy of the molecules to heat the load. Electromagnetic waves propagate with very high velocity, and providing the electric field penetrates through the load, uniform and near instantaneous heating can be obtained. Because the field penetrates the entire volume, the term volumetric heating is sometimes used to distinguish it from conduction heating.

Due to the extremely short wavelength emitted by infrared and microwaves the penetration depth or the rate of attenuation of the energy within the body is correspondingly shallow. The difficulty with infrared and microwave radiation is even heating, which depends on many things, such as the uniformity of the electric field, the homogeneity of the material and edge effects. Equally important to this uniformity is the penetration depth or the rate of attenuation of the energy within the body. Since the microwave frequencies are approximately 100 times those of RF, the field strength at microwave will be one tenth of that at RF.

In many instances, the product targeted for heating by infrared or microwaves can only be one particle deep, or at least a very thin bed of the depth or uneven heating will occur. In other instances, all sides of each particle must receive equal exposure or at least one surface does not receive preferential exposure to the infrared or there will be a risk of particles within a bulk volume receiving too much, or too little dielectric heating.

The primary drawback of electromagnetic heating is that its efficiency depends significantly on the electrical properties of the material. Consequently, non-uniform heating from varying dielectric properties within a bulk volume results in inefficient overheating of portions of bulk volume in order to obtain at least minimum average heating of the bulk volume. A specific disadvantage of known RF dielectric heating methods is the potential for thermal runaway or hot spots in a heterogeneous medium since the dielectric losses are often strong functions of temperature. Another disadvantage of RF heating is the potential for dielectric breakdown (arcing) if the electric field strengths are too high across the sample. In general, the above-mentioned techniques are limited by the relatively low thermal and electrical conductivity of the bulk volume of interest. Thus, the inefficiencies resulting from non-uniform heating render existing techniques slow and inefficient.

Controlled or uniform temperature heating of a bulk volume is desirable, but current methods cannot achieve this goal. Instead, current methods generally result in non-uniform temperature distributions, which can result in the necessity of inefficient overheating of portions of the bulk volume. Extreme temperatures in localized areas may cause damage to the producing volume such as carbonization, skinning, and arcing between the conductors can occur.

Although RF dielectric heating systems have been used in the past, there remains a need for improved apparatuses and process techniques to rapidly, efficiently, and uniformly heat all particulate in a bulk volume or a specific chemical composition(s) that reside in a bulk volume of particles. There also is a substantial need for a method and apparatus of incorporating other industrial processes with the even application of dielectric heating, such as: adding gas, liquid, or solids, mixing, negative vacuum, positive pressure, distillation bubble caps, and so forth.

Prior Art—Capacitive RF Dielectric Heating Systems

FIGS. 1-4 (Prior Art) show an example of a known capacitive RF dielectric heating system. A high voltage RF frequency sinusoidal AC signal is applied to a set of parallel electrodes 20 and 22 on opposite sides of a dielectric medium 24. Medium 24 to be heated is located between electrodes 20 and 22, in an area defined as the product treatment zone. An AC displacement current flows through medium 24 as a result of polar molecules in the medium aligning and rotating in opposite fashion to the applied AC electric field. Direct conduction does not occur. Instead, an effective AC current flows through the capacitor due to polar molecules with effective charges rotating back and forth. Heating occurs because these polar molecules encounter interactions with neighboring molecules, resulting in lattice and frictional losses as they rotate.

The resultant electrical equivalent circuit of the device of FIG. 1 is therefore a capacitor in parallel with a resistor, as shown in FIG. 2A. There is an in-phase IR component and an out-of-phase Ic component of the current, relative to the applied RF voltage. In-phase component IR corresponds to the resistive voltage loss. These losses get higher as the frequency of the applied signal is increased for a fixed electric field intensity or voltage gradient due to higher speed interactions with the neighboring molecules. The higher the frequency of the alternating field, the greater the energy imparted into medium 24 until the frequency is so high that the rotating molecules can no longer keep up with the external field due to lattice limitations.

This frequency, which is referred to as a "Debye resonance frequency" after the mathematician who modeled it, represents the frequency at which lattice limitations occur. Debye resonance frequency is the frequency at which the maximum energy can be imparted into a medium for a given electric field strength (and therefore the maximum heating). This high frequency limitation is inversely proportional to the complexity of the polar molecule. These Debye resonance frequencies also shift with temperature as the medium 24 is heated.

Various other substances, elements, or compositions within a substance may use different electrical circuit analogs. More complex models having serial and parallel aspects in combination to address second order effects are possible. Any of the components in any of the models may have temperature and frequency dependence.

FIGS. 2A, 2B, and 2C (Prior Art) are equivalent circuit diagrams of the dielectric heating system of FIG. 1. Resultant electrical equivalent circuits may be different from the circuit shown in FIG. 2A, depending on the medium 24. For example, in a medium 24 with a high moisture and salt content, the electrical circuit only requires a resistor (FIG. 2B), because the ohmic properties dominate. For media with low salinity and moisture, however, the resultant electrical circuit is a capacitor in series with a resistor (FIG. 2C).

An example of a conventional RF heating system is shown in FIGS. 3 and 4 (Prior Art). In this system, a high voltage transformer/rectifier combination provides a high-rectified positive voltage (5 kV to 15 kV) to the anode of a standard triode power oscillator tube. A tuned circuit (parallel inductor and capacitor tank circuit) is connected between the anode and grounded cathode of such tube as shown in FIG. 4, and also is part of a positive feedback circuit inductively coupled from the cathode to the grid of the tube to enable oscillation thereby generating the RF signal. This RF signal generator circuit output then goes to the combined capacitive dielectric and resistive/ohmic heating load through an adapter network consisting of a coupling circuit and a matching system to match the impedance of the load and maximize heating power delivery to the load, as shown in FIG. 3. An applicator includes an electrode system that delivers the RF energy to the medium 24 to be heated, as shown in FIG. 1.

The known system of FIGS. 1-4 can only operate over a narrow band and only at a fixed frequency, typically as specified by existing ISM (Industrial, Scientific, Medical) bands. Such a narrow operating band does not allow for tuning of the impedance. Any adjustment to the system parameters must be made manually and while the system is not operating. Also, the selected frequency can drift. Therefore, to the extent that the known system provides any control, such control is not precise, robust, real time or automatic.

Attempts have been made to radiate infrared, microwaves, and radio frequencies to bulk volumes with continuous and batch systems. Examples of such systems to apply an electromagnetic field to an object for the purpose of heating include those disclosed in the following patents:

U.S. Pat. No. 2,428,090 to Naeher, 1947;
U.S. Pat. No. 3,474,209 to Parker, 1969;
U.S. Pat. No. 3,701,670 to Pierce, 1972;
U.S. Pat. No. 4,631,380 to Tran, 1986;
U.S. Pat. No. 4,882,851 to Wennerstrum, 1989;
U.S. Pat. No. 5,024,145 to Bailey, 1991;
U.S. Pat. No. 5,174,864 to Arbizzani, 1992;
U.S. Pat. No. 5,392,698 to Sprecher, 1995;
U.S. Pat. No. 5,400,524 to Leconte, 1995;
U.S. Pat. No. 5,487,873 to Bridges et al., 1996;
GB Patent 1,379,116 to Newton et al., 1972; (woven wire)
WO2000052405A and PCT/SE2000/000367 to Blom et al., Published 2000;
U.S. Pat. No. 6,303,166 to Kolbe et al., 2001;
U.S. Pat. No. 6,657,173 to Flugstad et al., 2003;
U.S. Pat. No. 6,784,405 to Flugstad et al., 2004;
U.S. Pat. No. 7,091,460 to Kinzer., 2006;
US Patent Application 2014/0027445 to Scheurs et al., Published 2014;
U.S. Pat. No. 8,561,314 to Krüger, 2013

Naeher attempts to heat materials with infrared lamps shining down on material which is being moved and agitated on a conveyor so "The rays from the lamps will contact all parts of the various particles of the material on the conveyor".

Parker shows a conveyor passing through a microwave horn to direct the microwaves to the materials on the conveyor. Patent '209' does not show any method of agitating the product or other means of evenly exposing all particulate to microwave radiation.

Pierce shows a device somewhat similar to Naeher's, with an eccentric drive conveyor used to agitate the materials being conveyed in an attempt at evenly apply infrared radiation to all surfaces of the particles.

Tran shows a system for treating materials with microwave radiation that can be fed by gravity or pass through with a conveyor. The corners of the pentagonal casing acting as reflectors which reflect any microwave radiation passing through the material being treated back towards the material.

Wennerstrum describes a batch vacuum dryer for processing and heating with a microwave energy directed into a process chamber with a wave guide. Introducing microwaves to the top surface of matter being mixed by an industrial mixer is hampered by the low penetration of microwaves short wavelength into the product in the process chamber. A particle is constantly moving in a mixer from top-to-bottom and end-to-end so the particle only get a moment of exposure to the microwave when it moves near the top surface. If the microwave energy field is increased for deeper penetration it is done with risk of overheating the particles near the surface.

Wennerstrum description includes "To eliminate arcing, glow discharge and related microwave phenomena, the components of the mechanism that are contained within the drying chamber need to be constructed of a material that is relatively transparent to microwaves. In the preferred embodiment, that material is polypropylene, although a variety of other materials are acceptable as well." Even if the product container is made with a transparent material there will be uneven distribution of the microwaves in the described drying chamber. Even if an equal application of microwaves could be applied to all portions of a transparent material acting encasing the drying chamber, the microwave attenuation will most likely only penetrate into a small portion of the contents of the entire process chamber.

Bailey shows a bulk material processor radiantly (infrared) heating the bulk material passing underneath with vibrating and cascading conveyors, which "turns, rotates and tumbles the material; . . . provides relatively uniform processing".

Arbizzani shows a liquid process chamber with an inlet for introducing microwaves to the liquid being mixed.

The Sprecher invention includes a meander waveguide with a microwave absorptive terminator at an end of the waveguide. Apertures are provided along portions of the waveguide for transporting the potato slices and the like through the waveguide. A belt link type conveyor belt having an open lattice structure is employed to convey raw product slices through the meander waveguide. Patent '698' does not show any method of agitating the product or other means of evenly exposing all particulate to microwave radiation.

Leconte shows a device for drying a granular or powdered product having a dielectric duct with a microwave applicator therein. A rotating metal screw is positioned in the duct to convey the product. The screw includes at least one helically wound wire that extends along the duct and is spaced from the duct wall.

Bridges shows a system of radiating radio frequency into material that on a belt conveyor, in a screw conveyor and in a rotating kiln with the latter "to obtain good mixing and uniform heating". However, Bridges does not show how the RF will be evenly dispersed to the ingredients being mixed, nor is there an explanation of how the RF signal is coupled to the rotating kiln. A rotating kiln without vanes to stir and lift the particulates will typically only roll the particulate, which can cause increased segregation instead of homogeneity. As described and illustrated. "The center line cable is connected to a graded diameter cylindrical electrode, whose diameter increases as the length of kiln is traversed from an end to an end. The kiln also includes an outer electrode which is substantially constant diameter with a circular cross section". Mixing vanes on the inside of the kiln constructed from steel and many other materials can that absorb or reflect radio frequency waves would have a detrimental effect on the radio frequency electric field inside the rotating kiln if the kiln housing itself is an electrode. Such a long electrode will have dead or weak spots in its radiation pattern unless properly terminated with center line cable. The standard auger of a screw conveyor is not a mixing device. There isn't any mention of auger made from a material that would allow the frequencies to penetrate into the chamber beyond the auger, and the mode launcher is a mono-pole antenna for propagating radio frequency signal down the cylinder to the chamber with the auger.

Blom describes stirrer/agitator with heat emitting devices that are heated by microwave energy delivered by magnetrons disposed outside the container.

The test results shown in Flugstad '173' are an exemplary example of the need for an improved device to evenly apply a radio frequency radiation field to a large bulk quantity of matter. Flugstad shows a capacitive (RF) dielectric heating apparatus to pasteurize alfalfa and radish seeds that are used to produce vegetable sprouts. Seed samples were subjected to RF heating at controlled RF frequency and electric field intensity in a container without agitation or mixing.

In Flugstad tests seeds were heated in 25 seconds when impedance match was maintained compared to a 3 minute heating time when impedance match was not maintained as closely. With the increased effectiveness of transferring radio frequency energy to the seeds, a few seconds of overheating would kill the germination making the seeds unsuitable for sprouts. The findings of Flugstad tests indicated the need to accurately determine the final temperature and allow the system to reach this temperature with precision and rapid cooling of seeds to maintain their original moisture contents in order to achieve desired seeds germination rates.

The test container holding 1600 grams of seeds used in the Flugstad tests was only one inch deep and the measured temperature differences ranged from 2.5 C to 6.5 C. The temperature gradient can be expected to be substantially greater with industrial sized processes that hold hundred to thousands of pounds with a substantially increased distances of feet instead of inches between electrodes.

Kinzer attempts to heat hydrocarbons in-situ in a subterranean location with variable frequency automated capacitive radio frequency dielectric heating elements placed around or in the pipe to rapidly heat medium and fluid carrier medium as a slurry process Kinzer also says additives can be injected by pressure into an in-line mixer built into the piping. Kinzer does not elaborate on whether the mixer is before or after dielectric heating or give any indication that the mixing is designed to evenly present the slurry to a radio frequency radiation field.

The Scheurs application describes a mixing bowl for processing and heating with a microwave energy directed into the bowl with a wave guide. Introducing microwaves to the top surface of matter being mixed by an industrial mixer is hampered by the low penetration of microwaves short wavelength into the product in the process chamber. A particle is constantly moving in a mixer from top-to-bottom and end-to-end so the particle only get a moment of exposure to the microwave when it moves near the top surface. If the microwave energy field is increased for deeper penetration it is done with risk of overheating the particles near the surface.

Krüger describes various installations of a mixer connected to a vacuum pump along with microwave heaters in the rotating mixing blades and mixer walls.

In summary, the following are typical disadvantages of heating a bulk volume of particles with infrared and microwaves on a conveyor:
  a) the volumes are often prohibitively too large to evenly expose all of the particles within a bulk volume of particles to an infrared, UV, or microwave radiation;
  b) the prior art does not electrically-isolate the radiation source; and
  c) attenuation gradient within a pile leaves dead spots and uneven heating In summary, the following are typical disadvantages of a heating a bulk volume with infrared and microwaves in an active mixer:
  a) the prior art places the radiation sources on the mixer housing allowing for leakage of radiation outside of process chamber, which must be contained and is lost energy; and
  b) the prior art does not electrically-isolate the radiation source.

In summary, the following are typical disadvantages of a heating a bulk volume with radio frequency in an active mixer:

(a) the prior art does not provide an apparatus or means of moving a mass of material in a uniform or near-uniform state for a period of time to all particles to receive near-equal exposure of an electromagnetic energy;

(b) the prior art does not provide an apparatus or means of moving a mass of material in a uniform or near-uniform state for a period of time so no surface of any particle gets preferential exposure to electromagnetic energy;

(c) the prior art does not electrically-isolate the antennas;

(d) the prior art does not place the antennas in an optimum location for maximizing radiation exposure and subsequent absorption;

(e) the prior art does not provide for a means to rotate at least one antenna;

(f) most prior art does not provide for sensing of material in process chamber with radio frequency source adjustments;

(g) the prior art does not provide for real-time sensing of material in process chamber with radio frequency source adjustments;

(h) the prior art does not provide for sensing of the process chamber housing with radio frequency source adjustments;

(i) the prior art does not provide for sensing outside of the process chamber housing with radio frequency source adjustments;

(j) the prior art does not provide for sensing outside of the process chamber housing with emergency adjustment of power to RF source or amplifier;

(k) the prior art does not provide for a liquid or gas cooling jacket for the process chamber;

(l) the prior art does not provide for a liquid or gas radiation absorption jacket for the process chamber;

(m) most prior art does not provide for an insulation jacket for the process chamber;

(n) the prior art does not provide for a monitor or switch between RF treatment chamber and ground;

(o) the prior art does not provide for a choke between process chamber and ground;

(p) the prior art does not provide for a radio frequency choke between process chamber and ground;

(q) the prior art does not provide for a Faraday Cage surrounding the process chamber mixer to capture stray radio frequency waves;

(r) the prior art does not provide for containing radio frequencies at inlet and discharge gates of process chamber;

(s) the prior art does not provide an apparatus or means that can be used on either a batch or continuous mixer.

(t) the prior art does not provide an apparatus or means that can be used on either a diffusive or convective type of mixer;

(u) the prior art does not provide an apparatus or means to inject a liquid into the process chamber;

(v) the prior art does not provide an apparatus or means to control impedance of the radio frequency signal or emitted EM energy;

(w) the prior art does not provide an apparatus or means to adjust the frequency(ies) radiated into process chamber;

(x) the prior art does not provide an apparatus or means to adjust the distance between antennas to correspond with the frequency(ies) radiated into process chamber;

(y) the prior art does not provide an apparatus or means to cool an antenna(s);

(z) the prior art does not provide an apparatus or means to control the air temperature in process chamber with controlled air flow through process chamber;

(aa) most prior art does not provide a vacuum to a process chamber;

(bb) the prior art does not provide an apparatus or means to purge the process chamber of oxygen to create a pyrolysis chamber;

(cc) the prior art does not provide an apparatus or means to add a gas to process chamber;

(dd) the prior art does not provide an apparatus or means to add a gas to process chamber, recover said gas and pass gas through a heat exchanger;

(ee) the prior art does not provide an apparatus or means to add a gas to process chamber, recover said gas and pass gas through a gas or liquid separator;

(ff) the prior art does not provide an apparatus or means to individually control and operate vanes, ribbon, or impellers of mixer with step motors; and (gg) The prior art does not provide an apparatus or means of a tripole antenna array in process chamber.

OBJECTS AND ADVANTAGES

The Advantages of Dielectric Heating

While the aforementioned advantages of RF heating may be established for some products and processes, there are other products and processes that are not yet able to realize these advantages because a suitable means of exposing products to a field of RF radiation or at a process volume that is an economical had not been developed. The primary problem which dielectric heating readily solves is that of heat transfer. Because the heat is generated quite uniformly within the material itself during dielectric heating there is no need to wait for the heat to flow in from the surface.

A low frequency also has advantages in terms of a long wavelength which leads to deep penetration depth. However, the longer wavelength and resulting deeper penetration of a lower frequency does not negate a gradient of electrical and magnetic field strength that results from passing through substances with a high dielectric absorption, substances comprised of at least one material with high dielectric absorption, or substances that reflect RF radiation can create shadows on lower level product. For example, a conveyor that passes through a RF radiation treatment chamber stacked with a substance will receive less RF radiation in the middle of the stack than at the top or bottom. The depth of penetration gradient is based upon many factors, with dielectric absorption being a primary contributor.

The performance of radio frequency dielectric (RF) heating is therefore also less dependent on the product making a smooth contact with the electrodes. RF heating methods are not dependent on the presence of DC electrical conductivity and can heat insulators as long as they contain polar dielectric molecules that can partially rotate and create dielectric losses.

RF heating differs from higher frequency electromagnetic radiative dielectric heating (e.g, microwave ovens) in that with RF heating the wavelength of the chosen frequency is large compared to the dimensions of the sample being heated whereas with electromagnetic radiative heating the wavelength is comparable or even small compared to the dimensions of the sample being heated.

RF dielectric heating methods otter advantages over other electromagnetic heating methods. For example, RF dielectric heating methods offer more uniform heating over the sample geometry than higher frequency radiative dielectric heating methods (e.g., microwave ovens) due to superior or deeper wave penetration into the sample as well as simple uniform field patterns (as opposed to the complex non-uniform standing wave patterns in a microwave oven). In addition, RF dielectric heating methods operate at frequencies low enough to use standard power grid tubes that are both lower cost (for a given power level) as well as allow for generally much higher power generation levels than microwave tubes.

Accordingly, several objects and advantages of the present invention are:

a) to provide an improved apparatus for uniformly heating bulk volumes of free-flowing or semi-flowable particles;
b) to provide an apparatus for targeting elements, chemical compositions, and/or substances for EM heating within an operating mixer or screw conveyor;
c) to provide an apparatus utilizing a radio frequency dielectric heating system, in such a manner that efficiently achieves substantially uniform heating of a bulk volume of particles in the process chamber of an operating mixer;
d) to provide an apparatus utilizing a radio frequency dielectric heating system, in such a manner that confines the radio frequency(ies) signals to the process chamber or peripheral housing of an operating mixer or screw conveyor for government regulatory compliance and safe operation;
e) to provide a system and method for efficiently heat processing relatively large bulk volumes of particles;
f) to provide a system and method to heat specific elements and compositions within a bulk volume of particles in motion within an operating mixer, utilizing a variable frequency automated capacitive radio frequency dielectric heating system, while other elements and compositions within the formation are transparent to the frequencies being used to heat the targeted compositions.
g) to provide an apparatus or means of moving a mass of material in a uniform or near-uniform state for a period of time so all particles receive near-equal exposure of EM energy;
h) to provide an apparatus or means of moving a mass of material in a uniform or near-uniform state for a period of time so no surface of any particle gets preferential exposure to radiation field;
i) to provide an apparatus or means of electrically-isolate the antennas in a conveyor or mixer;
j) to provide an apparatus or means of placing the antennas in an optimum location with process chamber for maximizing radiation exposure and subsequent absorption;
k) to provide an apparatus or means of rotating at least one antenna;
l) to provide an apparatus or means for sensing of material in process chamber with radio frequency source adjustments;
m) to provide an apparatus or means for real-time sensing of material in process chamber with radio frequency source adjustments;
n) to provide an apparatus or means for sensing of the process chamber housing with radio frequency source adjustments;
o) to provide an apparatus or means for sensing outside of the process chamber housing with radio frequency source adjustments;
p) to provide an apparatus or means for sensing outside of the process chamber housing with emergency adjustment of power to RF source or amplifier;
q) to provide an apparatus or means for a fluid heat exchanger jacket for the process chamber;
r) to provide an apparatus or means for a fluid radiation absorption jacket for the process chamber;
s) to provide an apparatus or means for an insulation jacket for the process chamber;
t) to provide an apparatus or means for dielectric couplings between process chamber and ground;
u) to provide an apparatus or means for a choke between process chamber and ground;
v) to provide an apparatus or means for a radio frequency choke between process chamber and ground;
w) to provide an apparatus or means for a Faraday Cage surrounding the process chamber mixer to capture stray radio frequency waves;
x) to provide an apparatus or means for containing radio frequencies at inlet and discharge gates of process chamber;
y) to provide an apparatus or means that can be used on either a batch or continuous mixer.
z) to provide an apparatus or means that can be used on either a diffusive or convective type of mixer;
aa) to provide an apparatus or means to inject a liquid into the process chamber;
bb) to provide an apparatus or means to control impedance of the radio frequency signal or EM energy;
cc) to provide an apparatus or means to adjust the frequency(ies) radiated into process chamber;
dd) to provide an apparatus or means to adjust the distance between antennas to correspond with the frequency(ies) radiated into process chamber;
ee) to provide an apparatus or means to cool the antennas;
ff) to provide an apparatus or means to control the air temperature in process chamber with controlled air flow through process chamber;
gg) to provide a vacuum to a process chamber;
hh) to provide an apparatus or means to purge the process chamber of oxygen to create a pyrolysis chamber;
ii) to provide an apparatus or means to add a gas to process chamber;
jj) to provide an apparatus or means to add a gas to process chamber, recover said gas and pass gas through a heat exchanger;
kk) to provide an apparatus or means to add a fluid to process chamber, recover fluid and pass fluid through a fluid separator;
ll) to provide an apparatus or means to individually control and operate vanes, ribbon, or impellers of mixer with step motors; and
mm) to provide an apparatus or means of a tripole antenna array in process chamber; and
nn) to provide an apparatus or means of surrounding particulate in process chamber with an infrared, microwave, or UV spectrum of radiation.

Further objects and advantages are to provide a method to heat specific elements and compositions within an operating industrial mixer or screw conveyor, utilizing a variable frequency automated capacitive radio frequency dielectric heating system.

Further features and advantages of the invention will become more readily apparent from the following detailed description when taken in conjunction with the accompanying drawings.

DETAILED DESCRIPTION

Background

As a young project engineer in 1988 the applicant was challenged to attend the American Feed Industry Association (AFIA) trade show to find a solution for a client in Montana that wished to build an organic grain processing facility. The problem at that time was there was not an organic treatment for a steam boiler and the chemical boiler treatments made grains exposed to the steam technically not organic. The client desired another way to heat organic grains for sterilization of bacteria and cooking of starches prior to additional processing, such as flaking.

At the AFIA trade show the applicant first came across a company selling micronizers based on technology designed and patented by Chardo Pierce Micronizing Company that had infrared burners above a woven wire belt conveyor with vibrators under the woven wire to make the grain kernels jump to roll around. Infrared radiation due to its short wavelength and subsequent short depth of penetration into the kernel required the kernel to roll around or one side would get overcooked while leaving the underside undercooked.

The applicant later discovered another company, Flakee Mills, at the trade show manufacturing and selling an infrared cooker based on their patent technology (Bailey). The Flakee Mills cooker located the infrared panels above a vibratory conveyor to keep the grain kernels constantly turning under the infrared radiation. The client purchased the Flakee Mills cooker and used it for over twenty years.

The company the applicant worked for at the time made a significant effort to market and sell more of the Flakee Mills cookers without any success. Everyone that tested the machine was in agreement the infrared cooking of the grains was superior to steam. However, the vibratory conveyor could only be one kernel deep or there wouldn't be sufficient exposure to infrared radiation, which severely limited volume capacity of the cooker. Because there were a limited number of niche markets for a low volume cooker, both companies soon went out of business.

A drawback of the Flakee Mills cooker was that it was too efficient at dehydrating moisture from the grain kernel before the kernel had sufficient time for cooking of starches. Some grains, such as corn required an infrared cooking treatment, then a soak period to re-hydrate the kernels before another cycle of infrared cooking.

The applicant learned from the Flakee Mills cooker and then subsequent tests for other potential users of the cooker was that system was needed with significantly more volume than one kernel or particle in depth, and that it would be preferable to add a liquid to the bulk material before, after, or during exposure to radiation field.

Over the course of the next thirty years, the applicant worked as a construction manager, project manager, and designer of commercial and industrial bulk material handling and processing facilities. As a mental hobby the applicant would consider how radiation could be practically implemented for a process in lieu of conventional methods using conduction or convection.

In 2003 the applicant read an article about the University of Oregon researchers that in a laboratory had sterilized *E coli* in a radish seed without effecting the germination of the seed using capacitive radio frequency dielectric heating with automated impedance matching and variable frequency tuning. As described in the Flugstad patents, even though the sample container was rather small, and the longer wavelength is able to communicate between the dipole antennas a radiation field through the sample container, the outside of the sample had a different temperature than its center. The loss of dielectric heating from outside of a bulk volume of material compared to its core is due to the attenuation gradient of the radio frequency waveform as it is absorbed or reflected by the bulk volume.

In a meeting with The University of Oregon inventors in 2003, the applicant learned that the researchers had not found a practical apparatus for commercial scale (bulk volume) implementation of their technology. For example, the temperature gradient across a small container of radish seeds as a result of attenuation gradient extrapolated to too great of temperature variance across a large container of a few cubic meters and was unthinkable across a large container of five or more cubic meters. The resulting challenge was identical to that of the infrared. How to evenly expose a bulk volume, possibly several cubic meters with several tons of weight, so each particle within bulk volume receives a similar exposure of radiation? In the case of Flugstad, targeting for dielectric heating an organism contained within a living organism with minimal heating of the surrounding living organism, but instead of a few grams of radish seeds at a time, precisely dielectric heating hundreds or thousands of kilograms of radish seeds at a time so every radish seed gets an even amount of exposure to radiation?

Over the following years the applicant came to the conclusion that a bulk volume of material had to be in a near-uniform or uniform state of homogeneity when exposed to a field of radiation, which would require the movement of a near-uniform or uniform bulk volume of material through a field of radiation. Owing to the purpose of an industrial mixer is to bring the particles of a bulk volume to a near-uniform or uniform state of homogeneity, an industrial mixer was the obvious device to maintain a bulk volume in a near-uniform or uniform state of homogeneity while exposing all of the particulate within a bulk volume to a field of radiation.

The next design challenge was incorporating one or more antennas to a mixer to maximize absorption of radiation by bulk volume while minimizing radiation that escapes the process chamber. Most radio frequency dielectric heating devices have only used the ISM bands because Federal Communication Commission (FCC) requires emissions from industrial applications of non-ISM Bands to be no more than one-millionth that of the power generated. Due to considerations for worker safety there cannot be any emissions of any frequency. Emission of radiation outside of the process chamber is lost energy and no different than a leak of steam. Due to human safety, government regulations, and efficiency a radiation reactor cannot have any emissions.

"Antenna—Metallic" Traditionally, antennas have been defined as metallic devices for radiating or receiving radio waves. The antenna is a device that converts electric energy into electromagnetic energy, which is radiated in part from the antenna in the form of electromagnetic waves and in part forms a reactive electromagnetic field near the antenna. Examples of antenna are illustrated and described in more detail herein.

The antenna can be metallic or plasma. The antenna can be a closed electrical loop, monopole, dipole, tri-wave with three or more antennas each with a phase difference, a Helmholz Coil, a Maxwell Coil, or a Helicon Coil. Generally, an antenna is a conducting wire which is sized to emit radiation at one or more selected frequencies. To maximize effective radiation of such energy, the antenna is adjusted in length to correspond to a resonating multiplier of the wavelength of frequency to be transmitted. Accordingly, typical antenna configurations will be represented by quarter, half, and full wavelengths of the desired frequency.

Efficient transfer of RF energy is achieved when the maximum amount of signal strength sent to the antenna is expended into the propagated wave, and not wasted in antenna reflection. This efficient transfer occurs when the antenna is an appreciable fraction of transmitted frequency wavelength. That is, the antenna geometry is matched to the incident or transmitted frequencies expected to be encountered. The antenna will then resonate with RF radiation at some multiple of the length of the antenna. Due to this, metal antennas are somewhat limited in breadth as to the frequency bands that they may radiate or receive because their length is not easily or accurately adjusted. Often, antennas used to transmit or receive signals across a range of signals will have an antenna geometry selected to most closely match that of a center frequency in the intended operating frequency range. This results in an increasingly inefficient antenna as the frequencies of the incident signals progress toward the ends of the range.

As used herein, the term "antenna" may broadly refer to any structure from which EM energy may radiate (emitted) and/or be received, regardless of whether the structure was originally designed for the purposes of radiating or receiving energy, and regardless of whether the structure serves any additional function. For example, a radiating element or an antenna may include an aperture/slot antenna, or an antenna which includes a plurality of terminals transmitting in unison, either at the same time or at a controlled dynamic phase difference (e.g., a phased array antenna). Consistent with some exemplary embodiments, antennas that feeds (applies) energy into EM energy application zone (referred herein as "process chamber"). In some embodiments, one or more antennas may each serve as both receivers and transmitters. In some embodiments, one or more antennas may serve a dual function while one or more other antennas may serve a single function. So, for example, a single antenna may be configured to both deliver EM energy to the chamber and to receive EM energy via the chamber; a first antenna may be configured to deliver EM energy to the chamber, and a second antenna may be configured to receive EM energy via the chamber; or a plurality of antennas could be used, where at least one of the plurality of antennas may be configured to both deliver EM energy to chamber and to receive EM energy via chamber. At times, in addition to or as an alternative to delivering and/or receiving energy, an antenna may also be adjusted to affect the field pattern. For example, various properties of the antenna, such as position, location, orientation, temperature, etc., may be adjusted. Different antenna property settings may result in differing electromagnetic field patterns within the energy application zone thereby affecting energy absorption in the object. Therefore, antenna adjustments may constitute one or more variables that can be varied in an energy delivery scheme "Antenna—Plasma" A plasma antenna is a type of radio antenna in which plasma is used instead of the metal elements of a traditional antenna. A plasma antenna can be used for both and reception. Although plasma antennas have only become practical in recent years, the idea is not new; a patent for an antenna using the concept was granted to J. Hettinger in 1919.

In particular, U.S. Pat. No. 6,657,594 discloses an antenna system in which a plasma antenna is operated at a frequency near the resonant frequency of plasma to form a more efficient radiator requiring a smaller size than metallic antenna. Plasma resonance frequency can refer to a variety of wave types which become resonant, such as plasma ion acoustic waves, plasma electrostatic waves, and plasma electromagnetic waves.

Early practical examples of the technology used discharge tubes to contain the plasma and are referred to as ionized gas plasma antennas. Ionized gas plasma antennas can be turned on and off. Ionized gas plasma antennas can be nested such that the higher frequency plasma antennas are placed inside lower frequency plasma antennas. Higher frequency ionized gas plasma antenna arrays can transmit and receive through lower frequency ionized gas plasma antenna arrays. This means that the ionized gas plasma antennas can be co-located and ionized gas plasma antenna arrays can be stacked. Ionized gas plasma antennas can eliminate or reduce co-site interference. The thermal noise of ionized gas plasma antennas is less than in the corresponding metal antennas at the higher frequencies.

Plasma antennas can be dynamically tuned and reconfigured for frequency, direction, bandwidth, gain and beamwidth, so replacing the need for multiple antennas. A plasma device is provided having an ionizable substance for forming a plasma contained within a chamber having electrodes or other mechanism for passing an ionizing current to the substance to form the plasma. When operating, the plasma has a plasma frequency determined by the ionizing current. The plasma inside the chamber defines an antenna or other plasma device having a selected geometry and which can be connected to a transmitter, receiver, or transceiver for driving or receiving on the antenna at a selected signal, or operating, frequency.

During operation, the plasma frequency and operating frequency are selected to maximize the antenna efficiency and antenna aperture, given the antenna geometry. The size and geometry of the plasma device may be selected without consideration for the intended operating frequency. A plasma device of any size and shape can be configured to produce optimal antenna characteristics for any operating frequency simply by adjusting the plasma frequency of the plasma device.

Plasma antenna dynamic reconfigurability, which includes reconfigurability of length or size of the elements, and which antenna elements are energized, can provide for various desired results, as would be apparent to one skilled in the art after considering the present disclosure. For example, the size of the antenna elements can affect the frequency selectivity of the surface of the system. For example, plasma can be generated within one or more of the antennas that cause certain electromagnetic frequencies to be reflected, while other frequencies are allowed to pass therethrough. As more of each of the elements has a plasma that is energized to act as antenna, there is less space between each plasma element.

Plasma from ionized pure inert gas such as Argon has lower thermal, shot, and phase noise than plasmas from ionized mixed inert gases including Mercury Vapor. Pure Argon may exhibit a well-defined plasma frequency resonance whereas mixed inert gases or Mercury vapor may not.

The plasma device may be a plasma antenna, an array of plasma antennas, nested plasma antennas, one or more plasma frequency selective surfaces, a plasma filter, a plasma reflector, a plasma shield for a separate antenna, a plasma lamp in a microwave device, a plasma limiter, a plasma switch, a plasma window, a plasma screen, a plasma phase shifter, or other plasma device that uses the principles of the present invention.

A controller for matching the plasma frequency to the operating frequency given the selected geometry as nearly as possible during operation of the antenna is provided. Matching the plasma frequency and the operating frequency results in an optimal antenna aperture. The controller may be manual or automatic, such as a digital signal processor control.

The operating signal source may be any source which emits electromagnetic waves, including the plasma device itself. Different ionization mechanisms which permit controlling the plasma frequency can be utilized, including direct and external excitation with electromagnetic energy in the form of lasers with and without fiber optics and radio frequency (RF) sources, among others.

The plasma device used for transceiving is any device that uses plasma as a variable conducting medium or variable shield. The plasma device may be any known type of plasma antenna for example. Any linear dipole, traveling wave antenna, Yagi antenna, log periodic antenna, horn antenna, or aperture antenna formed with a plasma element can be used for the plasma device herein. Thus, the plasma element may be formed as a rod, a circular loop, a helix, a coil, an ellipse, a rectangle, a spiral or another shape suitable for emitting or receiving a signal. An antenna is only one exemplary form that a container of plasma may take. A container of plasma may also take the form of frequency selective surfaces.

The term plasma device is intended to include single element plasma antennas, arrays of plasma elements, such as those arranged in multiple rows and columns on a substrate, and multiple arrays of plasma elements forming filters, reflectors, plasma limiters, plasma switches, plasma windows, plasma screens, plasma lamps, plasma phase shifters and large bandwidth antennas, among other types. The substrates supporting arrays can be flat, or planar sheets rolled into a cylinder shape, for example. Further, the plasma device can include substrates having switchable plasma regions surrounding air or other dielectrics in fixed gaps or slots, so that the effective size of the fixed slots can be changed rapidly. Substrates used to support the arrays are preferably dielectric, but may also be made from a conductive metal. The plasma elements may be ionizable to a single length or multiple lengths.

Alternatively, the plasma elements can be formed as linear conductors, rectangles, stars, crosses or other geometric shapes of plasma tubes. However, tuning the plasma frequency of plasma elements of different geometric shapes can be problematic, especially where a multipath scenario is involved. For example, a plasma element may be in the form of a cylindrical annular ring. As electromagnetic waves pass through the plasma cylindrical annular ring, phase shifting may occur along different paths of this multipath scenario. It is possible to control phase shifting while tuning the plasma frequency by simply controlling the plasma density of the plasma cylindrical annular ring device.

Other configurations of the plasma devices include one or more stacked layers, with each layer being a switchable array of plasma elements. The layers are spaced within one wavelength of adjacent layers to ensure proper function. Each switchable array in the stack can be a filter, a polarizer or a phase shifter, a deflector, or a propagating antenna. The layers are combined to produce a particular effect, such as producing a steerable antenna transmitting only polarized signals in specific frequency bands. The layers may be formed from nested plasma element antennas as well. The apertures of each layer can be individually adjusted in accordance with the invention herein to produce an optimal effect for a given incident signal frequency.

A plasma antenna array or plasma frequency selective surfaces (plasma filters), planar or linear, will have a sharp resonance at the plasma frequency. If these arrays are stacked in layers, a sum of many resonances results. Tuning any number of them on or off results in a multiband antenna or multiband frequency selective surface.

By nesting one plasma antenna inside another and operating at the plasma frequency, a bandwidth which is the sum of several very tuned bandwidths results. Any number of the nested antennas can be turned on or off to create a multiband antenna.

For plasma devices there are two resonances that can be used to enhance aperture that can be used in themselves or simultaneously. One is the same resonance that occurs for the corresponding metal device such as a dipole antenna one half wavelength long. This same resonance to enhance aperture and efficiency in the metal is also true for the corresponding plasma device. In addition, the plasma device has another resonance when the operating frequency equals the plasma frequency times the geometric factor which in plasma devices with plasma larger than many wavelengths in all directions is equal to one.

The plasma can be operated in a continuous or afterglow state. The afterglow state is when the ionization takes place by pulsing the plasma rather than the continuous application of an ionization potential. In between pulses, the noise in the plasma decreases when the plasma relaxes. As the plasma density changes such that the plasma frequency becomes equal to the operating frequency, noise (such as thermal, phase and shot noise) in the plasma becomes minimized due to the fact that the plasma is in the afterglow and the plasma frequency equals the operating frequency. A plasma device can be operated such that the plasma density can be maintained where the plasma frequency is at or close to the operating frequency by maintaining the ionization by pulsing. This is a matter of timing the pulse repetition frequency and the plasma relaxation or decay time in the afterglow such that the plasma frequency is at or close to the operating frequency.

In addition, the plasma can be ionized by pulsing with opposite alternating positive and negative polarity to reduce noise such as thermal, phase and/or shot noise.

A method for matching the plasma frequency to the operating frequency of a plasma device a plasma device includes also sampling the source operating signal to determine the operating frequency and adjusting the plasma frequency of the plasma device to approximate the operating frequency. The operating signal may be resampled to verify the operating frequency and the plasma frequency may be adjusted to approximate the verified operating frequency. The plasma frequency can therefore be adjusted to the operating frequency +/−10% of the operating frequency.

Electric field gradients are used to change the shape and density of the plasma to affect the gain and directivity of the antenna. The inner plasma tube acts as the radiating source, while the outer plasma tube is used to change the radiation of the inner tube and to reflect the radiated signal. Instrumentation measures the density of the plasma providing a means to measure incoming signals as well as to regulate the radiation frequency.

Some of the physics of plasma transparency and reflection are explained as follows. The plasma frequency is proportional to the density of unbound electrons in the plasma or the amount of ionization in the plasma. If the incident RF frequency ω on the plasma is greater than the plasma frequency, the EM radiation passes through the plasma and the plasma is transparent. When the opposite is true, plasma acts as a metal, and transmits and receives microwave radiation. The plasma layer can reflect microwaves and a plane surface of plasma can steer and focus a microwave beam on a time scale of milliseconds.

"Antenna THz" A new type of optical transistor—a working THz amplifier—using graphene and a high-temperature semiconductor. The physics behind the simple amplifier replies on the properties of graphene, which is transparent and is not sensitive to light and whose electrons have no mass. It is made up of two layers of graphene and a superconductor, which trap the graphene massless electrons between them, like a sandwich. The device is then connected to a power source. When the THz radiation hits the graphene outer layer, the trapped particles inside attach themselves to the outgoing waves giving them more power and energy than they arrived with—amplifying them. The device is a very simple structure, consisting of two layers of graphene and superconductor, forming a sandwich. As the THz light falls on the sandwich it is reflected, like a mirror. A graphene amplifier. It works because external energy is supplied by a battery or by light that hits the surface from other higher frequencies in the electromagnetic spectrum. The THz photons are transformed by the graphene into massless electrons, which, in turn, are transformed back into reflected, energized, THz photons. Due to such a transformation the THz photons take energy from the graphene—or from the battery—and the weak THz signals are amplified.

"Aperture" refers to a region void of material having high electrical conductivity, such as a gap or a perforation in the coaxial line forming the coaxial antenna, in one embodiment, in the outer conductor of the coaxial line.

"Circuit" or "Circuitry" "Circuit" refers to the line used to deliver the RF signal from the RF signal generator to the antenna. The circuit line may comprise an arrangement of parallel conductors, coaxial conductors, or some other such conductor arrangement suitable for the of the RF signal from the location of the RF signal generator to the excitation point of the coaxial antenna. The circuit may be comprised of either a rigid conductor assembly or of a flexible cable assembly. The circuit may or may not include features to facilitate cooling of the circuit to maintain suitable operating temperatures for the conductors and surrounding dielectric material. For this disclosure, a circuit represents a path, and can be an open circuit or a closed circuit.

"Conductor" is an object or type of material which permits the flow of electric charges in one or more directions and which is characterized by a high value of electrical conductivity. Metals are examples of materials having high electrical conductivity.

"Dielectric constant" refers to the relative electrical permittivity (Er) of a material. It is understood that the relative electrical permittivity may exhibit a frequency dependency. As used herein, "dielectric constant" refers to the relative electrical permittivity at radio frequencies with which the system intends to operate. Alternatively, one or more samples of product entering the process chamber may be analyzed for dielectric constant.

"Dielectric material" refers to a material that is either intended to function as an electrical insulator or the material that is the subject of the RF heating application, e.g., the substance in process chamber. Dielectric material is characterized by the value of its relative electrical permittivity, and may exhibit a frequency dependency. Dielectric material having a relative electrical permittivity that varies with frequency is defined as dispersive. Water is an example of a dispersive dielectric material. This characteristic stems from the fact that water molecules are polar and tend to align with the electric field (i.e. can be polarized by an applied field). The degree of polarization depends on the frequency: at low frequencies alignment occurs readily and the corresponding relative electrical permittivity value is high (~80), at high frequencies alignment is poor and the corresponding relative electrical permittivity value is low (~2) In one embodiment, the dielectric material has a relative electrical permittivity in a range of 1 to 25.

Examples of solid dielectric materials include but are not limited to, for example, alumina, porcelain, glass, glass-resin composites, glass-ceramic composites, PEEK, glass-filled PEEK, ceramic-filled PEEK, PPS, glass-filled PPS, ceramic-filled PPS, PEI, polyethylene PET, glass-filled PEI, ceramic-filled PEI, foamed polymers such as foamed Nylon 6. Examples of liquid dielectric materials include but are not limited to hydrocarbon liquids, including but not limited to paraffinic waxes and oil, synthetic crude oil such as Fisher Tropsch liquids and solids, purified crude oil, refined crude oil, biodegradable materials, and mixtures thereof. Examples of gaseous dielectric materials include but not are limited to carbon dioxide, nitrogen, oxygen, a nitrogen-sulfur hexafluoride, air, SF6, and mixtures thereof.

"Electrical Power" The electrical power source generates electrical power. The electrical power may be one of alternating current (AC) or direct current (DC). Circuits carry the electrical power from the electrical power source to the RF source.

"Mixing" Mixing refers to any operation used to change a non-uniform system into a uniform one (i.e. the random distribution into and through one another, of two or more initially separated phases). The uniform application of a radiation field requires a uniform distribution of all particulate as it passes through a radiation field. The embodiment of the disclosed invention uses a mixer as the mechanism to uniformly expose a large volume of materials to a radio frequency radiation field. In a sense it can be said that the mixer is blending particulates with an electric and magnetic radiation field.

If all the physical properties are relatively the same, then mixing becomes fairly simple. As the physical characteristics of ingredients begin to vary widely, blending and segregation problems are compounded. Some of these factors are: Angle of Repose; Flowability; Density, or specific weightless; Particle Size, Distribution; Particle Shape; Cohesiveness; Adhesiveness; Agglomeration; Friability; Static charge; Abrasiveness; Hygroscopicity; Explosiveness; Material Composition; Surface Characteristics; Moisture Content of Solids; Density, Viscosity, Surface Tension of Liquids Added; and Temperature Limitations of Ingredients. Particle shape and density are the most important. Large and small particles do not mix well and will mix better if there are particles of varying size in between. High density particles, such as minerals, tend to segregate to the bottom.

The two major types of industrial mixers (blenders) are batch mixers and continuous mixers. A continuous mixer (blender) is a process line vessel that is continuously fed the correct proportions of ingredients; the ingredients are quickly mixed with intense agitation as they travel through the vessel in one pass, and the mixture is discharged to the next piece of equipment in the process.

A batch mixer is a stand-alone vessel in which all the ingredients are loaded and then agitated until homogeneously dispersed or mixed; the mixture is then dumped out.

A batch mixer operates in one of two ways: by using an agitator that's fitted into the mixer vessel to rotate and mix the ingredients, or by rotating the vessel itself (sometimes with an agitator inside the vessel) to tumble and mix the ingredients. Many variations of both batch mixer styles are available, including ribbon mixers, vertical orbiting screw mixers, pan mixers, kneaders, and tumbling mixers.

There are four basic mixing methods: diffusion (tumbling), convective, impaction, and high-shear. A fifth type, combination, combines two or more methods in one device.

Diffusion blending (mixing) is characterized as redistribution of particles by random motion. A tumble mixer is a diffusion mixer that is essentially a hollow vessel that rotates on its horizontal axis. The vessel is partially filled with material and then slowly rotated so that friction between the material and the vessel wall carries the material up along the wall until gravity causes the material to cascade back down onto the material bed below. Ingredients diffuse through the blend across the top surface of the material bed to provide the mixing. A tumble mixer requires the correct rotational speed to provide efficient, effective mixing. Slower rotation provides more gentle mixing but may be inefficient, while faster rotation mixes quickly but can be more damaging to fragile particles. If the mixer rotates too fast, the material won't fall down at all, which will result in an unmixed batch. The tumble mixer's shape can vary to help randomize the mix with internal baffles or agitators added to help disperse the material and change the angle at which the material falls. The tumble blender is an enclosed, rotating shell mounted on legs. Examples of tumbling mixing are tumble drums, tumbling drums with flights, rolling mixers, V-blenders, double-cone blenders, and portable-container tumblers.

Convective mixing takes place by the bulk transfer of groups of particles from one part of powder bed to another by means of blades or paddles. A convective mixer uses some type of mixing element, known as vane—such as a blade, cut & folded flighting, paddle, screw, or ribbon—to move the particles within the mixer. The mixing vessel typically is stationary, so the moving mixing element creates a convective flow within the powder bed. Examples of convective mixers are ribbon blenders, paddle mixers, screw mixers, orbital screw mixers, and any other mixer when an element moves through a powder bed.

Shear blending is the high intensity impact or splitting of the bed of material to disintegrate agglomerates or overcome cohesion. For low-shear mixing of free-flowing materials, the three most common mixer types are the conical screw mixer, tumble mixer, and ribbon mixer. Low-shear mixing is a relatively ordered process, meaning that the mixer runs at a low speed and the material's particles move in an orderly fashion throughout the mixer. For mid-shear mixing, the mixer moves at a slightly higher speed and particles move more randomly around the mixer. Examples of medium-shear mixers are plow and kneaders.

Batch mixers can generally be categorized by the amount of shear they apply to the material during mixing. Normally, the more cohesive your material, the more shear required to mix it. Low-shear and mid-shear mixers are suitable for more free-flowing materials, while mid-shear, high-shear, impact, and particle-design mixers are suitable for more cohesive materials.

A ribbon mixer is a batch, convective, low-shear mixer that has an internal rotating ribbon (or auger) that creates convection current mixing patterns within a stationary mixing trough. A batch ribbon mixer comprises a U-shaped trough equipped with a rotating shaft. The shaft is fitted with arms (spokes) and helical blades, called ribbons. As the shaft rotates, the outer ribbons move ingredients toward the center of the mixer and the inner ribbons move ingredients toward the outer edges, creating a mixing action. In some ribbon mixers, paddles or plows replace the ribbons. Ribbon mixers come in single or twin shafts and variations to the auger design such as paddles instead of a ribbon. Ribbon mixers can also be set to different angles to generate different types and amounts of movement inside the trough.

A twin shaft paddle configuration is a batch, convective, low-shear mixer (blenders) with paddles or ribbons mounted on twin shafts in a 'w' shaped trough. Overlapping motion and paddle design facilitates rapid fluidization and ensures excellent movement of particles. Twin shaft, counter-rotating paddles lift the particles in the center of the mixer trough, in the fluidized zone, where mixing takes place in a weightless state.

Pug mills are a continuous, convective, low to medium-shear mixer consisting of a single or twin shaft fitted with short heavy paddles rotating within an open trough or a closed cylinder. Solids are continuously fed into the process chamber from one end and discharged from the opposite end. Paddles may position tangentially or may overlap each other.

The defining attributes of a mixer (blender) in accordance with present invention will include diffusive, convective, low-shear, medium-shear, batch and continuous mixers (blenders), but does not include high-shear, impaction, particle-design, and extruder types of mixers as they are not practical or functional for the embodiment of this invention.

"Photodetector" In one embodiment a photodetector is made of bilayer graphene encapsulated between crystals of boron nitride and coupled to a terahertz antenna. In this sandwich structure, impurities are expelled to the exterior of the graphene flake, enabling plasmons to propagate freely. The graphene sheet confined by metal leads forms a plasmon resonator, and the bilayer structure of graphene enables wave velocity tuning in a wide range resulting in a compact terahertz spectrometer, several microns in size, with the resonant frequency controlled via voltage tuning. By measuring the current in the detector at various frequencies and electron densities, plasmon properties of one or more substances in bulk volume of particles in process chamber can be revealed. Thus, the device doubles up as a sensitive detector and a spectrometer operating in the terahertz range.

"Process Chamber" is where the application of EM energy occurs. Process or reaction chamber may include any void, location, region, or area where EM energy may be applied. It may be hollow, or may be filled or partially filled with liquids, solids, gases, or combinations thereof. By way of example only, chamber may include an interior of an enclosure, interior of a partial enclosure, open space, solid, or partial solid that allows existence, propagation, and/or resonance of electromagnetic waves. For purposes of this disclosure, all such energy application zones or process chambers may alternatively be referred to as cavities. It is to be understood that an object is considered "in" the energy application zone if at least a portion of the object is located in the zone or if some portion of the object receives delivered electromagnetic radiation.

"RF Source" The RF source generates RF electric signals that are delivered to the antenna. The RF source is typically arranged in the vicinity of the EM reactor. In some embodiments, the RF signal source includes electronic components, such as a RF signal generator, multi-frequency synthesizer, RF signal output control, RF wave generator, RF generator with Silicon Carbide (SiC) transistors, power amplifier, broadband power amplifier, directional coupler, impedance matching system, power supply, power meter, an oscillator, an inverter, a pulse synthesizer, a transformer, a low-to-high frequency converter, or frequency tuning circuitry. In some embodiments, the generator includes a circuit that measures properties of the generated signal and attached loads, such as for example: power, frequency, as well as the reflection coefficient from the load. For a dipole antenna, the RF source is operable to generate electric signals having a frequency inversely proportional to a length of the antenna to generate standing waves within the antenna. For example, when the antenna is a half-wave dipole antenna, the frequency is selected such that the wavelength of the electric signal is roughly twice the length. In some embodiments the RF source generates an alternating current (AC) electric signal having a sine wave.

"Radio Frequency Source" The radio frequency current source can include a transmitter and an impedance matching coupler. The coupler can be selected from numerous devices such as transformers, resonating capacitors, inductors, and other known components to conjugate, match, and manage the dynamic impedance changes of the bulk volume of particles load as it heats. The transmitter can also be an electromechanical device such as a multiple pole alternator or a variable reluctance alternator with a slotted rotor that modulates coupling between two inductors. The RF source may also be a vacuum tube device, such as an Eimac 8974/X-2159 power tetrode or an array of solid-state devices. Thus, there are many options to realize the RF source.

The radio frequency (RF) source circuitry generates a radio frequency signal through a circuit to an antenna that radiates an electromagnetic (EM) energy into a process chamber. It will be understood that EM energy can be high frequency alternating current, alternating voltage, current waves, or voltage waves. The EM energy can be a periodic high frequency signal having a fundamental frequency. The high frequency signal can have a sinusoidal waveform, square waveform, or any other appropriate shape. The high frequency signal can further include harmonics of the fundamental frequency. For example, the high frequency signal can include second harmonic, and third harmonic of the fundamental frequency. In some embodiments, the RF circuitry can produce more than one frequency at a time. In some embodiments, the frequency and shape of the high frequency signal may change over time. The term "high frequency alternating current", as used herein, broadly refers to a periodic, high frequency EM power signal, which in some embodiments, can be a voltage signal.

The use of lower frequency EM power provides more efficient and cost-effective options for RF wave generators. For example, low frequency RF source RF wave generators can be built utilizing Silicon Carbide (SiC) transistors, which offer high power (e.g., approximately 100 kW to 300 kW per transistor or pair of transistors) and high efficiency (e.g., approximately 98% efficiency). SiC transistors cannot operate effectively in high frequency ranges in the order of megahertz (MHz) Furthermore, SiC transistors can operate at high temperatures (e.g., over 200° C.). RF source can include an inverter, a pulse synthesizer, a transformer, one or more switches, a low-to-high frequency converter, an oscillator, an amplifier, or any combination of one or more thereof.

"RF Frequency" The invention involves apparatus and methods for applying EM energy to a bulk volume of free-flowing or semi-flowable particles. The term EM energy from a RF source, includes energy deliverable by electromagnetic radiation in all or portions of the electromagnetic spectrum, including but not limited to, radio frequency (RF), infrared (IR), near infrared, visible light, ultraviolet, etc. Applying energy in the RF portion of the electromagnetic spectrum is referred herein as applying RF energy. Microwave and ultra-high frequency (UHF) energy, for example, are both within the RF range. Even though examples of the invention are described herein in Circuit with the application of RF energy, these descriptions are provided to illustrate a few exemplary principles of the invention, and are not intended to limit the invention to any particular portion of the electromagnetic spectrum.

In some embodiments a RF source is also shown that is configured to form a plasma from the gas composition, and to provide or receive signal to and from the plasma, respectively. In other words, the RF source can be used to couple electromagnetic signal (both receiving or transmitting) to the formed plasma. The RF source may be configured to produce or receive radio frequency such as EHF, SHF, UHF, VHF, HF, and MF including AM or FM signals and digital spread spectrum signals, lower frequency signals such as LF, VLF, ULF, SLF, and ELF, and other known electromagnetic signals. Additionally, both continuous wave and pulsed signal can be transmitted or received using this antenna system.

"RF Power" In some embodiments, the RF source generates an electric signal having a power ranging from about 3 kilowatts to 2 megawatts. In some embodiments, the power is selected to provide minimum amount of power per unit length of the antenna. In some embodiments, the minimum amount of power per unit length of antenna is in a range from about 0.1 kW/m to 5 kW/m Other embodiments generate more or less power. Additionally, one or more sensor(s) (or detector(s)) may be used to sense (or detect) information (e.g., signals) relating to bulk volume of particles in chamber and/or to the energy application process and/or the energy application zone. At times, one or more antennas, e.g., antenna, may be used as sensors. The sensors may be used to sense any information, including electromagnetic power, temperature, weight, humidity, motion, etc. The sensed information may be used for any purpose, including process verification, automation, authentication, safety, etc.

Radio propagation is the behavior of radio waves as they travel, or are propagated, from one point to another. Radio waves are affected by the phenomena of reflection, refraction, diffraction, absorption, polarization, and scattering. Understanding the effects of varying conditions of a RF heating environment and the varying conditions of the material exposed to the radio waves is crucial to practical design of a bulk volume dielectric heating device. For this application, EM energy will be the term used herein for a radio frequency signal propagated out of a monopole antenna, or propagated between dipole antennas.

"Radome" A radome is a structural, weatherproof enclosure that protects a radar antenna. The radome is constructed of material that minimally attenuates the electromagnetic signal transmitted or received by the antenna, effectively transparent to radio waves. Radomes protect the antenna from weather and conceal antenna electronic equipment from view. They also protect nearby personnel from being accidentally struck by quickly rotating antennas. Radomes can be constructed in several shapes depending on the particular application, using various construction materials such as fiberglass, PTFE-coated fabric, and others.

Segregation is defined as the separation of particles into distinct zones due to physical properties. Particles that are presented to a RF radiation field while segregated, even if the particles are moving, typically will not receive a similar exposure.

"Sensor" One or more sensor(s) (or detector(s)) may be used to sense (or detect) information (e.g., signals) relating to at least one sensor in process chamber, and/or to the antenna, and/or the housing. At times, one or more antennas, e.g., antenna may be used as sensors. The sensors may be used to sense any information, including electromagnetic power, temperature, weight, humidity, motion, etc. The sensed information may be used for any purpose, including process verification, automation, authentication, safety, etc. Sensors for measuring at least one type of property data in one or more measurement locations and generating at least one measurement data signal. One or more measurement locations comprising environment of process chamber, bulk volume of particles in process chamber, inner housing, middle housing, outer housing, and outside of outer housing. Process monitoring sensor generates a signal that correlates to a measurement property comprising one or more selected from the group of: temperature, radio frequency, dielectric characteristics, resonance frequency, pressure, electrical conductivity, voltage, current, electrical permittivity, magnetic permeability, electrical field intensity, magnetic field intensity, magnetic flux density, infrared, electron density, or chemical composition of the environment in process chamber, or one or more substances residing in bulk volume of particles located in process chamber, or of another EM reactor system, or combination thereof.

"Transparent" in the context of RF antennas means that a material transmits RF radiation without changing the amplitude or phase of the RF radiation sufficiently to degrade the performance of the system.

Effects of each property must be considered individually and their combined effect with all other particles of a formula, material, or substance when designing a radio frequency dielectric dipole heating system. Two important electrical properties of materials which relate to the efficiency of heating using electromagnetic fields are conductivity and permittivity. Conductivity and permittivity are frequency dependent properties and consequently electromagnetic heating is frequency sensitive.

Considerations made for placement of antennas in relation to the process chamber should include containment of radiation to the confines of the process chamber and optimizing radiation exposure to bulk volume. An electrically isolated antenna when placed on or near the housing will be more apt to leak radiation to either the housing, or find another route to earth ground. An ideal location for an antenna to emit radiation for maximum absorption is in the center of the process chamber, which is typically the rotational axis of the mixer shaft. By placing one or more antennas in a hollow mixer shaft made of a material transparent to the radiation, a radiation field can be generated in the process chamber.

Although there are instances when it is not necessary for all of the particles in a bulk volume to remain in constant exposure to the radiation, typically, it will be preferable that once a bulk volume is being exposed to a radiation field that all of the particulate of the bulk volume remain exposed so as to not cease the molecular agitation. If an antenna is placed inside a shaft located at the center of the mixer, then often it will be preferred for as the EM field approaches the housing, to be near-completely absorbed by bulk volume of particles. If high temperatures are desired then a high-strength EM field throughout the process chamber maybe necessary and insulated accordingly.

BRIEF DESCRIPTION OF THE DRAWINGS

FIG. 5A is an isometric view of an electromagnet reactor according to the invention showing a convective type of continuous mixer that has a closed electrical loop with a linear antenna located in a hollow mixer shaft that is transparent to radio frequency waves for optimum exposure to and subsequent absorption by particulate in process chamber. Three types of vanes for creating or moving a mixture in a convective type of mixer are shown.

FIG. 5B is a cut view taken in the direction of the area indicated by area indicated by line 5B-5B of FIG. 5A.

FIG. 6A is an isometric view of an electromagnet reactor according to the invention showing a convective type of continuous mixer that has a RF source with a monopole antenna located in a hollow mixer shaft that is transparent to radio frequency waves for optimum exposure to and subsequent absorption by particulate in process chamber. Rotary valve gates are placed at inlet and discharge to regulate flow of material and contain radio frequency waves to process chamber.

FIG. 6B is a cut view of the area taken in the direction indicated by line 6B-6B of FIG. 6A to more clearly show the internal components.

FIG. 9A is an isometric view of an electromagnet reactor according to the invention showing a convective type of batch mixer that has a dipole antenna system placed in two mixer shafts with cavities surrounded by a radome aperture for exposure to particulate in a twin shaft process chamber.

FIG. 9B is a cut view taken in the direction of the area indicated by line 9B-9B of FIG. 9A.

FIG. 10A is an isometric view of an electromagnet reactor according to the invention showing a convective type of batch mixer that has a dipole antenna system placed in a cavity of a vane, or its support bar with a radome material aperture that rotates around lengthwise axis of mixer shaft to expose an electric and/or magnetic field to particulate in process chamber.

FIG. 10B is a cut view of the area taken in the direction indicated by line 10B-10B of FIG. 10A to more clearly show the internal components.

FIG. 10C is a cut view of the area taken in the direction indicated by line 10C-10C of FIG. 10B to more clearly show the induction coupler, sensors, dipole antennas, and housing system.

FIG. 11A is an isometric view of an electromagnet reactor according to the invention showing a convective type of batch mixer with a helical rod antenna placed in a cavity of a helical vane that rotates around lengthwise axis of mixer shaft to exposure'particulate in process chamber to an electric and/or magnetic field.

FIG. 11D is an enlarged front elevational view of the area in FIG. 11D indicated by line 11D of FIG. 11B to more clearly show the internal components.

FIG. 11E is an enlarged front elevational view of the area in FIG. 11E indicated by line 11E of FIG. 11B to more clearly show the internal components.

FIG. 12A is an isometric view of an electromagnet reactor according to the invention showing an isometric view of an electromagnetic reactor depicting five different embodiments of a radio frequency (RF) signal generating circuitry system that provides electromagnetic energy to particulate in process chamber.

FIG. 12C is an enlarged front elevational view of the area in FIG. 12C indicated by line 12C of FIG. 12B to more clearly show the internal components.

FIG. 12D is an enlarged front elevational view of the area in FIG. 12D indicated by line 12D of FIG. 12C to more clearly show the internal components.

FIG. 13A is an isometric view of an electromagnet reactor according to the invention showing an isometric view of an electromagnetic reactor that depicts two different embodiments of a variable frequency radio frequency (RF) signal generating circuitry system to vary an electromagnetic energy.

FIG. 13C is an enlarged front elevational view of the area in FIG. 13C indicated by line 13C of FIG. 13B to more clearly show systems.

FIG. 13D is an enlarged front elevational view of the area in FIG. 13D indicated by line 13D of FIG. 13B to more clearly show systems.

FIG. 13E is an enlarged front elevational view of the area in FIG. 13E indicated by line 13E of FIG. 13B to more clearly show systems.

FIG. 14C is a cut end elevational view of the area taken in the direction indicated by line 14C-14C of FIG. 14B to more clearly show systems FIG. 14D is an enlarged end elevational view of the area in FIG. 14D indicated by line 14D of FIG. 14B to more clearly show systems.

FIG. 14G is a cut view of an enlarged front elevational area in FIG. 14G indicated by line 14G of FIG. 14F to more clearly show systems.

FIG. 14L is a cut view of an enlarged front elevational area in FIG. 14L indicated by line 14L of FIG. 14F to more clearly show system.

FIG. 14M is a view of sensing system circuitry to input bus and output bus circuitry to systems.

FIG. 15A is an isometric view of an electromagnet reactor according to the invention showing an isometric view of an electromagnetic reactor depicting a mixing system with an antenna rotating inside of a second mixing system with an antenna.

FIGS. 5A AND 5B

FIG. 5A is an isometric view that shows an apparatus of a radiation reactor system 100 that comprises a radio frequency system 101 for radiating an electric or magnetic field with an antenna 114 located inside a rotating shaft 141 with both a transparent (radome) aperture and at least one vane 143, 145, 147 inside chamber 140 of mechanical movement system 104 for forward movement of bulk volume of particles and/or to cause bulk volume of particles to be in a near-uniform or uniform state in chamber 140, and a power system 105 to energize mechanical movement system 104. System 100 is the simplest embodiment of this invention while providing all of the desired characteristics. System 100 can refer to an apparatus, or a means, or a method.

Figure 1:
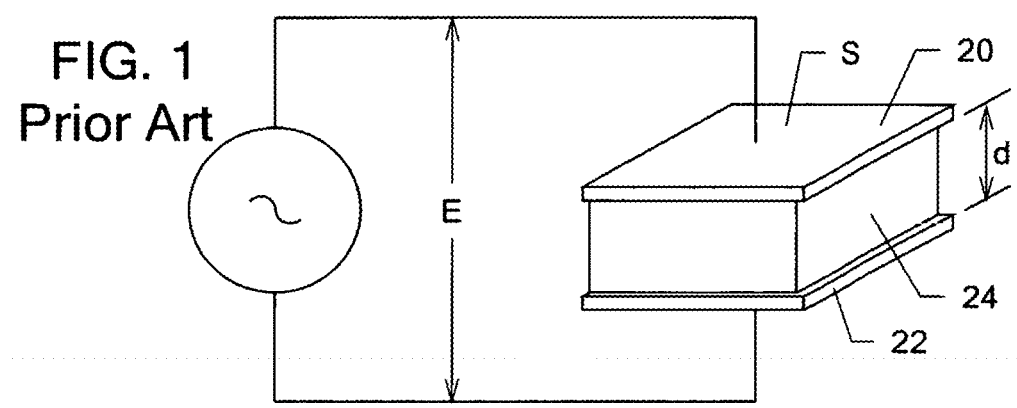
FIG. 1 (Prior Art) is a schematic diagram of an existing capacitive RF dielectric heating system.
Figure 2A:
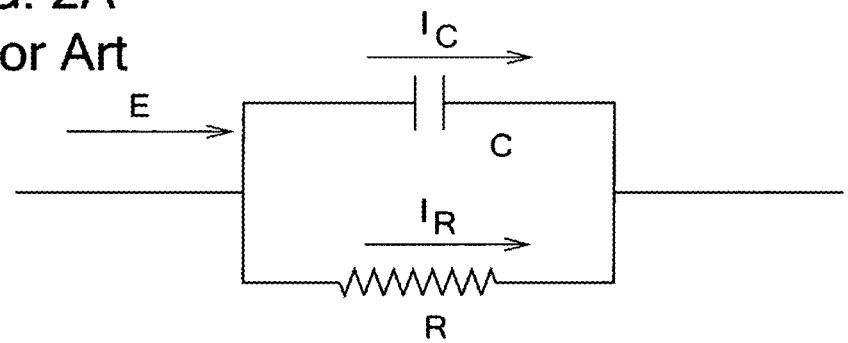
FIGS. 2A, 2B and 2C (Prior Art) are equivalent circuit diagrams of the dielectric heating system of FIG. 1 for different types of substances.
Figure 2B:
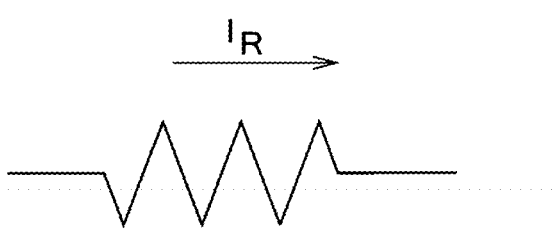
Figure 2C:
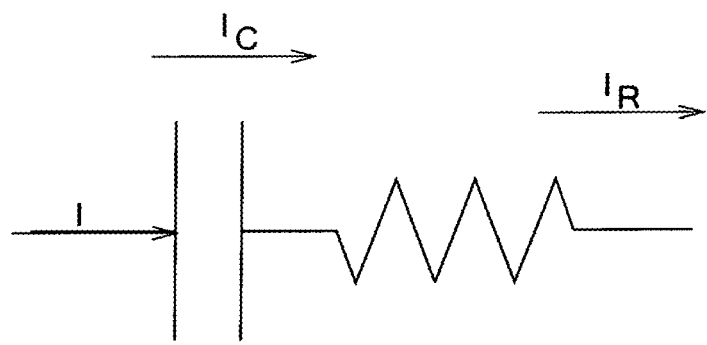
Figure 3:
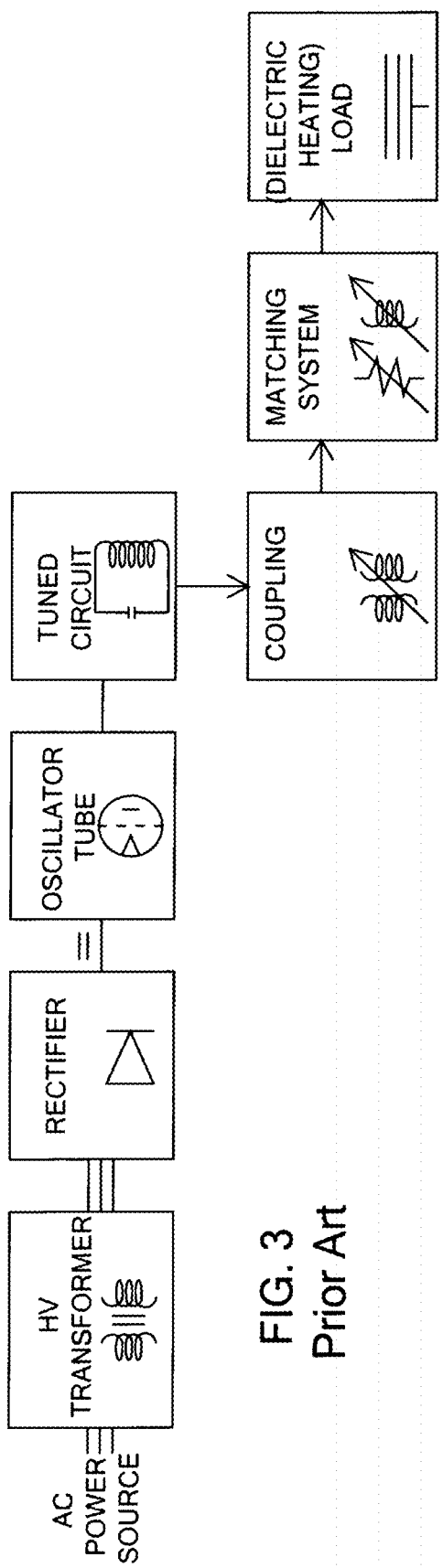
FIG. 3 (Prior Art) is a block diagram of the dielectric heating system of FIG. 1.
Figure 4:
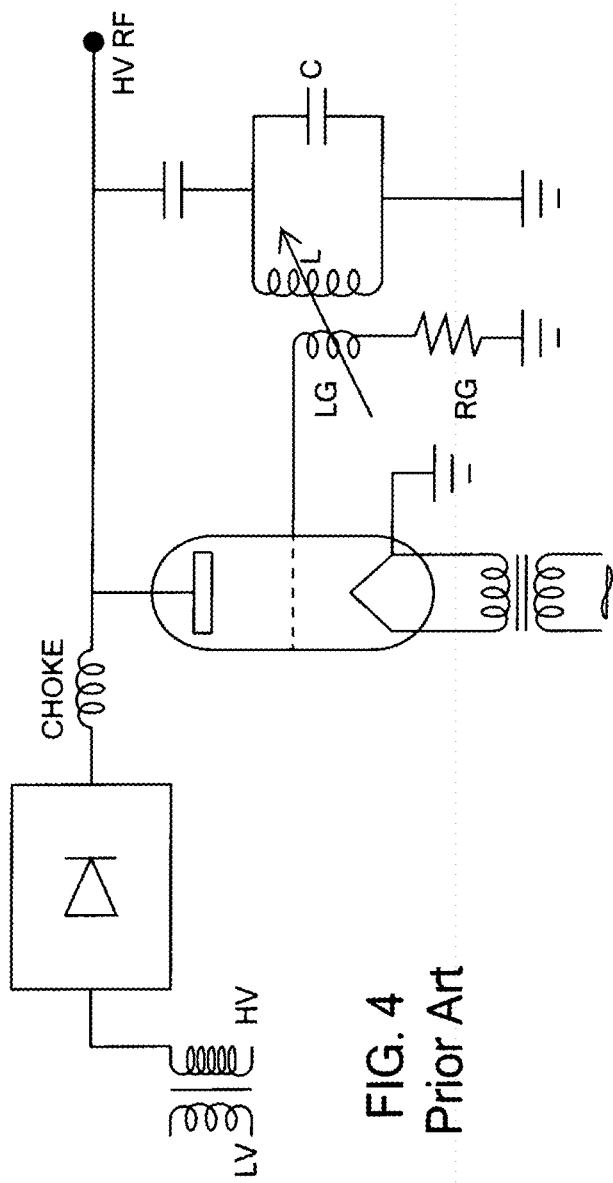
FIG. 4 (Prior Art) is a block diagram showing the high-power RF signal generation section of the dielectric heating system of FIG. 3 in greater detail.

Radio frequency system 101 is comprised of a radio frequency (RF) source 110, a forward circuit 111, a reverse circuit 112, insulation and shielding 113 for circuit 111 and 112, and a linear antenna 114. Typically, circuit 111 and 112 are balanced.

A radio frequency electrical current source is electrically connected to the linear antenna 114 at a first circuit point and a spaced second circuit point to create a closed electrical loop. The radio frequency source 110 is configured to apply a signal to the antenna 114 sufficient to create a magnetic field and electric field relative to the axis of the linear antenna 114.

The magnetic near fields surrounding the linear antenna 114 cause eddy electric currents to form in the bulk volume in chamber 140 by inductive coupling. The eddy electric currents then heat the bulk volume by resistance heating or joule effect, such that the heating is a compound process. The antenna 114 is akin to a transformer primary winding and the ore the secondary winding, although windings do not exist in the conventional sense. The magnetic near field mode of heating is reliable as it does not require liquid water contact with the antenna 114. The electric currents flowing along the antenna 114 surfaces create the magnetic fields, and the magnetic fields curl in circles around the axis of antenna 114.

Supports system 102 comprises earth 120, supports 121 between earth 120 and a housing system 103, and a power system 105. Supports 121 comprising any or all structure and materials between housing system 103 and earth 120.

Housing system 103 comprises a bottom portion 130 which is rounded or downwardly semi-circular base portion, an upper portion 131, and two end plates 132. The upper portion can be extended to form a wall (not shown) or upwardly semi-circular. Housing system 103 includes an inlet 125 for bulk volume of particles to enter chamber 140 and a discharge 126 for bulk volume of particles to exit the chamber 140.

A system for mechanical movement of bulk volume of particles 104 is positioned within the base portion of housing 103 for rotation about a lengthwise rotational axis 1200 and includes a rotational path 1000 with an outer periphery of vanes 143, 145, 147 that is closely spaced with the inside housing of the base portion 130. Movement system 104 comprising a shaft 141 with a portion of the shaft 141 projecting outwardly from at least one end wall 132 of housing 103 with a ribbon flighting type of vane 145 mounted on support arms 142 that project outwardly from the shaft 141. Shaft 141 rotates on bearings 153. The ribbon vane 145 define the rotational path of the movement system 104. The vane(s) 143, 145, 147 may be angled with respect to the axial dimension of the housing system 503 bowl for promoting mixing or conveying of the bulk volume of particles within the bowl. The length of shaft 141 exposing antenna 114 to bulk volume of particles in process chamber 140 is constructed of a radome material transparent to the EM energy of reactor 100, such as Teflon or Pyrex.

Mechanical movement system 104 in FIG. 5B shows three types of arms 142, 144, 146 with cut and folded flighting 143, ribbon flighting 145, and paddle 147. Movement system 104 includes a drive shaft 141 positioned along the rotational axis 1200, with a portion of the shaft 141 projecting outwardly of at least one end wall 132 of the reactor housing 103. Electrical circuit 111, 112 between the RF source 110 and the antenna 114, and delivers the RF signals from the RF source 110 to the antenna 114. In some embodiments, circuits 111, 112 are contained within a conduit. In some embodiments, the RF source 110 begins generating RF signals that are delivered to the antenna 114 through the circuit 111 and 112. The RF signals are converted into electromagnetic energy, which is emitted from the antenna 114 in the form of electromagnetic field which produces a reactive field in the process chamber 140. The electromagnetic field causes both conductive and dielectric heating to occur, primarily due to the molecular oscillation of polar molecules present in the bulk volume located in the process chamber 140. The RF heating continues until a desired temperature or chemical reaction has been achieved by the bulk volume of particles in the process chamber 140. In some embodiments the power of the electromagnetic energy delivered is varied during the heating process (or intermittently cycled ON and OFF) as needed to achieve a desired heating profile.

The possible variations in conveyor screw as use for a mechanism to uniformly expose RF radiation to its contents are almost limitless. When handling dry materials, mixing action results if the cross-sectional load is larger than the face of the flight. Ribbon conveyor screws are a continuous, convective, low to medium-shear mixer and often used in mixing applications, especially for those in which it is advantageous to combine mixing and conveying. Double flight ribbon mixing conveyor screws (not shown) consist of an outer ribbon conveyor screw with a smaller diameter inner ribbon of the opposite hand. The pitch of the inner and outer screws is the same. This design moves the material back and forth imparting a thorough mixing action while conveying and is ideal to handle sticky materials, which is a perfect environment for exposing a bulk volume to a radiation field.

By cutting deep notches in the flight (this is known as cut flights 143) a very efficient mixing action of dry materials is created, particularly at high speeds. The material is chopped and agitated as it is conveyed and is also useful when conveying materials which tend to ball or lump. Cut and folded construction creates an even greater agitation than cut flights alone. Any standard conveyor screw of either cut flight or cut and folded flight can be fitted with paddles for additional mixing action and to further retard the flow of material. For the greatest stirring action when conveying efficiency is not important, the flighting can be eliminated entirely resulting in a paddle 147.

A motor 150 and speed reduction 130 power system 105 is provided for rotation 1000 of the mechanical movement system 104 about the rotational axis 1200. The mechanical movement 104 ribbon 145 conveyor screws are a continuous, convective, low to medium-shear mixer and often used in mixing applications, especially for those in which it is advantageous to combine mixing and conveying. When handling dry materials, mixing action results if the cross-sectional load is larger than the face of the flight.

FIGS. 6A and 6B: Detailed Example of Monopole Radio Frequency System in a Convective Type, Continuous Mixer with an Inlet Rotary Gate System FIG. 6A is an isometric view that shows an apparatus of an electromagnetic reactor system 200 that comprises a monopole antenna 214 located inside a rotating shaft 241 with both a radome aperture and at least one vane 145 inside chamber 240. Mechanical movement system 204 for forward movement of bulk volume of particles or to cause bulk volume of particles to be in a near-uniform or uniform state, or combination thereof, inside of housing system 103. Mechanical movement system 204 receives rotational movement from power system 105. System 200 can refer to an apparatus, or a means, or a method.

Radio frequency system 201 is comprised of radio frequency (RF) source 210, a forward circuit 211, a reverse circuit 212, insulation and shielding 113 for circuits 211 and 212, and one or more monopole antenna 214.

A mechanical movement system 204 is positioned within the base portion of a housing 130 for rotation 1201 about an axis 1001 that is lengthwise and center of shaft 241 and includes a rotational path 1201 of vane 145 that is closely spaced with the inside wall of the base portion 130. Movement system 204 comprises a shaft 241 with a portion of the shaft 241 projecting outwardly from at least one end wall 132 of housing 103 with a ribbon flighting type of vane 145 mounted on support 144 that project outwardly from the shaft 241. A motor 150 and speed reduction 130 coupled 151 together to form power system 105 is provided for rotation 1001 of the mechanical movement system 104 about the rotational axis 1201. Shaft 241 rotates on bearings 153. The angle of a vane(s) 145 define the rotational path 1201 of the agitator. The vane(s) 145 may be angled with respect to the axial dimension of the bowl for promoting mixing of the product within the bowl. The length of shaft 241 exposing EM energy from antenna 214 is constructed of a material that is transparent to the radiation, known as radome, such as Teflon, or Pyrex, or Corning fused silica.

System 200 includes an incoming rotary valve 206 and an outgoing rotary 207 to regulate the bulk volume of particles in 125 and out of the reactor 200 and to contain the radio frequency to the process chamber 240.

Figure 7A:
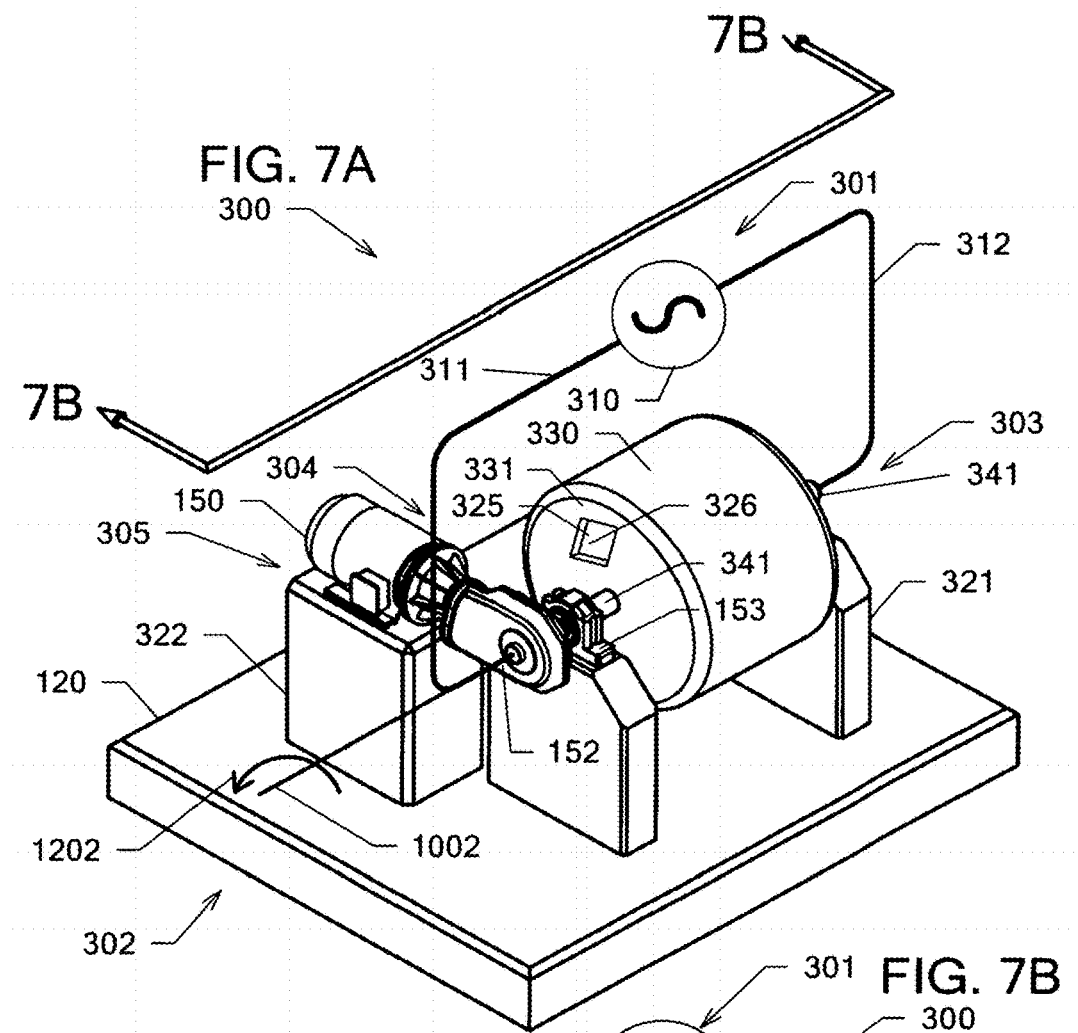
FIG. 7A is an isometric view of an electromagnet reactor according to the invention showing a diffusive type of batch mixer that has a RF source with a dipole antenna system placed in a cavity of a mixer shaft for exposure and subsequent absorption by particulate in process chamber.
Figure 7B:
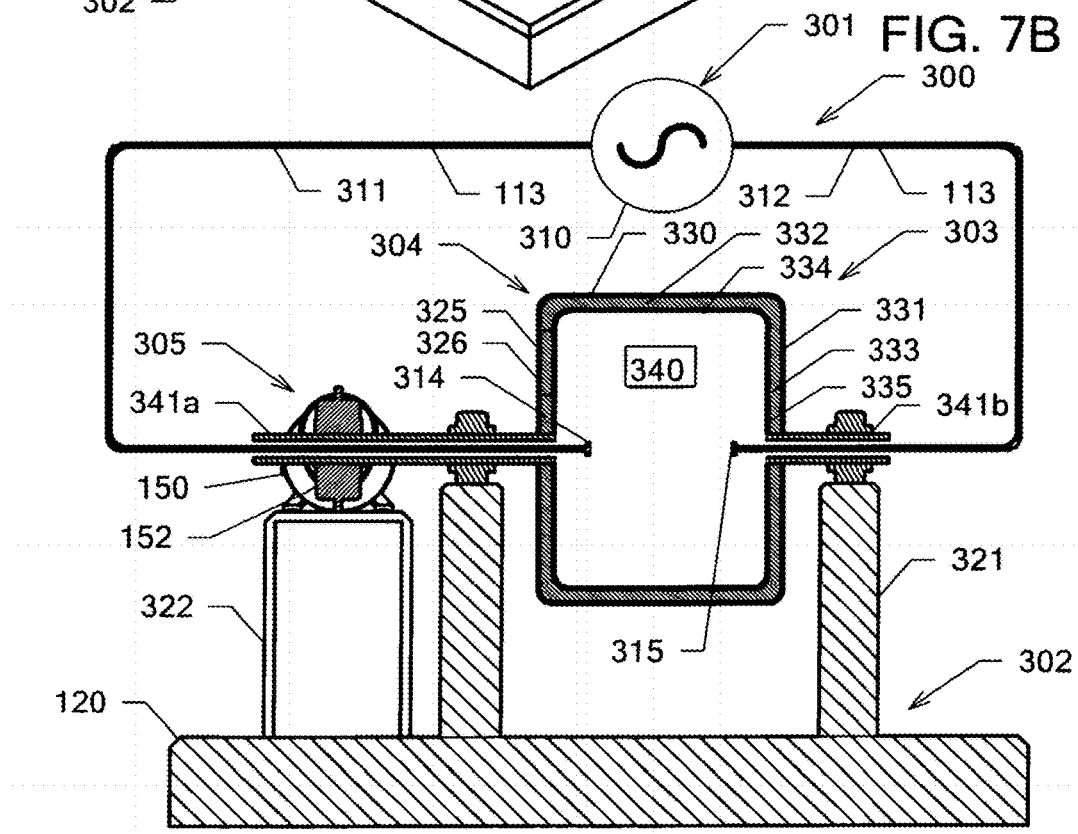
FIG. 7B is a cut view taken in the direction of the area indicated by line 7B-7B of FIG. 7A.

FIGS. 7A and 7B: Detailed Example of Dipole Radio Frequency System in a Diffusion Type, Batch Mixer with a Common Inlet and Discharge FIG. 7A is an isometric view that shows an apparatus of a radiation reactor system 300 that comprises a dipole antenna radio frequency system 301 for radiating an electric or magnetic field inside of housing system 303, convective diffusion type of-continuous mechanical system 304 for movement of bulk volume of particles in a near-uniform or uniform state inside of housing system 303, and a power system 305 to power mechanical movement system 304. System 300 can refer to an apparatus or a method.

Radio frequency system 301 is comprised of radio frequency (RF) source 310, a forward circuit 311, a reverse circuit 312, insulation and shielding 113 for cables 311 and 312, and a forward antenna 314 and reverse antenna 315.

A tumble mixer is a diffusion mixer that is essentially a hollow vessel 330 that rotates 1202 on its horizontal axis 1002. Shaft 341*a* and 341*b* rotates on bearings 153.

Figure 8A:
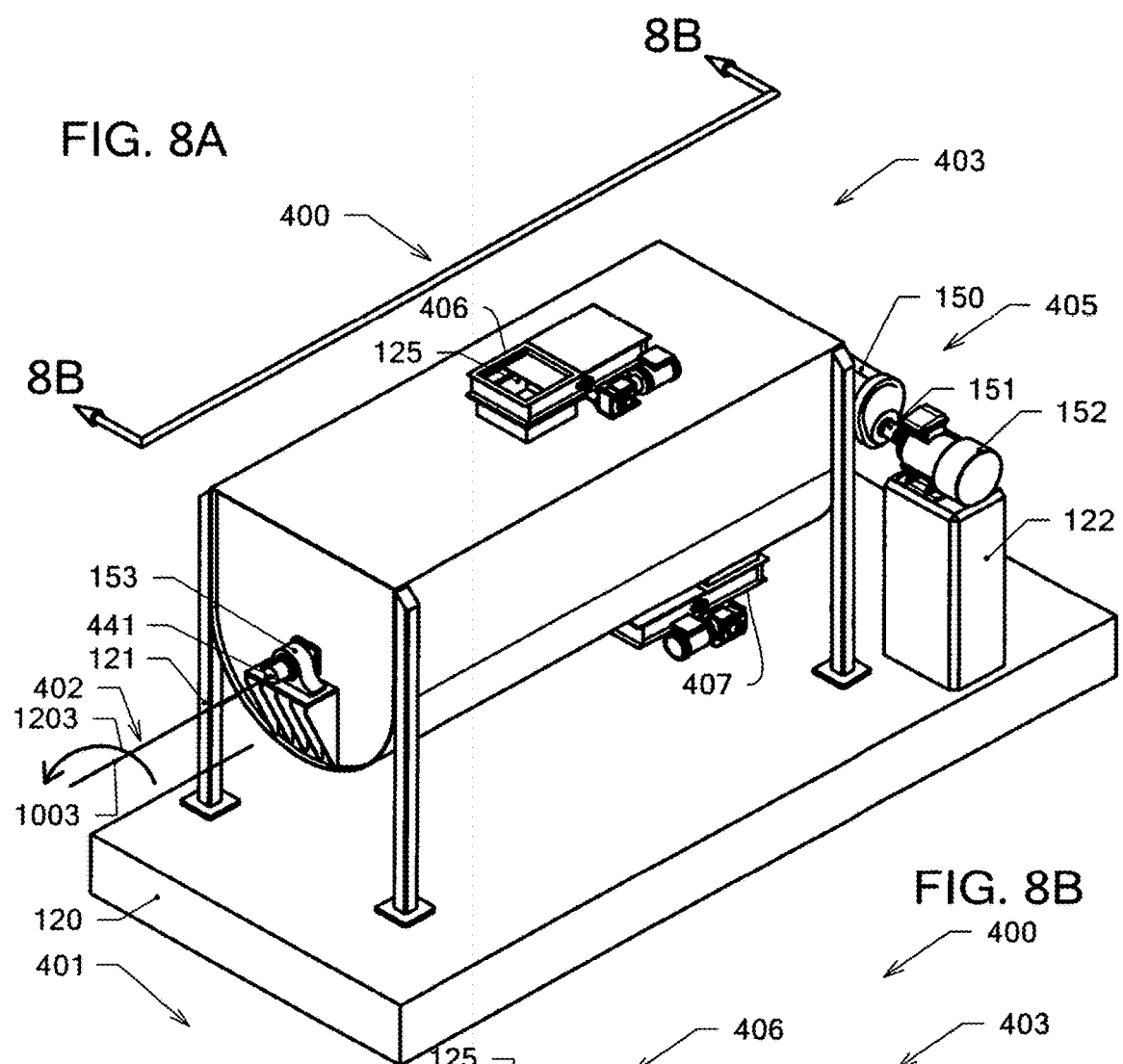
FIG. 8A is an isometric view of an electromagnet reactor according to the invention showing a convective type of batch mixer that has uses powerful rare earth magnets as RF signal source placed in a cavity of a shaft with support bars with EM Energy transparent aperture for even exposure to particulate in process chamber.
Figure 8B:
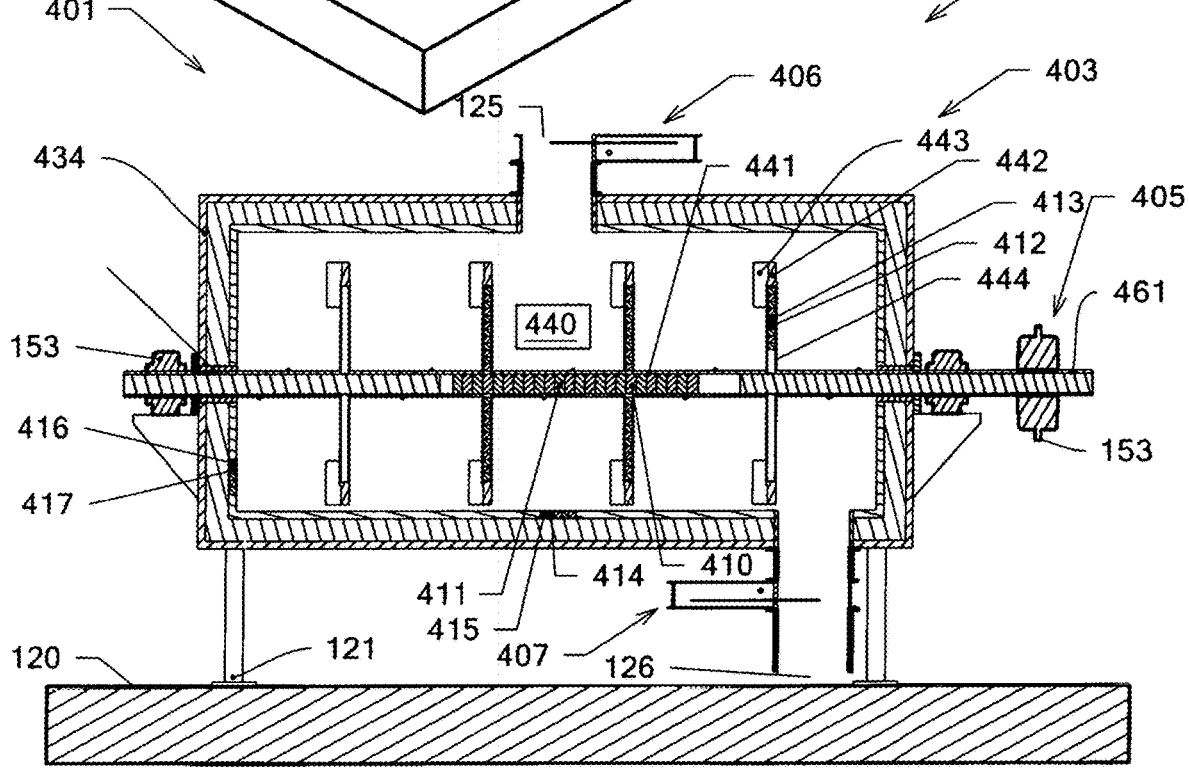
FIG. 8B is a cut view taken in the direction of the area indicated by line 8B-8B of FIG. 8A.

FIGS. 8A and 8B: Detailed Example of Permanent Rare Earth Magnet Radio Frequency System in a Convective Type, Batch Mixer with an Inlet and Discharge Slide Gate System FIG. 8A is an isometric view that shows an apparatus of an electromagnetic reactor system 400 that comprises a permanent magnet system 401 for radiating an electric or magnetic field inside of a convective type of mechanical movement system 404 for movement of bulk volume of particles in a near-uniform or uniform state inside of housing system 403, and a power system 405 to power mechanical movement system 404. System 400 can refer to an apparatus or a method.

Radio frequency system 401 is comprised of permanent rare earth magnets 410 with spacers 411, 413, 415, 417 between magnets 410, 412, 414, and 416.

A mechanical movement system 404 is positioned within the base portion of housing 403 for rotation about a preferably horizontal rotational axis 1003 and includes a rotational path 1203 with an outer periphery 445 that is closely spaced with the inside wall of the base portion 422. Movement system 404 comprises a shaft 441 with a portion of the shaft 440 projecting outwardly with a paddle flighting type of vane 443 mounted on support arms 442 that project outwardly from the shaft 441. Shaft 441 rotates on bearings 153. The vanes 443 define the rotational path 1203 of the agitator. The vanes 443 may be angled with respect to the axial dimension of the bowl for promoting mixing of the product within the bowl. The length of shaft 441, support bar 442 exposing radiation from system 401 is constructed of a material that is transparent to the radiation, such as teflon.

System 400 includes an incoming slide gate 406 and an outgoing slide gate 407 to regulate the flow of materials in and out of system 400 and to contain the radio frequency to the process chamber.

FIGS. 9A and 9B: Detailed Example of Dipole Radio Frequency System in a Conductive Type, Batch Mixer FIG. 9A is an isometric view that shows an apparatus of a radiation reactor system 500 that comprises a dipole antenna radio frequency system 501 for radiating an electric or magnetic field inside of a convective type of mechanical movement system 504 for movement of bulk volume of particles in a near-uniform or uniform state inside of housing 503, and a power system 505 to power mechanical movement system 504. System 500 can refer to an apparatus or a method.

Radio frequency system 501 is comprised of radio frequency (RF) source 510, a forward circuit 511, a reverse circuit 512, insulation and shielding 113 for circuits 511 and 512, and a forward antenna 514 and reverse antenna 515. Shaft 541 has a clockwise rotational path 1204 around lengthwise axis 1004 of shaft 541. Shaft 544 has a counter-clockwise rotational path 1205 around lengthwise axis 1005 of shaft 544.

Twin shafts 541 and 544 with paddles 543 and 546 are mounted in a 'w' shaped trough. Overlapping motion and paddle design facilitates rapid fluidization and ensures excellent movement of particles. Twin shafts 541 and 544 with counter-rotating paddles 543 and 546 lift the particles in the center of the mixer trough 530, known as the in the fluidized zone, where mixing takes place in a weightless state. Forward antenna 514 is located in shaft 541 and reverse antenna 515 is located in shaft 544 and EM energy flow in between creating an EM field in the fluidized zone (process chamber 540).

The length of shaft 541, 544 and support arms 542, 545 exposing radiation from antenna 514 and 515 is constructed of a material that is transparent to the radiation, known as a radome materials, such as Teflon, Pyrex, or Corning fused silica.

FIGS. 10A, 10B, and 10C:

FIG. 10A is an isometric view of a radiation reactor 900 that is comprised of a radio frequency (RF) signal generating circuitry system 901 to provide electromagnetic energy, a support system 902 between earth ground and housing system 903, a mixing system 904 that is mounted in housing system 903 and energized by power system 905. Sensing system 906 to measure properties at one or more locations and communicate measurement data to computer system 909. A RF/EM cancellation system 907 that couples an out-of-phase frequency to various locations to cancel radio frequency signals or electromagnetic energy that has traveled beyond chamber 940, such as housing system 903 or support system 902, or openings into housing 903, such as for an inlet, discharge, or ducting to chamber 940. An air or gas circulation system 908 aids in controlling temperature of process chamber 940 and its contents by flowing air or process gas into process chamber 940. A computer system 909 communicating with input sensor system 906 or using a preprogrammed algorithm, or combination thereof, generates an output to systems 901, 904, 905, 906, 907, 908 to control reactor 900. Arrow 948 shows where incoming product enters inlet 981 of inlet system 988 into process chamber 940. Arrow 949 shows where product exiting from process chamber 940 exits through discharge 989 of discharge system 907 into process chamber 940. Systems 988, 907 typically have a gate (can be controlled by computer system 909) that restricts product flow when closed is not shown. Incoming gate (not shown) of system 988 and outgoing gate (not shown) of system 907 each can have a motor (not shown) that opens and closes gate. Gate of incoming system 988 receives control signal from computer system 909 from output bus 792 and circuit 960 and sends a control signal with circuit 961 to input bus 791 to computer system 909. Gate of outgoing system 907 receives control signal from computer system 909 from output bus 792 and circuit 962 and sends a control signal with circuit 963 to input bus 791 to computer system 909.

Electromagnetic (EM) system 901 depicted in FIGS. 10A to 10C comprising at least one RF signal generating circuitry 910, four circuits 911, 912, 914, 915, and two or more antennas 930, 931 in a dipole configuration. RF signal generating circuitry 910 comprising a RF signal generator. Antennas 930, 931 are comprised of a metallic material or a formed plasma. Antenna 930, 931 or a portion of circuits 914, 915, or combination thereof are located inside cavity 944 of shaft 941, support bar 942, or vane 943, or combination thereof.

A unique aspect of signal circuitry system 901 compared to previous examples in this application is that it comprises the use of an induction loop 916 coupled to an RF signal circuit 911, 912, 914, 915 connected to antennas 930, 931 so antennas can rotate around lengthwise axis of shaft 941 within housing system 903. Antennas 930 and 931 are coupled to RF signal generating circuitry 910 using an induction loop so antennas can rotate with shaft 941 and support bar 942. Forward circuit 911 is connected to an induction loop 916 and circuit 914 passing through loop 916 and connecting to forward antenna 930. Reverse circuit 912 is connected to induction loop 916 and circuit 915 passing through loop 916 and connecting to reverse antenna 931. Electromagnetic energy is radiated from rotating antennas 930 and 931 through transparent (radome material) aperture of shaft 941, support bar 942, or vane 943, or combination thereof into bulk volume of particles in process chamber 940, thereby heating or causing a biological or chemical reaction in at least one substance residing in bulk volume of particles from exposure to EM energy, and defining a process chamber 940.

Supports system 902 depicted in FIG. 10A comprises all supports 121 between earth ground and housing system 903 as well as components of power system 905 such as bearings 153 and motor 150 when they are not mounted on housing system 903.

Housing system 903 depicted in FIGS. 10A to 10C comprising an inner housing 421 nested inside of a middle housing 435, that together are nested inside of an outer housing 430. Inner housing 421 comprises a bottom half 422, an upper half 423, and two end plates 425. Middle housing 435 comprises a bottom half 436, an upper half 437, and two end plates 438. Outer housing 430 comprises a bottom half 431, an upper half 432, and two end plates 434.

Only one housing, inner housing 421, is required for housing system 903. However, some embodiments, especially those that need to absorb or insulate electromagnetic energy escaping chamber 940 can benefit from a multi-layered housing. In all embodiments, the inner housing bottom half will be rounded or downwardly semi-circular that is closely spaced with the rotational path of outer periphery 950 of paddle style vane 943. The upper half of inner housing can be extended to form a wall as show in FIG. 10A or upwardly semi-circular as shown in other figures of this disclosure. It is not necessary for the middle housing 435 or outer housing 430 to have the same shape or periphery as the inner housing 421.

There are a wide variety of embodiments for inner 421, middle 435, and outer 430 housing depending upon the application. If the bulk volume of particles to receive EM energy are a food product for human consumption, the inner housing 421 will have sanitation requirements that may not be compatible with a material suitable for insulating the radiation. Such an embodiment would require a sanitary inner housing that is transparent to radiation such as Pyrex, a middle housing 435 selected for its insulation properties that correspond to EM energy of system, and an outer layer typically non-metallic for structural integrity such as alumina. If the bulk volume of particles to be radiated are highly abrasive or hard, then a suitable material will have to be selected for inner housing. In another embodiment inner housing 421 comprising a reflective surface or material to reflect EM energy back into process chamber 940. In another embodiment inner housing 421 comprises a porcelain material. In another embodiment middle housing 435 comprises a liquid or gas jacket to absorb or reflect EM energy. In another embodiment middle housing 435 comprises a liquid or gas jacket to heat or cool process chamber 940 a portion of housing system 903, or combination thereof.

Mechanical movement system 904 depicted in FIGS. 10B and 10C comprises a shaft 941 with at least one support bar 942 projecting outward and connected to at least one vane 943. Shaft 941, support bar 942, or vane 943, or combination thereof comprise at least one cavity 944 for placement of circuit 911, 912, 914, 915, or antenna 930, 931, or combination thereof. The system 904 rotational axis 1210 is the lengthwise axis 1010 of shaft 941. In some embodiments shaft 941, support bar 942, or vane 943, or combination thereof comprise at least one aperture made of a material transparent to EM energy, often called a radome materials, such as Teflon or Pyrex. In another embodiment, circuit 911, 912, 914, 915, or antenna 930, 931 are embedded into shaft 941, support bar 942, or vane 943, or combination thereof. In another embodiment, support bar 942 or vane 943, or combination thereof are also an antenna 930, 931.

The mechanical movement of bulk volume of particles system 904 is positioned within the base (bottom half) portion of housing system 903 for rotation about lengthwise axis of shaft 941 with outer periphery 950 of vane 943 close to inside (facing process chamber 940) of inner housing 421. The angle of vane 943 defines the rotational path of the mechanical movement system 904. The vane 943 may be angled with respect to the axial dimension of the bottom half inner housing 422 for promoting movement, agitation, or mixing, or combination thereof, of bulk volume of particles within chamber 940.

Power system 905 depicted in FIGS. 10A through 10C comprising at least one motor 945 for providing mechanical rotational movement, an optional gearbox 152 for adjusting speed of rotational movement, and at least two bearings 153 mounted on outer housing end plates 434. Shaft 941 is mounted on bearings 153 that are mounted on outer housing housing end plates 434. Whereby power system 905 provides mechanical rotation to mechanical movement system 904 to create forward movement of bulk volume of particles or to create bulk volume of particles to be in a near-uniform or uniform state, or combination thereof, within process chamber 940.

Sensor system 906 depicted in FIGS. 10A through 10C comprising at least one process monitoring sensor 971, 972, 973, 974, 975, 976, 788, 977 connected to at least one computer 790 with an input bus 791. Process monitoring sensor(s) for measuring at least one type of property data in one or more measurement locations and generating at least one property data signal. One or more measurement locations comprising process chamber 940, inner housing 421, middle housing 435, outer housing 430, and outside of outer housing. Process monitoring sensor 971, 972, 973, 974, 975, 976, 788, 977 generates a signal that correlates to a measurement property comprising one or more selected from the group of: temperature, radio frequency, dielectric characteristics, resonance frequency, pressure, electrical conductivity, voltage, current, electrical permittivity, magnetic permeability, electrical field intensity, magnetic field intensity, magnetic flux density, infrared, or chemical composition of the environment in process chamber 940, or one or more substances residing in bulk volume of particles located in process chamber 940, or of system 902, 903, 905, 908, or combination thereof. Sensor 972 collects property data from area above mixing within process chamber 940 and communicates data with circuit 982 to input bus 791. Sensor 973 collects property data from mixing area within process chamber 940 and communicates data with circuit 983 to input bus 791. Sensor 974 collects property data from inner partition 421 and communicates data with circuit 984 to input bus 791. Sensor 975 collects property data from middle partition 435 and communicates data with circuit 985 to input bus 791. Sensor 976 collects property data from outer partition 430 and communicates data with circuit 986 to input bus 791. Sensor 977 collects property data from power transmission system 905 and communicates data with circuit 987 to input bus 791. Sensor 788 collects property data from area outside of EM containment, such as unwanted radiation leakage and communicates data with circuit 789 to input bus 791.

Phase cancellation system 907 depicted in FIGS. 10A through 10C comprising RF signal generating circuitry 917, circuits 956, 957, 958, 959, 965 and cancellation antennas 951, 952, 953, 954, 955. Phase cancellation occurs when two signals of the same frequency are out of phase with each other resulting in a net reduction in the overall level of the combined signal. If two identical signals are 100% or 180 degrees out of phase, they will completely cancel one another if combined. To isolate housing system 903 or other reactor 900 from electrical and/or magnetic fields traveling through structure 121 an electrical standoff(s) 780, 966 and/or phase cancellation antenna 952 can be placed on or integral to structure 121. To isolate housing system 903 or reactor 900 from electrical and/or magnetic fields traveling through air/gas system ductwork 923, 926, 927 an electrical standoff 929 and/or antenna 951 can be placed on or integral to the ductwork 923, 926, 927, 962. To isolate housing system 903 or reactor 900 from electrical and/or magnetic fields traveling through incoming gate system 988 an electrical standoff 581 and/or antenna 953 can be placed on or integral to inlet 465 (arrow 948). Antenna 953 receiving phase cancellation signal through circuit 959 from signal generating circuitry 917. To isolate housing system 903 or reactor 900 from electrical and/or magnetic fields traveling through discharge gate system 907 an electrical standoff 581 and/or antenna 954 can be placed on or integral to discharge (arrow 949). Antenna 954 receiving phase cancellation signal through circuit 965 from signal generating circuitry 917. To isolate housing system 903 or reactor 900 from electrical and/or magnetic fields traveling through shaft 941 an antenna 955 can be placed on or integral to shaft 941. Antenna 955 receiving phase cancellation signal through circuit 958 from signal generating circuitry 917. Signal cancellation circuitry 917 communicates with computer system 909 by receiving control signals through input bus 717 and sending data measurement and/or control signals through output bus 716.

Phase cancelling circuitry 917 comprising two or more selected from the group of: RF signal generator, multi-frequency synthesizer, RF signal output control, RF wave generator, RF generator with Silicon Carbide (SiC) transistors, power amplifier, induction loop 916, broadband power amplifier, directional coupler, impedance matching system, power supply, power meter, an oscillator, an inverter, a pulse synthesizer, a transformer, a low-to-high frequency converter, or frequency tuning circuitry. Cancellation antennas 951, 952, 953, 954, 955 comprised of a metallic material or a formed plasma. A cancellation antenna 951, 952, 953, 954, 955 can be located wherever a RF signal or EM energy might escape the confines of housing system 903, such as air duct 951, or support structure 952, or inlet 953, or discharge 954, or housing (not shown).

Air/gas circulation system 908 depicted in FIGS. 10A through 10C comprising equipment to pull (or vice versa) an air flow (arrow 946) into inlet duct 928 through ductwork 926 so air or gas flows into process chamber 940 and then exits (arrow 947) through ductwork 926, 927, 923 into a fan 919 with impeller 920 powered by motor 924 that are mechanically coupled with V-belt drive 925. The impeller 920 is located inside of housing 922 that directs air flow through an adjustable louver 918 that adjusts air flow before discharging 921. Sensor(s) 970, 971 collects property data from air/gas circulation system 908 and communicates data with circuit 980, 981 to input bus 791. Thereby controlling air or gas flow through process chamber 940 by activating motor 924 that transfers rotational movement to impeller 920 to build a negative pressure in housing 922 to pull air into inlet duct 928 and through process chamber 940 to affect the temperature of bulk volume of particles in process chamber 940, or to participate in a chemical reaction.

Computer system 909 depicted in FIGS. 10A through 10C comprising one or more computer 790 and an input bus 791, 716 or an output bus 792, 717, or combination thereof. Computer 790 for receiving and storing two or more property data measurements in stored memory of computer and determine one or more relationships between these two or more property measurements. By operation of computer 790 using one or more selected from the group comprising of: one or more relationships between sensed measurement data stored in memory of computer 790, or an algorithm programmed into stored memory of computer 790, or a recently sensed measurement data signal, or combination thereof, to generate one or more output control signals to one or more systems selected from the group comprising of: RF signal generating system 901, or frequency cancellation system 907, or power system 905, or air/gas system 908, or combination thereof, for operating EM reactor system 900. Thereby controlling a temperature or rate of heating, or combination thereof in bulk volume of particles located in process chamber 940 in response to a stored relationship, or a pre-programmed algorithm, or a recently sensed property data signal, or combination thereof.

FIGS. 11A, 11B, 11C, 11D, 11E and 11F:

FIG. 11A is an isometric view of a radiation reactor 1100 that depicts six different embodiments of a radio frequency (RF) signal generating circuitry system 1101, 1121, 1122, 1131, 1132, 1169 to provide electromagnetic energy, RF signal systems 1101, 1121, 1122, 1131, 1132 can be used individually as a standalone RF source, or combination thereof, a support system 1102 between earth ground and housing system 1103, a mechanical movement of bulk volume of particles system 1104 that is mounted in housing system 1103 and energized by power system 1105. Sensing system 1106 to measure properties at one or more locations and communicate measurement data to computer system 1109. A process gas system 1107 provides gas to EM reactor 1100 to aid in flow of EM energy, or chemical reaction, or to form a plasma. A computer system 1109 communicating with input sensor system 1106 or using a preprogrammed algorithm, or combination thereof, generates an output to at least one system 1101, 1104, 1105, 1106, 1107, 1110, 1111, 1121, 1122, 1131, 1132, 1169 to control reactor 1100. An incoming gate system 1110 regulates bulk volume of particles into EM reactor 1100. An outgoing gate system 1111 regulates bulk volume of particles into EM reactor 1100.

Electromagnetic (EM) system 1101 depicted in FIGS. 11A through 11E comprising at least one RF signal generating circuitry 1120, four circuits 1123a, 1123b, 1124a, 1124b and one more antenna 1119 in a single rod closed loop configuration. RF signal generating circuitry 1120 comprising one or more selected from the group of: RF signal generator, multi-frequency synthesizer, RF signal output control, RF wave generator, RF generator with Silicon Carbide (SiC) transistors, power amplifier, broadband power amplifier, directional coupler, impedance matching system, power supply, power meter, an oscillator, an inverter, a pulse synthesizer, a transformer, a low-to-high frequency converter, or frequency tuning circuitry. Antenna 1119 is comprised of a metallic material or a formed plasma. Antenna 1119 or circuits 1123a, 1124a, or combination thereof are located inside cavity 1155 of shaft 1140, or (not shown) support bar 1165, 1166, or vane 1157, 1158, or combination thereof.

A unique aspect of the embodiment of EM reactor 1100 compared to previous examples in this application is the use of a slip ring system 1108 which allows the transmission of electric AC/DC power, RF signals, fluid, or gas from stationary equipment to rotating mixing system 1104. A slip ring (in electrical engineering terms) is a method of making an electrical connection through a rotating assembly. Typically, a slip ring consists of a stationary graphite or metal contact (brush) which rubs on the outside diameter of a rotating metal ring. As the metal ring turns, the electric current or signal is conducted through the stationary brush to the metal ring making the connection. Additional ring/brush assemblies are stacked along the rotating axis if more than one electrical circuit is needed. Either the brushes or the rings are stationary and the other component rotates. EM reactor illustrates five different types of RF signal systems 1101, 1121, 1122, 1131, 1132 can be used individually as an EM reactor, or combination thereof, with a slip ring system 1108.

System 1101 comprising a rod antenna 1119 coupled to RF signal generating circuitry 1120 using a slip ring system 1108 so antenna 1119 can rotate 1211 with shaft 1140 cavity 1155, or (not shown) support bar cavity 1165, 1166, or vane cavity 1157, 1158, or combination thereof. Slip ring system 1108 comprising a rotating side 1050 with one or more ac/dc electric current connection pins 1051 and a stationary side 1052 with one or more ac/dc electric current connection pins 1053. Rotating side 1050 is connected to shaft 1140 so antenna can rotate arocablund lengthwise axis of shaft 1140 within housing system 1103. Forward circuit 1123b connects RF signal generating circuitry 1120 to stationary connection pin 1051 and forward circuit 1123a connects rotary connection pin 1053 to antenna 1119. Reverse circuit 1124b connects RF signal generating circuitry 1120 to stationary connection pin 1051 and reverse circuit 1124a connects rotating connection pin 1053 to antenna 1119. A RF signal transferred through slip ring system to radiate electromagnetic energy from rotating antenna 1119 of shaft 1140 cavity 1155, or support bar 1141, 1142 cavity 1165, 1166, or vane 1143, 1144 cavity 1157, 1158 or combination thereof into bulk volume of particles, thereby heating or causing a biological or chemical reaction in at least one substance residing in bulk volume of particles from exposure to EM energy, and defining a process chamber 1145.

Figure 11B:
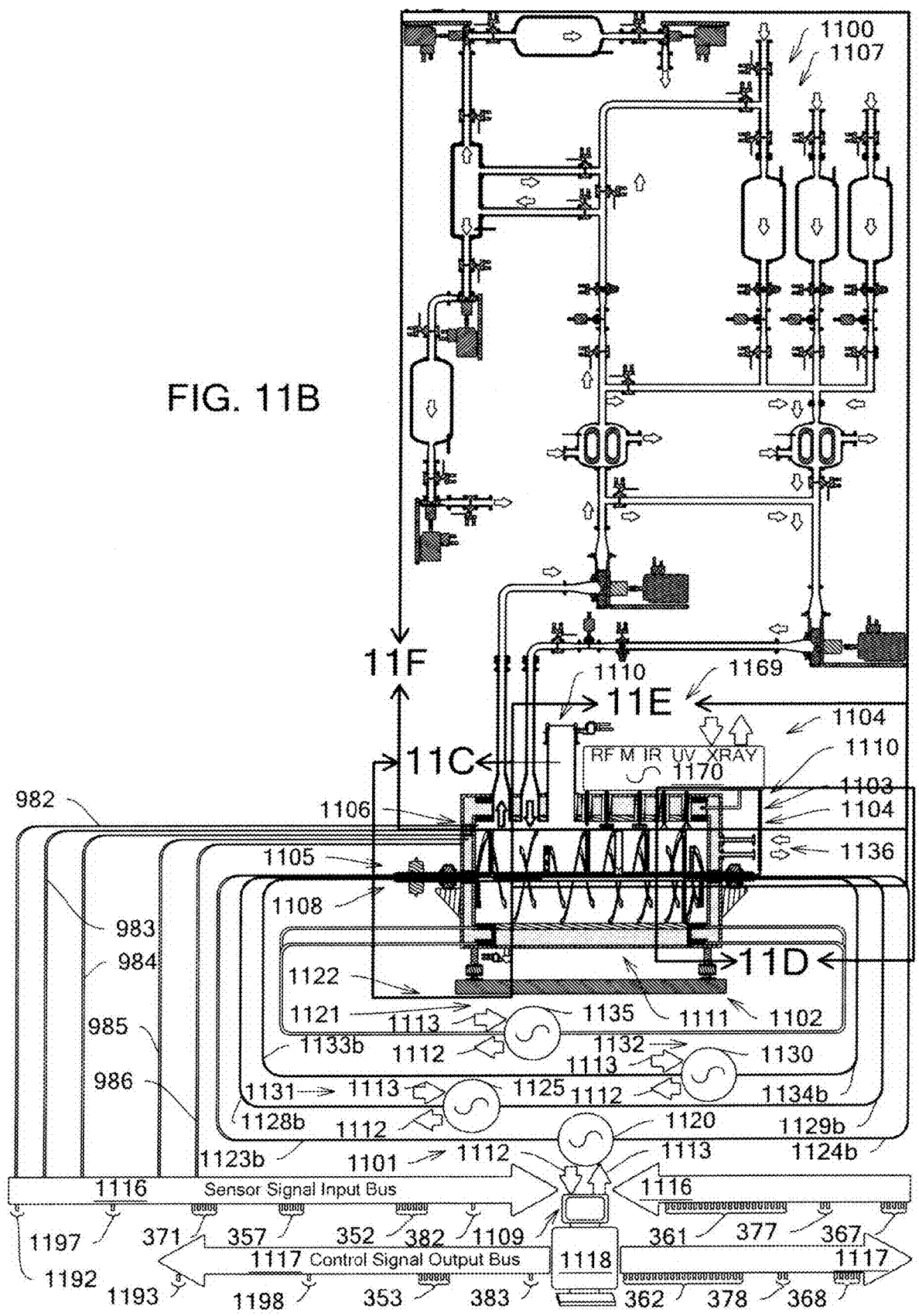
FIG. 11B is a cut front elevational view of the area taken in the direction indicated by line 11B-11B of FIG. 11A to more clearly show the internal components.
Figure 11C:
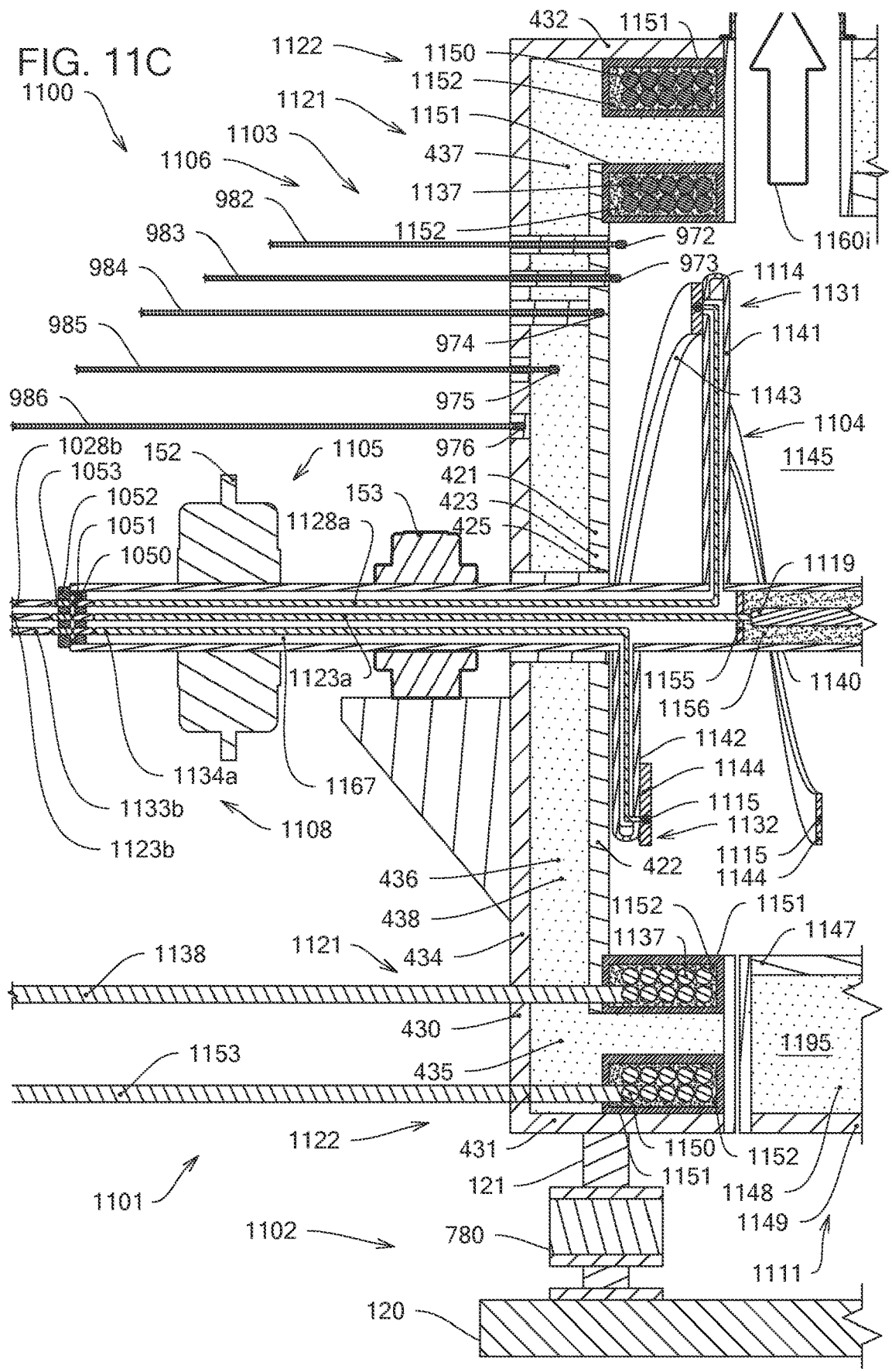
FIG. 11C is an enlarged front elevational view of the area in FIG. 11C indicated by line 11C of FIG. 11B to more clearly show the internal components.
Figure 11F:
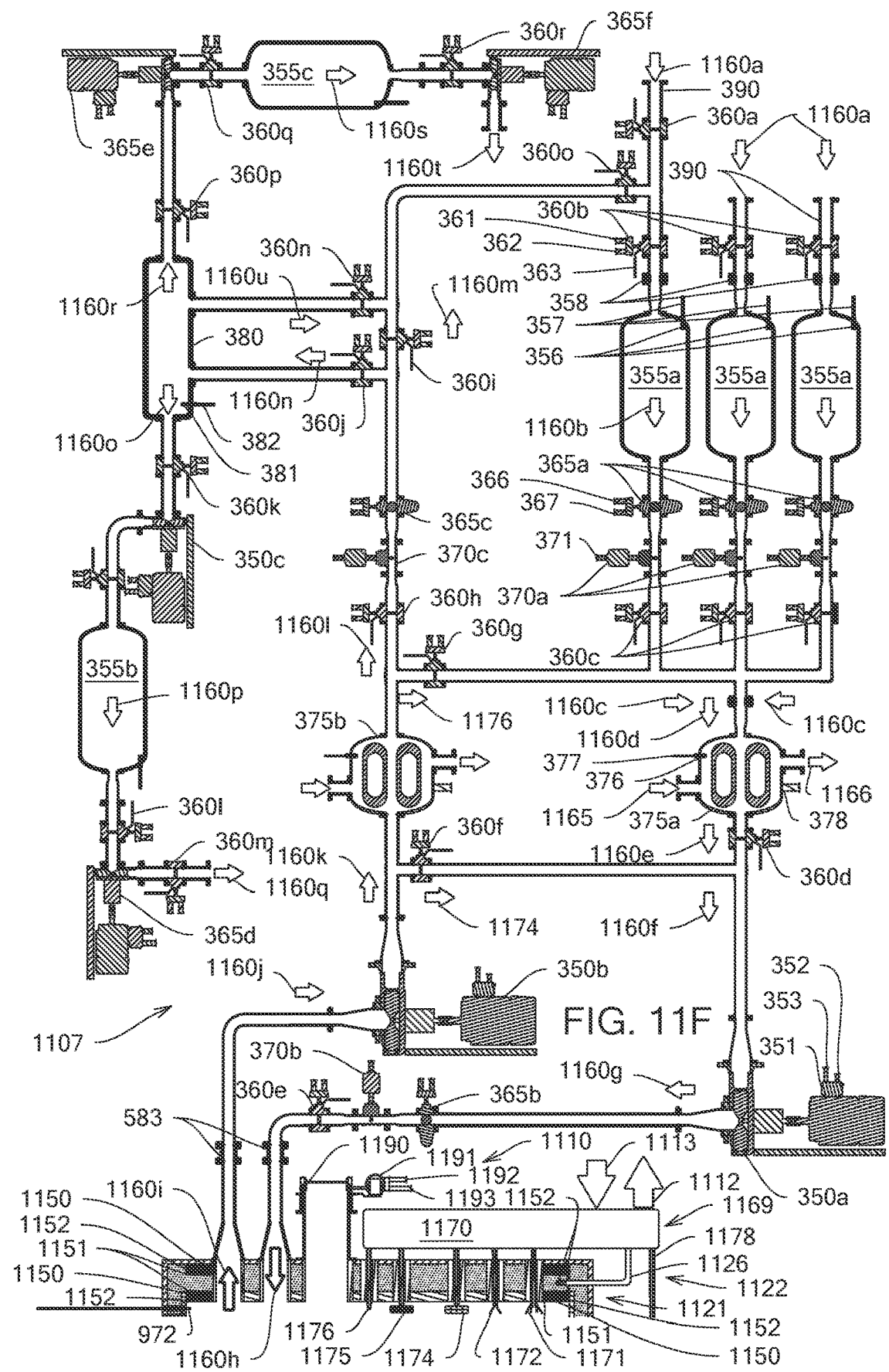
FIG. 11F is an enlarged front elevational view of the area in FIG. 11F indicated by line 11F of FIG. 11B to more clearly show the internal components.

Supports system 1102 depicted in FIGS. 11A, 11B, 11C comprises all supports 121 between earth ground and housing system 1103 as well as components of power system 1105 such as bearings 153 and motor 150 when they are not mounted on housing system 1103. Process fluid mechanical system 1107 depicted in FIGS. 11A and 11F comprising piping and mechanical equipment 390, valves 358, 360, 365, and sensors (351, 356, 366, 370, 376, 381) to receive 359a, store 355a, 355b, 355c mix, condition 375 (heat exchanger), pump 350 fluid into process chamber 1145, develop and hold process chamber 1145 in a vacuum, negative, or positive pressure, reclaim fluid from process chamber 1145, condition (heat exchanger 375), recycle/return to process chamber 359i, or return to storage, or go to separator 380 to be separated into at least two fractions, each of which can be stored, and pumped out of system 359q, 359t. In another embodiment mechanical system 1107 can provide cool or hot air or gas to process chamber 1145 with heat exchanger 375. In another embodiment mechanical system 1107 can provide the gas and environment to form a plasma in chamber 1145. Arrows 359a through 359t show flow through system 1107 depicted on FIG. 11F with arrow 1160h showing fluid entering process chamber 1145 and arrow 1160i showing fluid exiting chamber 1145. Process fluid system 1107 communicates with computer system 1109 by receiving control signals through input bus 1116 and sending data measurement and/or control signals through output bus 1117. Circuit 352 transmits pump sensor 351 measurement data to input bus 1116 and circuit 353 transmits control signals from output bus 1117 to pump 350. Circuit 357 transmits fluid storage sensor 377 measurement data to input bus 1116. Circuit 361 transmits flow control valve 360 sensor measurement data to input bus 1116 and circuit 362 transmits control signals from output bus 1117 to flow control valve 360. Circuit 367 transmits pressure valve 365 sensor 366 measurement data to input bus 1116 and circuit 368 transmits control signals from output bus 1117 to pressure control valve 365. Circuit 371 transmits sensor 370 measurement data to input bus 1116. Circuit 367 transmits pressure valve 365 sensor 366 measurement data to input bus 1116 and circuit 368 transmits control signals from output bus 1117 to pressure control valve 365. Circuit 377 transmits fluid conditioner 375 sensor 376 measurement data to input bus 1116 and circuit 378 transmits control signals from output bus 1117 to fluid conditioner 375. Circuit 382 transmits gas separator 380 sensor 381 measurement data to input bus 1116 and circuit 383 transmits control signals from output bus 1117 to gas separator 380. Circuit 1192 transmits incoming gate 1190 sensor 1191 measurement data to input bus 1116 and circuit 1193 transmits control signals from output bus 1117 to motor 1194 incoming gate 1190. Circuit 1197 transmits discharge gate 1195 sensor 1196 measurement data to input bus 1116 and circuit 1198 transmits control signals from output bus 1117 to motor 1194 discharge gate 1195. Process fluid system 1136 depicted in FIGS. 10A and 10D provides a fluid to middle partition 435 for cooling or heating of process chamber 1145 and/or fluid for absorption or reflection of an electric and/or magnetic field and/or fluid used to form a plasma to act as an antenna to transmit or receive one or more EM frequencies and/or plasma to absorb or reflect an electric and/or magnetic field. Process fluid system 1136 is comprised of similar equipment and configuration as process fluid system 1107 and for descriptive purposes refer to system 1107.

Housing system 1103 depicted in FIGS. 11A, 11C, 11D comprises an inner housing 421 nested inside of a middle housing 435, that together are nested inside of an outer housing 430. Inner housing 421 comprises a bottom half 422, an upper half 423, and two end plates 425. Middle housing 435 comprises a bottom half 436, an upper half 437, and two end plates 438. Outer housing 430 comprises a bottom half 431, an upper half 432, and two end plates 434.

Only one housing, inner housing 421 is required for a housing system 1103. However, some embodiments, especially those that need to absorb or insulate electromagnetic energy escaping chamber 1145 can benefit from a multi-layered housing. In all embodiments the inner housing bottom half 422 will be rounded or downwardly semi-circular that is closely spaced with the rotational path of outer periphery 950 of ribbon style vane 943. The upper half of inner housing can be extended to form a wall as show in FIG. 11A or upwardly semi-circular as shown in other figures of this disclosure. It is not necessary for the middle housing 435 or outer housing 430 to have the same shape or periphery as the inner housing 421.

There are a wide variety of embodiments for inner 421, middle 435, and outer 430 housing depending upon the application. If the bulk volume of particles to receive EM energy are a food product for human consumption, the inner housing 421 will have sanitation requirements that may not be compatible with a material suitable for insulating the radiation. Such an embodiment would require a sanitary inner housing that is transparent to radiation such as Pyrex, a middle housing 435 selected for its insulation properties that correspond to EM energy of system, and an outer layer typically non-metallic for structural integrity such as alumina. If the bulk volume of particles to be radiated are highly abrasive or hard, then a suitable material will have to be selected for inner housing. In another embodiment inner housing 421 comprises a reflective surface or material to reflect EM energy back into process chamber 1145. In another embodiment inner housing 421 comprises a porcelain material. In another embodiment middle housing 435 comprises a liquid or gas jacket to absorb or reflect EM energy. In another embodiment middle housing 435 comprises a liquid or gas jacket to heat or cool process chamber 1145 a portion of housing system 1103, or combination thereof.

Mechanical movement system 1104 depicted in FIGS. 11B, 11C, 11D comprises a shaft 1140 with at least one support bar 1141, 1142 projecting outward and connected to one or more ribbon vanes 1143, 1144. Shaft 1140, support bar 1141, 1142, or ribbon vane 1143, 1144, or combination thereof comprise at least one cavity 1155, 1165, 1166 for placement of circuit 1123*a*, 1123*b*, 1124*a*, 1124*b* or antenna 1119 or combination thereof. The system 1104 rotational axis 1211 is the lengthwise axis 1011 of shaft 1140. In some embodiments shaft 1140, support bar 1141, 1142, or ribbon vane 1143, 1144, or combination thereof comprise at least one aperture made of a material transparent to EM energy, such as Teflon or Pyrex. In another embodiment, circuit 1123*a*, 1124*a*, or antenna 1119 are embedded into shaft 1140, support bar 1141, 1142, or ribbon vane 1143, 1144, or combination thereof. In another embodiment the shaft 1140, support bar 1141, 1142, or ribbon vane 1143, 1144, or combination thereof also serve as antenna 1119.

The mechanical movement of bulk volume of particles system 1104 is positioned within the base (bottom half) portion of housing system 1103 for rotation about lengthwise axis of shaft 1140 with outer periphery 1164 of outer ribbon vane 1143 close to inside (facing process chamber 1145) of inner housing 421. The angle of vane 1143 defines the rotational path of the mechanical movement system 1104. The vane 1143 may be angled with respect to the axial dimension of the bottom half inner housing 422 for promoting movement, agitation, or mixing, or combination thereof, of bulk volume of particles within chamber 1145.

Power system 1105 depicted in FIGS. 11B and 11C comprising of at least one motor (not shown) for providing mechanical rotational movement, an optional gearbox 152 for adjusting speed of rotational movement, and at least two bearings 153 mounted on outer housing end plates 434. Shaft 1140 is mounted on bearings 153 that are mounted on outer housing end plates 434. Whereby power system 1105 provides mechanical rotation to mechanical movement system 1104 to create forward movement of bulk volume of particles or to create bulk volume of particles to be in a near-uniform or uniform state, or combination thereof, within process chamber 1145.

Sensor system 1106 depicted in FIGS. 11A through 11F comprising at least one process monitoring sensor 972, 973, 974, 975, 976, 788, 977, 970 connected to at least one computer 1118 with an input bus 1116, 1112. Process monitoring sensor(s) for measuring at least one type of property data in one or more measurement locations and generating at least one property data signal. One or more measurement locations comprising process chamber 1145, inner housing 421, middle housing 435, outer housing 430, and outside of outer housing. Process monitoring sensor 972, 973, 974, 975, 976, 788, 977, 970, 971 generates a signal that correlates to a measurement property comprising of one or more selected from the group of: temperature, radio frequency, dielectric characteristics, resonance frequency, pressure, electrical conductivity, voltage, current, electrical permittivity, magnetic permeability, electrical field intensity, magnetic field intensity, magnetic flux density, infrared, or chemical composition of the environment in process chamber 1145, or one or more substances residing in bulk volume of particles located in process chamber 1145, or of system 1102, 1103, 1105, 1108, or combination thereof.

Computer system 1109 depicted in FIGS. 11A through 11F comprising one or more computer 1118 and an input bus 1116, 1112 or an output bus 1117, 1113, or combination thereof. Computer 1118 for receiving and storing two or more property data measurements in stored memory of computer and determine one or more relationships between these two or more property measurements. By operation of computer 1118 using one or more selected from the group comprising of: one or more relationships between sensed measurement data stored in memory of computer 1118, or an algorithm programmed into stored memory of computer 1118, or a recently sensed measurement data signal, or combination thereof, to generate one or more output control signals to one or more systems selected from the group comprising of: RF signal generating system 1101, or power system 1105, or combination thereof, for operating EM reactor system 1100. Thereby controlling a temperature or rate of heating, or combination thereof in bulk volume of particles located in process chamber 1145 in response to a stored relationship, or a pre-programmed algorithm, or a preprogrammed sequence of operating systems, or a recently sensed property data signal, or combination thereof.

Incoming gate system 1110 depicted in FIGS. 11A 11B, 11E, and 11F allows entry, or restricts entry, or meters entry, or combination thereof of bulk volume of particles into process chamber 1145. Incoming system 1110 comprising an incoming gate 1190 with motor 1194 that is connected 1193 to output bus 1117 and a sensor 1191 positioned inside or nearby gate 1190 that is connected 1192 to input bus 1116.

Outgoing (discharge) gate system 1111 depicted in FIGS. 11B, 11C, 11D allows exit, or restricts exit, or meters exit, or combination thereof of bulk volume of particles exiting process chamber 1145. Outgoing system 1111 comprising an outgoing Bombay style of gate 1195 comprising one or more of: inner housing 1147, middle housing 1148, outer housing 1149 and lever. Only one housing, inner housing 1147 is required for outgoing gate 1195 and is rounded or downwardly semi-circular to mate with bottom half 431 when closed. Bombay gate 1195 is part of the bottom half of inner housing 422, and optionally bottom half of middle housing 436, or bottom half of outer housing 431. The best way to describe Bombay gate 1195 is as a cutout of the bottom half that can swing-away from main housing so contents of chamber 1145 can exit the EM reactor 1100. Bombay gate 1195 position of open or closed is controlled by lever. Motor, lever, and controls of gate system 1111 are not shown.

Electromagnetic (EM) system 1121 depicted in FIGS. 11A through 11F comprising at least one RF signal generating circuitry 1135, two circuits 1138, 1139 and one more antenna 1137 in a Helmholtz coil configuration. RF signal generating circuitry 1135 comprising one or more selected from the group of: RF signal generator, multi-frequency synthesizer, RF signal output control, RF wave generator, RF generator with Silicon Carbide (SiC) transistors, power amplifier, broadband power amplifier, directional coupler, impedance matching system, power supply, power meter, an oscillator, an inverter, a pulse synthesizer, a transformer, a low-to-high frequency converter, or frequency tuning circuitry. Antenna 1137 is comprised of a metallic material or a formed plasma. Antenna 1137 or circuits 1138, 1139, or combination thereof are located inside chamber 1151, inner housing 421, or middle housing 435, or combination thereof.

Electromagnetic (EM) system 1121 comprising an inner Helmholtz coil antenna 1137 connected to RF signal generating circuitry 1135 with circuit 1138 connected to forward end of antenna 1137, and circuit 1139 connected to reverse end of antenna 1137. A RF signal communicated to Helmholtz coil antenna 1137 radiates electromagnetic energy from Helmholtz coil antenna 1137 through transparent aperture of inner housing 421, or middle housing 435, or of chamber 1151, or combination thereof, into bulk volume of particles in a state of motion, thereby heating or causing a biological or chemical reaction in at least one substance residing in bulk volume of particles from exposure to EM energy, and defining a process chamber 1145. Inner antenna system 1121 is in chambers 1151 surrounding the coils 1137 that are filled with a gas 1152 conducive to forming a plasma. Chambers 1151 has similar shape as Helicon coils but larger to accommodate plasma gas. An igniter and/or antenna 1127 ignite and form a plasma that is located in chamber 1151. At least a portion of antenna 1121 or a portion of circuits 1137, 1138. In this alternative embodiment, igniter and plasma antenna form a plasma in the chamber 1151 of Helmholtz coil windings, thus forming a plasma the shape Helmholtz chamber 1151 that transmits the EM energy from Helmholtz coil antenna system 1121 into process chamber 1145.

Electromagnetic (EM) system 1122 depicted in FIGS. 11A through 11F comprising at least one RF signal generating circuitry 1135, two circuits 1153, 1154 and one more antenna 1150 in a Helmholz coil configuration. RF signal generating circuitry 1135 comprising one or more selected from the group of: RF signal generator, multi-frequency synthesizer, RF signal output control, RF wave generator, RF generator with Silicon Carbide (SiC) transistors, power amplifier, broadband power amplifier, directional coupler, impedance matching system, power supply, power meter, an oscillator, an inverter, a pulse synthesizer, a transformer, a low-to-high frequency converter, or frequency tuning circuitry. Antenna 1150 is comprised of a metallic material or a formed plasma. Antenna 1150 or circuits 1153, 1154, or combination thereof are located inside chamber 1151, or inner housing 421, or middle housing 435, or outer housing 430, or combination thereof.

Electromagnetic (EM) system 1122 comprising an outer Helmholtz coil antenna 1150 connected to RF signal generating circuitry 1135 with circuit 1153 connected to forward end of antenna 1150, and circuit 1154 connected to reverse end of antenna 1150. An RF signal communicated to Helmholtz coil antenna 1150 radiates electromagnetic energy from Helmholtz coil antenna 1150 through transparent aperture of inner housing 421, or middle housing 435, or of chamber 1151, or combination thereof, into bulk volume of particles in a state of motion, thereby heating or causing a biological or chemical reaction in at least one substance residing in bulk volume of particles from exposure to EM energy, and defining a process chamber 1145. Outer antenna system 1122 is in chambers 1151 surrounding the coils 1150 that are filled with a gas 1152 conducive to forming a plasma. Chambers 1151 has similar shape as Helicon coils but larger to accommodate plasma gas. An igniter and/or antenna 1127 ignite and form a plasma that is located in chamber 1151. At least a portion of antenna 1122 or a portion of circuits 1153, 1154. In this alternative embodiment, igniter and plasma antenna form a plasma in the chamber 1151 of Helmholtz coil windings, thus forming a plasma the shape Helmholtz chamber 1151 that transmits the EM energy from Helmholtz coil antenna system 1122 into process chamber 1145.

Electromagnetic (EM) system 1131 depicted in FIGS. 11A through 11E comprising at least one RF signal generating circuitry 1125, four circuits 1128a, 1128b, 1129a, 1129b and one more antenna 1114 in a spiraled rod configuration. RF signal generating circuitry 1125 comprising one or more selected from the group of: RF signal generator, multi-frequency synthesizer, RF signal output control, RF wave generator, RF generator with Silicon Carbide (SiC) transistors, power amplifier, broadband power amplifier, directional coupler, impedance matching system, power supply, power meter, an oscillator, an inverter, a pulse synthesizer, a transformer, a low-to-high frequency converter, or frequency tuning circuitry. Antenna 1114 is comprised of a metallic material or a formed plasma. Antenna 1114 or circuits 1128a, 1129a, or combination thereof are located inside chamber 1155, of shaft 1140, or cavity 1165, 1166 of support bar 1141, 1142, or cavity 1157 outer ribbon vane 1143, or combination thereof.

Electromagnetic (EM) system 1131 comprising of a rod antenna 1114 coupled to RF signal generating circuitry 1125 using a slip ring system 1108 so antenna 1114 and/or circuits 1128a, 1129a can rotate with shaft 1140, or support bar 1141, 1142, or outer ribbon vane 1143 or combination thereof. Slip ring system 1108 comprising a rotating side 1050 with one or more ac/dc electric current connection pins 1053 and a stationary side 1052 with one or more ac/dc electric current connection pins 1051. Rotating side 1050 is connected to shaft 1140 so antenna can rotate around lengthwise axis of shaft 1140 within housing system 1103. Forward circuit 1128b connects RF signal generating circuitry 1125 to stationary connection pin 1053 and forward circuit 1128a connects rotary connection pin 1051 to antenna 1114. Reverse circuit 1129b connects RF signal generating circuitry 1125 to stationary connection pin 1053 and reverse circuit 1129a connects rotating connection pin 1051 to antenna 1114. A RF signal transferred through slip ring system 1108 to radiate electromagnetic energy from rotating antenna 1114 through transparent aperture of outer ribbon vane 1143 into bulk volume of particles, thereby heating or causing a biological or chemical reaction in at least one substance residing in bulk volume of particles from exposure to EM energy, and defining a process chamber 1145.

Electromagnetic (EM) system 1132 depicted in FIGS. 11A through 11E comprising at least one RF signal generating circuitry 1130, four circuits 1133a, 1133b, 1134a, 1134b and one more antenna 1115 in a spiraled rod configuration. RF signal generating circuitry 1130 comprising one or more selected from the group of: RF signal generator, multi-frequency synthesizer, RF signal output control, RF wave generator, RF generator with Silicon Carbide (SiC) transistors, power amplifier, broadband power amplifier, directional coupler, impedance matching system, power supply, power meter, an oscillator, an inverter, a pulse synthesizer, a transformer, a low-to-high frequency converter, or frequency tuning circuitry. Antenna 1115 is comprised of a metallic material or a formed plasma. Antenna 1115 or circuits 1133a, 1134a, or combination thereof are located inside chamber 1155, 1158, 1165, 1166 of shaft 1140, or support bar 1142, or inner ribbon vane 1144, or combination thereof.

Electromagnetic (EM) system 1132 comprising a rod antenna 1115 coupled to RF signal generating circuitry 1130 using a slip ring system 1108 so antenna 1115 and/or circuits 1133a, 1134a can rotate with shaft 1140, or support bar 1141, 1142, or inner ribbon vane 1144 or combination thereof. Slip ring system 1108 comprising a rotating side 1050 with one or more ac/dc electric current connection pins 1053 and a stationary side 1052 with one or more ac/dc electric current connection pins 1051. Rotating side 1050 is connected to shaft 1140 so antenna can rotate around lengthwise axis of shaft 1140 within housing system 1103. Forward circuit 1133b connects RF signal generating circuitry 1130 to stationary connection pin 1053 and forward circuit, 1133a connects rotary connection pin 1051 to antenna 1115. Reverse circuit 1134b connects RF signal generating circuitry 1130 to stationary connection pin 1053 and reverse circuit 1134a connects rotating connection pin 1051 to antenna 1115. A RF signal transferred through slip ring system 1108 to radiate electromagnetic energy from rotating antenna 1115 through transparent aperture of inner ribbon vane 1144 into bulk volume of particles in motion, thereby heating or causing a biological or chemical reaction in at least one substance residing in bulk volume of particles from exposure to EM energy, and defining a process chamber 1145.

Electromagnetic (EM) system 1169 depicted in FIGS. 11A through 11F comprising at least one RF signal generating circuitry 1170 and one more antenna configured of: dipole 1171, 1181 or waveguide 1172, 1182 or LED 1174, 1184 or bulb 1175, 1185 or laser 1176, 1186 that each have a circuit 1178a, 1178b, 1179, 1180 configured for their need of transmission, such as fiber optic for laser. EM signal generating circuitry 1170 comprising one or more selected from the group of: RF signal generator, multi-frequency, magnetron, cavity magnetron, laser, synthesizer, RF signal output control, RF wave generator, RF generator with Silicon Carbide (SiC) transistors, solid-state generator, power amplifier, broadband power amplifier, directional coupler, impedance matching system, power supply, power meter, an oscillator, an inverter, a pulse synthesizer, a transformer, a low-to-high frequency converter, or frequency tuning circuitry. Antenna(s) 1171, 1181, 1172, 1174, 1175, 1176, 1182, 1184, 1185, 1186 is comprised of a metallic material, or a formed plasma 1159, 1165, 1166, or a dipole 1171, 1181, or waveguide 1172, 1182 or LED 1174, 1184 or bulb 1175, 1185 or laser 1176, 1186. Antenna 1171, 1172, 1174, 1175, 1176, 1182, 1184, 1185, 1186 is located in process chamber 1145, or inner housing 421, or middle housing 435, or outer housing 430, or combination thereof, as long as the EM energy is efficiently directed into process chamber 1145.

EM system 1169 comprising EM signal communicated to to one or more antennas 1171, 1172, 1174, 1175, 1176, 1182, 1184, 1185, 1186 that radiates electromagnetic energy as a primary (radiating from rotating antenna EM) or secondary (EM radiating from rotating antenna and EM radiating from housing) EM energy into bulk volume of particles in a state of motion, thereby heating or causing a biological or chemical reaction in at least one substance residing in bulk volume of particles from exposure to EM energy, and defining a process chamber 1145. Antenna 1174, 1184 comprising of an LED emitter that radiates an infrared (IR), or visible, or ultra-violet (UVR) wavelength into process chamber 1145. Antenna 1175, 1185 comprising a bulb that radiates an infrared (IR), or visible, or ultra-violet (UVR), or X-ray spectrum of radio frequency. A waveguide is a structure that guides waves, such as electromagnetic waves or sound, with minimal loss of energy by restricting the transmission of energy to one direction. There are different types of waveguides for different types of waves. The most common is a hollow conductive metal pipe used to carry high frequency radio waves, particularly microwaves. Dielectric waveguides are used at higher radio frequencies, and transparent dielectric waveguides and optical fibers serve as waveguides for light. Antenna 1172, 1182, 1187, 1188 comprising a waveguide (hollow pipe or tube, dielectric, transparent, and optical fibers) that guides EM energy to process chamber 1145. A laser 1176, 1186 is a device that emits light through a process of optical amplification based on the stimulated emission of electromagnetic radiation. In other words, a device that stimulates atoms or molecules to emit light at particular wavelengths and amplifies that light, typically producing a very narrow beam of radiation. A laser 1176, 1186 differs from other sources of light in that it emits light which is coherent. The laser EM energy emission generally covers an extremely limited range of visible, infrared, or ultraviolet wavelengths. In another embodiment, RF signal system 1169 and one or more antennas 1171, 1181, 1172, 1182, 1174, 1184, 1175, 1185, 1176, can be an ionizer by providing an ionizing current or voltage to form a plasma in process chamber 1145 from the ionizing material. In another embodiment, RF system 1169 provides the ionizing current or voltage from its RF signal to form a plasma and system 1169 couples a frequency to be transmitted by formed plasma throughout process chamber 1145 A formed plasma in process chamber 1145 while bulk volume of particles is in a state of fluidization can act as a conduit for each particle to be surrounded by a conductor so every particle regardless of shape gets even EM energy exposure.

In another embodiment a spiral rod antenna 1114, 1115 in cavity 1157, 1158 of vane 1143, 1144, or fluid 1185 in cavity 1165, 1166 in support bar 1141, 1142 activated to plasma, or dipole 1181, or LED 1184, dipole with slotted waveguide 1187, 1188, or laser 1186 activating fluid to plasma in cavity 1155 of shaft 1140 is coupled 1178a, 1178b to RF signal generating circuitry 1170 using a slip ring system 1108 so at least one antenna 1114, 1115, 1181, 1182, 1184, 1185, 1186, 1187, or 1188 can radiate from cavity 1155 of shaft 1140, or cavity 1165, 1166 of support bar 1141, 1142, or cavity 1157, 1158 of vane 1143, 1144, or combination thereof, while rotating. Forward and reverse circuit 1178a connects RF signal generating circuitry 1170 to stationary connection pin 1053 and forward and reverse circuit 1178b connects rotating connection pin 1051 to at least one antenna 1114, 1115, 1181, 1182, 1184, 1185, 1186, 1187, or 1188. A RF signal transferred through slip ring system 1108 to radiate electromagnetic energy from rotating antenna 1114, 1115, 1181, 1182, 1184, 1185, 1186, 1187, or 1188, into bulk volume of particles in motion, thereby heating or causing a biological or chemical reaction in at least one substance residing in bulk volume of particles from exposure to EM energy, and defining a process chamber 1145.

Figure 12B:
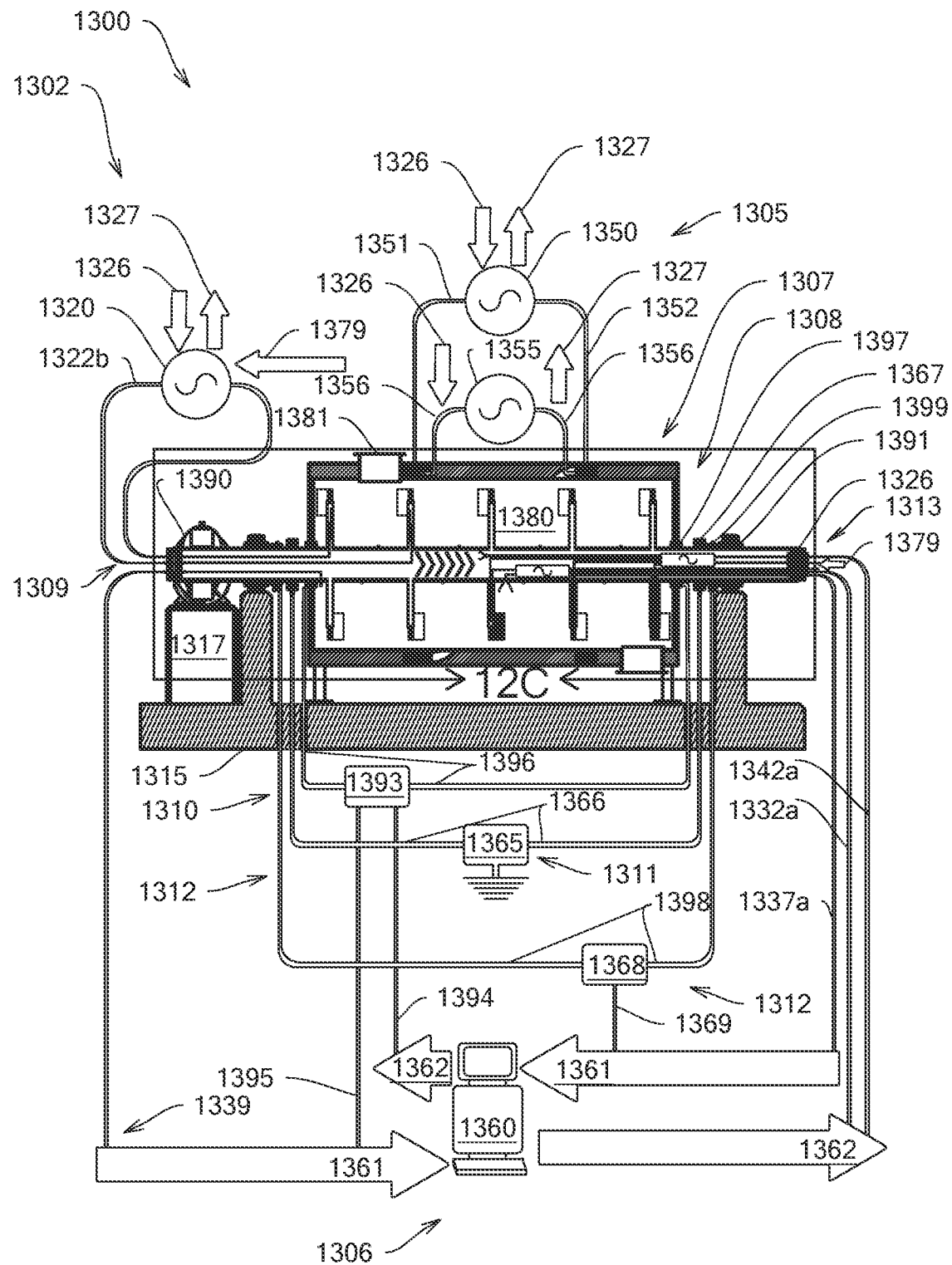
FIG. 12B is a cut view of the area taken in the direction indicated by line 12B-12B of FIG. 12A to more clearly show the internal components.

FIGS. 12A, 12B, 12C and 12D:

FIG. 12A is an isometric view of a radiation reactor 1300 that depicts five different embodiments of a radio frequency (RF) signal generating circuitry system 1302, 1303, 1304, 1305 to provide electromagnetic energy to a bulk volume of particles undergoing a motion that causes homogeneity within bulk volume of particles. FIGS. 12A through 12C depicts an electromagnetic reactor 1300 that exposes a bulk volume of particles to an electric and/or magnetic field comprising a support system 1301 between earth ground and housing system 1307, a mixing system 1308 that is mounted in housing system 1307 and energized by power system 1309. A computer system 1306 communicating with sensor system 1339 or using a preprogrammed algorithm, or combination thereof, generates an output to systems 1302, 1303, 1304, 1305, 1309, 1310, 1312, 1339 to operate reactor 1300. Sensing system 1339 to measure properties at one or more locations and communicate measurement data to computer system 1306. A shaft pressure seal system 1310 that blocks bulk volume of particles from leaking out of housing system 1307 with shaft orifice for movement system 1308. A RF/EM shaft grounding system 1311 that captures radio frequency signals or electromagnetic energy that has traveled on shaft 1385 beyond chamber 1380 and conducts to ground. A RF/EM shaft monitoring system 1312 for monitoring RF signals or EM energy that has traveled on shaft 1385 beyond housing system 1307. A slip ring system 1313 allows the transmission of electric AC/DC power, RF signals, fluid, or gas from stationary equipment to antenna 1324, 1325, 1346, 1349 inside of rotating mixing system 1309.

Radio frequency (RF) signal source system 1302 depicted in FIGS. 12A through 12C comprising at least one RF signal generating circuitry 1320, four circuits 1321a, 1321b, 1322a, 1322b and two or more antennas 1324, 1325 in a dipole configuration. RF signal generating circuitry 1320 comprising one or more selected from the group of: RF signal generator, multi-frequency synthesizer, RF signal output control, RF wave generator, RF generator with Silicon Carbide (SiC) transistors, power amplifier, broadband power amplifier, directional coupler, impedance matching system, power supply, power meter, an oscillator, an inverter, a pulse synthesizer, a transformer, a low-to-high frequency converter, or frequency tuning circuitry. Antennas 1324, 1325 are comprised of a metallic material or a formed plasma. Antenna 1324, 1325 or a portion of circuits 1321a, 1322a or combination thereof are located inside cavity 1358 of shaft 1385, or cavity 1388 support bar 1386, or cavity 1389 of vane 1387, or combination thereof.

Computer system 1306 depicted in FIGS. 12A through 12C comprising of one or more computer 1360 and an input bus 1327, 1361 or an output bus 1326, 1362, or combination thereof. Computer 1360 for receiving and storing two or more property data measurements in stored memory of computer and determine one or more relationships between these two or more property measurements. By operation of computer 1360 using one or more selected from the group comprising of: one or more relationships between sensed measurement data stored in memory of computer 1360, or an algorithm programmed into stored memory of computer 1360, or a recently sensed measurement data signal, or combination thereof, to generate one or more output control signals to one or more systems selected from the group comprising of: RF signal generating system 1302, or 1303, or 1304, or 1305, or 1350, or 1355 or power system 1309, or pressure seal system 1310, or EM monitoring system 1312, or combination thereof, for operating EM reactor system 1300.

Housing system 1307 depicted in FIG. 12C comprises of an inner housing 1377 nested inside of a middle housing 1373, that together are nested inside of an outer housing 1371. Inner housing 1377 comprises a bottom half 422, an upper half 423, and two end plates 1378. Middle housing 1373 comprises a bottom half 436, an upper half 437, and two end plates 1375. Outer housing 1371 comprises a bottom half 431, an upper half 432, and two end plates 1372. Only one housing, inner housing 1377 is required for a housing system 1307. However, some embodiments, especially those that need to absorb or insulate electromagnetic energy escaping chamber 1380 can benefit from a multi-layered housing. In all embodiments the inner housing bottom half will be rounded or downwardly semi-circular that is closely spaced with the rotational path of outer periphery 1359 of paddle style vane 1387. The upper half of inner housing can be extended to form a wall as show in FIG. 12C or upwardly semi-circular as shown in other figures of this disclosure. It is not necessary for the middle housing 1373 or outer housing 1371 to have the same shape or periphery as the inner housing 1377.

There are a wide variety of embodiments for inner 1377, middle 1373, and outer 1371 housing depending upon the application. If the bulk volume of particles to receive EM energy are a food product for human consumption, the inner housing 1377 will have sanitation requirements that may not be compatible with a material suitable for insulating the radiation. Such an embodiment would require a sanitary inner housing that is transparent to radiation such as Pyrex, a middle housing 1373 selected for its insulation properties that correspond to EM energy of system, and an outer layer typically non-metallic for structural integrity such as alumina. If the bulk volume of particles to be radiated are highly abrasive or hard, then a suitable material will have to be selected for inner housing. In another embodiment inner housing 1377 comprises a reflective surface or material to reflect EM energy back into process chamber 1380. In another embodiment inner housing 1377 comprises a porcelain material. In another embodiment middle housing 1373 comprises a liquid or gas jacket to absorb or reflect EM energy. In another embodiment middle housing 1373 comprises a liquid or gas jacket to heat or cool process chamber 1380 a portion of housing system 1307, or combination thereof.

Mechanical movement system 1308 depicted in FIGS. 12B and 12C comprises a shaft 1385 with at least one support bar 1386 projecting outward and connected to at least one vane 1387. Shaft 1385, support bar 1386, or vane 1387, or combination thereof comprise at least one cavity 1358, 1388, 1389 for placement of circuit 1321*a*, 1322*a*, or antenna 1324, 1325 or combination thereof. The system 1308 rotational 1212 axis is the lengthwise axis 1012 of shaft 1385. In some embodiments shaft 1385, support bar 1386, or vane 1387, or combination thereof comprise at least one aperture made of a material transparent to EM energy, such as Teflon, a castable ceramic, a 3d printed material, or Pyrex. In another embodiment, circuit 1321*a*, 1322*a*, or antenna 1324, 1325 are embedded into Shaft 1385, support bar 1386, or vane 1387, or combination thereof. In another embodiment, shaft 1385, support bar 1386, or vane 1387, or combination thereof are also an antenna 1324, 1325.

The mechanical movement of bulk volume of particles system 1308 is positioned within the base (bottom half) portion of housing system 1307 for rotation 1212 about lengthwise axis 1012 of shaft 1385 with outer periphery 1359 of vane 1387 close to inside (facing process chamber 1380) of inner housing 1377. The angle of vane 1387 defines the rotational path of the mechanical movement system 1308. The vane 1387 may be angled with respect to the axial dimension of the bottom half inner housing 422 for promoting movement, agitation, or mixing, or combination thereof, of bulk volume of particles within chamber 1380.

Power system 1309 depicted in FIGS. 12A through 12C comprising at least one motor 1390 for providing mechanical rotational 1212 movement, an optional gearbox 1392 for adjusting speed of rotational movement, and at least two bearings 1391 mounted on housing end plates 1372, 1375, 1378 Shaft 1385 is mounted on bearings 1391 that are mounted on housing end plates 1372, 1375, 1378. Whereby power system 1309 provides mechanical rotation to mechanical movement system 1308 to create forward movement of bulk volume of particles or to create bulk volume of particles to be in a near-uniform or uniform state, or combination thereof, within process chamber 1380.

A shaft pressure seal system 1310 that blocks bulk volume of particles from leaking out of housing system 1307 with shaft orifice for movement system 1308 depicted in FIGS. 12A to 12C. Shaft seal system 1310 comprising a seal controller 1393 that provides pressurized air to seal 1397 around shaft 1385 through air line 1396. Air line 1396 connects controller 1393 to seal 1397. Control cable 1394 connects controller 1393 to output bus 1362. Control cable 1395 connects controller 1393 to input bus 1361.

A RF/EM shaft grounding system 1311 that captures radio frequency signals or electromagnetic energy that has traveled on shaft 1385 beyond chamber 1380 and conducts to ground. Shaft grounding system 1311 comprising a shaft ground controller 1385 that monitors and regulates RF/EM movement through contact device 1367 and ground cable 1366 that goes to earth ground 120.

A RF/EM shaft EM monitoring system 1312 that monitors shaft for radio frequency signals or electromagnetic energy that has traveled on shaft 1385 beyond housing system 1307. Shaft monitoring system 1312 comprising monitor 1368 and control cable 1369.

Sensing system 1339 depicted in FIGS. 12A through 12C comprising of at least one process monitoring sensor 1328, 1338 connected to at least one computer 1360 with an input bus 1361. Process monitoring sensor(s) for measuring at least one type of property data in one or more measurement locations and generating at least one property data signal. One or more measurement locations comprising environment of process chamber 1380, or bulk volume of particles in process chamber 1380, or shaft 1385, or support bar 1386, or vane 1387, or combination thereof. Process monitoring sensor 1328, 1338 generates a signal that correlates to a measurement property comprising one or more selected from the group of: temperature, radio frequency, dielectric characteristics, resonance frequency, pressure, electrical conductivity, voltage, current, electrical permittivity, magnetic permeability, electrical field intensity, magnetic field intensity, magnetic flux density, infrared, or chemical composition of the environment in process chamber 1380, or one or more substances residing in bulk volume of particles located in process chamber 1380, or shaft 1385, or support bar 1386, or vane 1387, or combination thereof.

A unique aspect of the embodiment of EM reactor 1300 compared to previous examples in this application is the use of a slip ring system 1313 which allows the transmission of electric AC/DC power, RF signals, fluid, or gas from stationary equipment to rotating mixing system 1108. A slip ring (in electrical engineering terms) is a method of making an electrical connection through a rotating assembly. Typically, a slip ring consists of a stationary graphite or metal contact (brush) which rubs on the outside diameter of a rotating metal ring. As the metal ring turns, the electric current or signal is conducted through the stationary brush to the metal ring making the connection. Additional ring/brush assemblies are stacked along the rotating axis if more than one electrical circuit is needed. Either the brushes or the rings are stationary and the other component rotates. EM reactor illustrates four different types of RF signal systems 1302, 1303, 1304, 1305 that can be used individually as standalone RF signal systems, or combination thereof, with a slip ring system 1313.

Two or more antennas 1324, 1325 arranged in a dipole configuration are coupled to RF signal generating circuitry 1320 using a slip ring system 1313 so antennas 1324, 1325 can rotate with shaft 1385, support bar 1386, or vane 1387, or combination thereof. Slip ring system 1313 comprising a rotating side 1363 with one or more ac/dc electric current connection pins 1364 and a stationary side 1314 with one or more ac/dc electric current connection pins 1319. Rotating side 1363 is connected to shaft 1385 so antennas 1324, 1325 can rotate 1212 around lengthwise axis 1012 of shaft 1385 within housing system 1307. Forward circuit 1321*b* connects RF signal generating circuitry 1320 to stationary connection pin 1319 and forward circuit 1321*a* connects rotary connection pin 1364 to forward antenna 1324. Reverse circuit 1322*b* connects RF signal generating circuitry 1320 to stationary connection pin 1319 and reverse circuit 1322*a* connects rotating connection pin 1364 to reverse antenna 1325. A RF signal transferred through slip ring system 1313 to flow electromagnetic energy between dipole antennas 1324, 1325 from shaft 1385, or support bar 1386, or vane 1387, or combination thereof into bulk volume of particles, thereby heating or causing a biological or chemical reaction in at least one substance residing in bulk volume of particles from exposure to EM energy, and defining a process chamber 1380. Thereby controlling a temperature or rate of heating, or combination thereof in bulk volume of particles located in process chamber 1380 in response to a stored relationship, or a pre-programmed algorithm, or a recently sensed property data signal, or combination thereof.

Radio frequency (RF) signal source system 1303 depicted in FIGS. 12A through 12C comprising at least one RF signal generating and ionizing circuitry 1330, two or more power lines 1331a, 1331b two or more control lines 1332a, 1332b, and at least one RF circuits 1333 between RF circuitry 1330 and one or more plasma antenna 1335, 1336 in a dipole configuration. RF signal generating and ionizing circuitry 1330, 1334 comprising one or more selected from the group of: RF signal generator, multi-frequency synthesizer, RF signal output control, RF wave generator, RF generator with Silicon Carbide (SiC) transistors, power amplifier, broadband power amplifier, directional coupler, impedance matching system, tesla igniter, power supply, power meter, an oscillator, an inverter, a pulse synthesizer, a transformer, a low-to-high frequency converter, or frequency tuning circuitry. Antennas 1335, 1336, are comprised of a formed plasma. Antenna 1335, 1336, include an igniter 1334 to initiate a plasma. RF signal generating and ionizing circuitry 1330, and antenna 1335, 1336, or a portion of circuits 1333 or combination thereof are located within (not shown) cavity 1358 of shaft 1385, or cavity 1388 of support bar 1386, or (not shown) cavity 1389 of vane 1387, or combination thereof.

System 1303 comprising two or more plasma antennas 1335, 1336 arranged in a dipole configuration are coupled 1333 to RF signal generating circuitry 1330 located within or attached to shaft 1385, or support bar 1386, or vane 1387, or combination thereof. Slip ring system 1313 comprising a rotating side 1363 with one or more ac/dc electric current connection pins 1364 and a stationary side 1314 with one or more ac/dc electric current connection pins 1319. Rotating side 1363 is connected to shaft 1385 so RF signal generating circuitry 1330 and antennas 1335, 1336 can rotate 1212 around lengthwise axis 1012. Power circuit 1331b connects ac or dc electrical power to rotating RF signal generating circuitry 1330 and to rotating connection pin 1364 Power line 1321b connects ac or dc electrical power 1379.

Power circuit 1331a connects stationary connection pin 1319 to ac or dc electrical power source 1379. RF circuit 1333 connects RF signal generating circuitry 1330 to antenna(s) 1334. Control circuit 1332b connects rotating RF signal generating circuitry 1330 to rotating connection pin 1364 and control circuit 1332a connects stationary connection pin 1319 to output bus 1362. Sensor circuit 1337b connects rotating sensor 1338 to rotating connection pin 1364 and sensor circuit 1337a connects stationary connection pin 1319 to input bus 1361. An ac or dc electrical power supply through circuits 1331a, 1331b and/or a control signal 1332a, 1332b is transferred through slip ring system 1313 to RF signal generating circuitry 1330 that is coupled 1333 to dipole antennas 1335, 1336 to rotate with and radiate from shaft 1385, or support bar 1386, or vane 1387, or combination thereof into bulk volume of particles. A computer 1360 communicating with input bus 1361 receives signal from sensor 1338 or using a preprogrammed algorithm, or combination thereof, generates a control signal through output bus 1362 to RF signal generating circuitry 1330 to operate reactor 1300. Heating or causing a biological or chemical reaction in at least one substance residing in bulk volume of particles from exposure to EM energy, and defining a process chamber 1380. Thereby controlling a temperature or rate of heating, or combination thereof in bulk volume of particles located in process chamber 1380 in response to a stored relationship, or a pre-programmed algorithm, or a recently sensed property data signal, or combination thereof.

RF circuit 1333 connects RF signal generating circuitry 1330 to plasma antenna 1335, 1336. A RF signal flows electromagnetic energy between dipole antennas 1335, 1336 through transparent aperture of support bar 1386 thereof into bulk volume of particles, thereby heating or causing a biological or chemical reaction in at least one substance residing in bulk volume of particles from exposure to EM energy, and defining a process chamber 1380. Thereby controlling a temperature or rate of heating, or combination thereof in bulk volume of particles located in process chamber 1380 in response to a stored relationship, or a pre-programmed algorithm, or a recently sensed property data signal, or combination thereof.

In another embodiment of system 1303, three or more plasma antennas 1335, 1336 are each 90 degrees to 120 degrees out-of-phase with neighboring antenna to develop a complete sine wave of desired EM energy, which is rotating in process chamber 1380. In another embodiment, Radio frequency (RF) signal source system 1304 depicted in FIGS. 12A to 12C comprising at least one RF signal generating circuitry 1340, two or more power lines 1341*a*, 1341*b*, two or more control lines 1342*a*, 1342*b*, and at least one RF circuits 1343 between RF circuitry 1340 and one or more antenna 1344 located in, or nearby plasma antennas 1335, 1336 to transmit a second signal with plasma antennas 1335, 1336 into process chamber 1380. RF signal generating circuitry 1340 comprising one or more selected from the group of: RF signal generator, multi-frequency synthesizer, RF signal output control, RF wave generator, RF generator with Silicon Carbide (SiC) transistors, laser, magnetron, cavity magnetron, solid-state generator, power amplifier, broadband power amplifier, directional coupler, impedance matching system, power supply, power meter, an oscillator, an inverter, a pulse synthesizer, a transformer, a low-to-high frequency converter, or frequency tuning circuitry. Antenna 1344 is typically metallic or ends of circuits in formed plasma, or antenna 1344 can be an aperture of a laser, or transmitting end of a fiber optic line. Antenna 1344 or a portion of circuits 1343 or combination thereof are located inside cavity 1358 of shaft 1385, or cavity 1388 of support bar 1386, or cavity 1389 of vane 1387, or combination thereof.

In another embodiment of system 1303, Radio frequency (RF) signal source system 1303 depicted in FIGS. 12A through 12C comprising antenna 1349 connected to RF source 1330 with circuits 1348 is located inside cavity 1358 of shaft 1385 or (not shown) cavity 1388 of support bar 1386, or cavity 1389 of vane 1387, or combination thereof. Antenna 1349 will have an orientation to radiate EM energy inside of shaft 1385. In this embodiment, cavity 1358, 1388, 1389 acts as a waveguide. In this instance, shaft 1385 has slots or apertures 1384 sized to limit exit of EM energy at any given location, thus evenly spreading distribution of EM energy going into process chamber 1380 along lengthwise axis 1012 of shaft 1385 while it is rotating 1212.

In another embodiment, Radio frequency (RF) signal source system 1304 depicted in FIGS. 12A through 12C comprising antenna 1349 connected to RF source 1340 with circuits 1348 is located inside cavity 1358 of, shaft 1385. Antenna 1349 will have an orientation parallel to horizontal axis of shaft 1385 to radiate EM energy inside of shaH 1385. In this embodiment shaft 1385 has slots or apertures 1384 sized to limit exit of EM energy at any given location, thus evenly spreading distJ1bution of EJVf energy going into process chamber 1380 along lengthwise axis of shaft 1385 whi!e it is rotating.

In another embodiment, Radio frequency (RF) signal source system 1305 depicted in FIGS. 12A through 12C comprising at least one RF signal generating circuitry 1350, at least two RF circuits 1351, 1352 between RF circuitry 1350 and antenna 1353 in a dual Helicon coil configuration. RF signal generating circuitry 1350 comprising one or more selected from the group of: RF signal generator, multi-frequency synthesizer, RF signal output control, RF wave generator, RF generator with Silicon Carbide (SiC) transistors, power amplifier, broadband power amplifier, directional coupler, impedance matching system, tesla igniter, power supply, power meter, an oscillator, an inverter, a pulse synthesizer, a transformer, a low-to-high frequency converter, or frequency tuning circuitry. Dual Helicon coil antenna 1353 is comprised of at least two coils of metallic windings. Antenna 1353 or a portion of circuits 1351, 1352 or combination thereof are located within inner housing 1377, or middle housing 1373, or outer 1371 housing, or outside of housing system 1307, or combination thereof. A Helmholtz coil has a straight connection between the positive and negative coils. A Helicon coil connection has a 180-degree twist between the positive and negative coils. A dual Helicon coil has two of these connecting twists that are 180 degrees apart.

One or more dual Helicon coil antennas 1353 coupled to RF signal generating circuitry 1350 so antenna 1353 radiates into process chamber 1380. RF circuit 1351, 1352 connects RF signal generating circuitry 1330 to Helicon antenna 1353. A RF signal flows electromagnetic energy primarily inside of coils 1353 through at least some portion of housing system 1307 with a transparent aperture into process chamber 1380, thereof into bulk volume of particles, thereby heating or causing a biological or chemical reaction in at least one substance residing in bulk volume of particles from exposure to EM energy, and defining a process chamber 1380. Thereby controlling a temperature or rate of heating, or combination thereof in bulk volume of particles located in process chamber 1380.

In another embodiment, Radio frequency (RF) signal source system depicted in FIGS. 12A through 12C also comprising at least one RF signal generating and ionizing circuitry 1355 at least one RF circuit 1356 between RF circuitry 1355 and one or more antenna 1357 that are located in a dual Helicon coil 1357. RF signal generating and/or ionizing circuitry 1355 comprising one or more selected from the group of: RF signal generator, multi-frequency synthesizer, RF signal output control, RF wave generator, RF generator with Silicon Carbide (SiC) transistors, power amplifier, broadband power amplifier, directional coupler, impedance matching system, laser, magnetron, cavity magnetron, waveguide, tesla igniter, power supply, power meter, an oscillator, an inverter, a pulse synthesizer, a transformer, a low-to-high frequency converter, or frequency tuning circuitry. Antenna 1353 is located in chambers 1354 surrounding the coils 1353 that are filled with a gas conducive to forming a plasma. Chambers 1354 has similar shape as Helicon coils but larger to accommodate plasma gas. An igniter and/or antenna 1357 ignite and form a plasma that is located in chamber 1354. At least a portion of antenna 1357 or a portion of circuits 577 or combination thereof are located inside chamber 1354. In this alternative embodiment, igniter and plasma antenna form a plasma in the chamber 1354 of dual Helicon coil windings, thus forming a plasma the shape dual Helicon chamber 1354 that transmits the EM energy from Helicon coil antenna 1353 into process chamber 1380.

In another embodiment of the latter embodiment, igniter and antenna 1357 instead ignite and form a plasma using the Helicon coil EM energy with gas in chamber 1354, and the antenna 1357 provides a second frequency into plasma for plasma to radiate as EM energy into process chamber 1380 FIGS. 13A, 13B, 13C, 13, and 13E:

FIG. 13A is an isometric view of an electromagnetic reactor 1400 that depicts two different embodiments of a radio frequency (RF) signal generating circuitry system 1402, 1411 to provide electromagnetic energy, RF signal circuitry 1420, 1490 can be used individually as a standalone RF source, or combination thereof, a support system 1401 between earth ground and housing system 1404, a mechanical movement of bulk volume of particles system 1405 that is mounted in housing system 1404 and energized by power system 1406. Sensing system 1413 to measure properties at one or more locations and communicate measurement data to computer system 1403. A process gas system 1409 provides gas for plasma antenna. A slip ring system 1407, 1412 allows the transmission of electric AC/DC power, RF signals, fluid, or gas from stationary equipment to rotating mechanical movement system 1405. A computer system 1403 communicating with input sensor system 1413 or using a preprogrammed algorithm, or combination thereof, generates an output to one or more systems 1402, or 1405, or 1408, or 1409, or 1410, or 1411, to control reactor 1400.

Radio frequency (RF) signal source system 1402 depicted in FIGS. 13A through 13F comprising at least one RF signal generating circuitry 1402, four transmission (circuit) lines 1421a, 1421b, 1422a, 1422b and two or more antennas 1424, 1425 in a dipole configuration. RF signal generating circuitry 1402 comprising one or more selected from the group of: RF signal generator, multi-frequency synthesizer, RF signal output control, RF wave generator, RF generator with Silicon Carbide (SiC) transistors, power amplifier, broadband power amplifier, directional coupler, impedance matching system, power supply, power meter, an oscillator, an inverter, a pulse synthesizer, a transformer, a low-to-high frequency converter, or frequency tuning circuitry.

A unique aspect of the embodiment of EM reactor 1400 compared to previous examples in this application is the functionality of adjusting the distance between dipole antennas that correlates with ½ or ¼ wave of RF signal. There are two embodiments of antenna material composition depicted in FIG. 13. Dipole antennas 1424 are metallic and requires an actuator system 1410 to adjust position of antenna for tuning of signal to a ½ or ¼ wave of RF signal. Antenna 1425 is a formed plasma whose length can be adjusted with gas supply system 1409 and/or RF system 1411 for tuning of signal to a ½ or ¼ wave of RF signal.

Figure 13B:
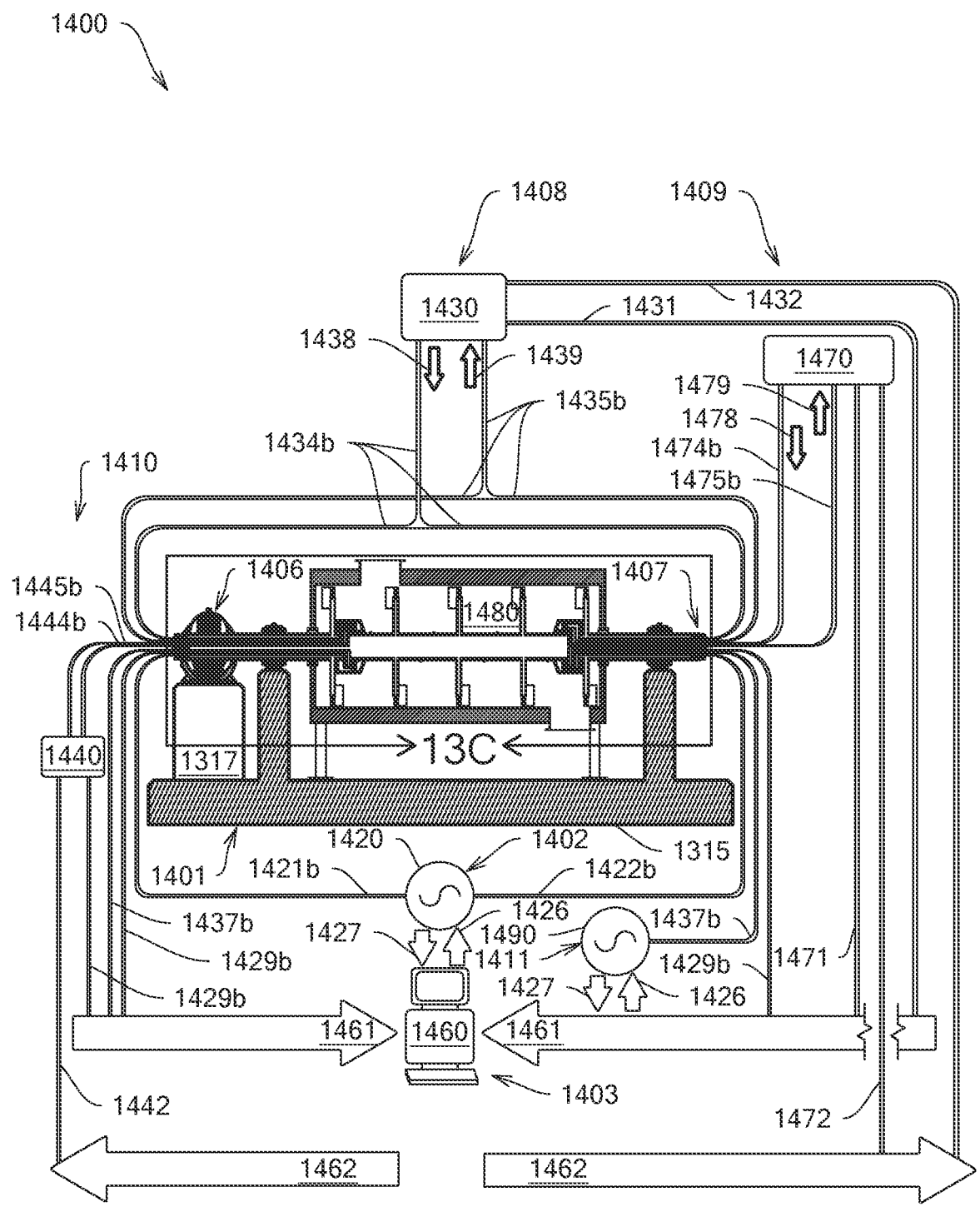
FIG. 13B is a cut front elevational view of the area taken in the direction indicated by line 13B-13B of FIG. 13A to more clearly show systems.

Actuator system 1410 depicted in FIGS. 13B to 13D comprising actuator controller 1440, an actuator 1443, a circuit 1441 between input bus 1461 and actuator controller 1440, a circuit 1442 between output bus 1462 and and actuator controller 1440, an actuator 1443 that receives energy (electricity, air, fluid) to from incoming line 1444a, 1444b from and actuator controller 1440 and returns energy via return line 1445a, 1445b to and actuator controller 1440 to adjust position of antenna 1424. Incoming line 1444a connects slip ring rotary connection pin 1451 and actuator 1443 and incoming line 1444b connects slip ring stationary connection pin 1453 and and actuator controller 1440. Actuator controller 1440 comprising energy storage, piping, pumps, circuitry, or valves to supply energy to actuator 1443 and a return or recycle components to return energy from actuator 1443 to and actuator controller 1440. Controller 1440 comprising any electronic circuitry or microprocessor primarily dedicated to operating and actuator 1443. Actuator controller 1440 sends energy through incoming line 1444a, 1444b and slip ring system 1407 to actuator 1443 and returns energy through return line 1445a, 1445b and slip ring system 1407 to and actuator controller 1440, thereby adjusting position of antenna 1424 to preferably ½ or ¼ wave of RF signal.

Another unique aspect of the embodiment of EM reactor 1400 compared to previous examples is the use of a slip ring systems 1407, 1412 which allows the transmission of electric AC/DC power, RF signals, fluid, or gas from stationary equipment to rotating mixing system 1405. EM reactor 1400 depicts two different embodiments of a slip ring 1407, 1411. Slip ring system 1407 depicted in FIG. 13D transfers a coolant for antenna cooling system 1408 from a stationary line 1434b to a rotating line 1434a in shaft 1485, a control cable (not shown) and a power cable (not shown) for actuator system 1410, a cable for sensing system 1413, along with cables for RF signal circuitry 1402. Slip ring system 1412 depicted in FIG. 13E transfers a coolant for antenna cooling system 1408, transmits a gas for gas supply system 1409, a cable 1437a, 1437b for sensing system 1413, along with cables 1422a, 1422b for RF signal circuitry 1411.

Dipole antennas 1424, 1425 are coupled to RF signal generating circuitry 1402 using a slip ring system 1407, 1412 so antennas 1424, 1425 can rotate with shaft 1485. Slip ring system 1407 depicted in FIG. 13D comprising a rotating side 1450 with one or more ac/dc electric current connection pins 1451, and one or more fluid connection pins 1454, or combination thereof, and a stationary side 1452 with one or more ac/dc electric current connection pins 1453, and one or more fluid connection pins 1456, or combination thereof. Rotating side 1450 is connected to shaft 1485 so antennas 1424 can rotate around lengthwise axis of shaft 1485 within housing system 1404.

Slip ring system 1412 depicted in FIG. 13E comprising a rotating side 1450 with one or more ac/dc electric current connection pins 1451, and one or more gas connection pins 1457, or combination thereof, and a stationary side 1452 with one or more ac/dc electric current connection pins 1453, and one or more gas connection pins 1458, or combination thereof. Rotating side 1450 is connected to shaft 1485 so antennas 1425 can rotate 1213 around lengthwise axis 1013 of shaft 1485 within housing system 1404. Forward transmission line 1421a connects rotary connection pin 1451 to antenna 1424 and forward transmission line 1421b connects RF signal generating circuitry 1402 to stationary connection pin 1453. Reverse transmission line 1422a connects rotary connection pin 1451 to antenna 1425 and forward transmission line 1422b connects RF signal generating circuitry 1420 to stationary connection pin 1453. A RF signal is communicated through slip ring system 1407, 1412 to flow electromagnetic energy between dipole antennas 1424, 1425, thereby heating or causing a biological or chemical reaction in at least one substance residing in bulk volume of particles from exposure to EM energy, and defining a process chamber 1480.

Supports system 1401 depicted in FIG. 13A comprises all supports 1316, 1317, 1318 between earth ground 1315 and housing system 1404 as well as components of power system 1406 such as bearings 1391 and motor 1390 when they are not mounted on housing system 1404.

Housing system 1404 depicted in FIGS. 13A through 13C comprising an inner housing 1376 nested inside of a middle housing 1374, that together are nested inside of an outer housing 1370. Inner housing 1376 comprising a cylindrical housing 1377 with an end section 1378 on each side of cylindrical housing 1377. Mechanical movement system 1405 is positioned in the center of inner cylindrical housing 1377, or nearby center (sometimes slightly offset) so mechanical system can freely rotate within housing 1404. Middle housing 1373 comprising a cylindrical housing 1374 with an end section 1375 on each side of cylindrical housing 1374. Outer housing 1370 comprising a cylindrical housing 1371 with an end section 1372 on each side of cylindrical housing 1371.

Only one housing, inner housing 1376 is required for a housing system 1404. However, some embodiments, especially those that need to absorb or insulate electromagnetic energy escaping chamber 1480 can benefit from a multi-layered housing. In all embodiments the inner housing bottom half will be rounded or downwardly semi-circular that is closely spaced with the rotational path of outer periphery 1359 of paddle style vane 1387. The upper half of inner housing can be extended to form a wall as shown in other figures of this disclosure. It is not necessary for the middle housing 1373 or outer housing 1370 to have the same shape or periphery as the inner housing 1376.

There are a wide variety of embodiments for inner 1376, middle 1373, and outer 1370 housing depending upon the application. If the bulk volume of particles to receive EM energy are a food product for human consumption, the inner housing 1376 will have sanitation requirements that may not be compatible with a material suitable for insulating the radiation. Such an embodiment would require a sanitary inner housing that is transparent to radiation such as Pyrex, a middle housing 1373 selected for its insulation properties that correspond to EM energy of system, and an outer layer typically non-metallic for structural integrity such as alumina. If the bulk volume of particles to be radiated are highly abrasive or hard, then a suitable material will have to be selected for inner housing. In another embodiment inner housing 1376 comprises a reflective surface or material to reflect EM energy back into process chamber 1480. In another embodiment inner housing 1376 comprises a porcelain material. In another embodiment middle housing 1373 comprises a liquid or gas jacket to absorb or reflect EM energy. In another embodiment middle housing 1373 comprises a liquid or gas jacket to heat or cool process chamber 1480 a portion of housing system 1404, or combination thereof. In another embodiment inner housing 1376 is lined or embedded with a superconductor sandwiched between two layers of graphene to transmit and receive THz RF signals and EM energy in process chamber 1480.

Mechanical movement system 1405 depicted in FIGS. 13B and 13C comprising a shaft 1485 with at least one support bar 1386 projecting outward and connected to one or more paddle vane 1387. Shaft 1485, support bar 1386, or paddle vane 1387, or combination thereof comprise at least one cavity 1486 for placement of transmission line or antennas 1424, 1425, or combination thereof. The system 1104 rotational axis 1213 is the lengthwise axis 1013 of shaft 1140. In some embodiments shaft 1385, support bar 1386, 1142, or paddle vane 1387, or combination thereof comprise at least one portion made of a material to shield EM energy from entering cavity 1486 of shaft 1485. In another embodiment, at least one transmission line 1421a, 1422a is embedded into shaft 1485, support bar 1386, or combination thereof. In the embodiment depicted in FIGS. 13B and 13C the antennas 1424, 1425 are outside of the shaft 1485, with transmission line 1421b, 1422b passing through cavity 1486 of shaft 1485 to antennas 1424, 1425 that rotate 1213 with shaft around lengthwise axis 1013 of shaft 1485 to flow EM energy in process chamber 1480. An optional cover or shield 1455 can surround all or a portion of antenna 1424, 1425, or support components such as actuator 1443, or heat exchanger 1433, or combination thereof, as a barrier to bulk volume of particles in process chamber 1380. Or, to shield EM energy from support components such as actuator 1443, or heat exchanger 1433, or combination thereof.

The mechanical movement of bulk volume of particles system 1405 is positioned within the base (bottom halt) portion of housing system 1404 for rotation 1213 about lengthwise axis 1013 of shaft 1485 with outer periphery 1359 of paddle vane 1387 close to inside (facing process chamber 1480) of inner housing 1386. The angle of vane 1387 defines the rotational path of the mechanical movement system 1405. The vane 1387 may be angled with respect to the axial dimension of the bottom half inner housing 1386 for promoting movement, agitation, or mixing, or combination thereof, of bulk volume of particles within chamber 1480.

Power system 1406 depicted in FIGS. 13A through 13C comprising at least one motor 1390 for providing mechanical rotational movement to mechanical movement system 1405, an optional gearbox 1392 between motor 1390 and shaft 1385 for adjusting speed of rotational movement transferred to shaft 1385. Power system further comprising shaft 1385 mounted on two more bearings 1391 that are mounted on support 1316. Whereby power system 1406 provides mechanical rotation to mechanical movement system 1405 to create forward movement of bulk volume of particles, or to create bulk volume of particles to be in a near-uniform or uniform state, or combination thereof, within process chamber 1380.

Sensor system 1106 depicted in FIGS. 13A through 13E comprising one or more sensor 1428, or 1436, or 1476 connected to at least one computer 1460 with an input bus 1461, 1427. One or more sensors for measuring at least one type of property data in one or more measurement locations and generating at least one measurement data signal. One or more measurement locations comprising environment of process chamber 1480, bulk volume of particles in process chamber 1480, inner housing 1376, middle housing 1373, outer housing 1370, and outside of outer housing. Process monitoring sensor 1428, 1436, 1476 generates a signal that correlates to a measurement property comprising one or more selected from the group of: temperature, radio frequency, dielectric characteristics, resonance frequency, pressure, electrical conductivity, voltage, current, electrical permittivity, magnetic permeability, electrical field intensity, magnetic field intensity, magnetic flux density, infrared, electron density, or chemical composition of the environment in process chamber 1480, or one or more substances residing in bulk volume of particles located in process chamber 1480, or of system 1402, 1408, 1409, 1410, 1411 or combination thereof.

In another embodiment inner housing 1376, or shaft 1485, or support bar 1386, or vane 1387, or combination thereof, is lined or embedded with a superconductor sandwiched between two layers of graphene that act as sensors sense and transmit THz frequency signals in process chamber 1480 to input bus 1461.

Computer system 1109 depicted in FIGS. 13A through 13F comprising one or more computer 1460 and an input bus 1116, 1112 or an output bus 1117, 1113, or combination thereof. Computer 1460 for receiving and storing two or more property data measurements in stored memory of computer and determine one or more relationships between these two or more property measurements. By operation of computer 1460 using one or more selected from the group comprising of: one or more relationships between sensed measurement data stored in memory of computer 1460, or an algorithm programmed into stored memory of computer 1460, or operational sequencing programmed into stored memory of computer 1460, or a recently sensed measurement data signal, or combination thereof, to generate one or more output control signals to one or more systems selected from the group comprising of: RF signal generating system 1402, or power system 1406, or combination thereof, for operating EM reactor system 1400. Thereby controlling a temperature or rate of heating, or combination thereof in bulk volume of particles located in process chamber 1480 in response to a stored relationship, or a pre-programmed algorithm, or a recently sensed property data signal, or combination thereof.

Ionizer circuitry system 1411 depicted in FIGS. 13A through 13C comprising at least one ionizer circuitry 1490, two or more transmission lines 1491*a*, 1491*b* and one or more element 1492 to ignite gas 1493 in plasma chamber 1473 to form a plasma antenna 1495. Plasma antenna 1495 is comprised of a formed plasma. Igniter 1492 of ionizer system 1411 is located inside or nearby plasma chamber 1473. Ionizer system 1411 ignites 1492 gas 1493 in plasma chamber 1473 to form a plasma antenna 1495 that couples with reverse dipole antenna 1425. If plasma antenna 1495 has suitable gas and pressure to form a plasma that is suitable for the RF signal source 1420, plasma antenna 1495 will radiate EM energy of RF signal source 1420. In this embodiment plasma antenna 1495 will be the reverse dipole antenna 1425 that flows EM energy with forward dipole antenna 1424. A RF signal communicated to dipole antennas 1424, 1425 flows electromagnetic energy through transparent aperture of cover 1455 into bulk volume of particles in a state of motion created by rotational motion of mechanical system 1405, thereby heating or causing a biological or chemical reaction in at least one substance residing in bulk volume of particles from exposure to EM energy, and defining a process chamber 1480. Ionizer circuitry 1490 can adjust power to modify depth 1447 of gas 1493 ionized (plasma) in chamber 1473. The power can be adjusted to correlate to ¼ or ½ wavelength, or an even division for the signal being radiated by antenna 1495 for a variable frequency RF signal system.

Coolant system 1408 depicted in FIGS. 13A through 13E comprising coolant mechanical equipment and controller 1430, a circuit 1431 between input bus 1461 and mechanical equipment 1430, a circuit 1432 between output bus 1462 and mechanical equipment 1430, a heat exchanger 1433 positioned on antenna 1424, 1425 that receives coolant via incoming coolant line 1434*a*, 1434*b* from mechanical equipment 1430 and returns coolant via outgoing coolant line 1435*a*, 1435*b* to mechanical equipment 1430. Incoming coolant line 1434*a* connects slip ring rotary fluid connection pin 1454 and heat exchanger 1433 and incoming coolant line 1434*b* connects slip ring stationary fluid connection pin 1456 and mechanical equipment 1430. Mechanical equipment and controller 1430 comprising storage for a fluid or gas coolant, piping, and valves to supply coolant to heat exchanger 1433 and a return or recycle piping and valves to return fluid or gas coolant from heat exchanger 1433 to mechanical equipment 1430. Controller 1430 comprising any electronic circuitry or microprocessor primarily dedicated to operating mechanical equipment 1430. Sensor 1436 is positioned in or nearby heat exchanger 1433 to measure property data. Sensor 1436 communicates measurement property data to input bus 1461 through cable 1437*a* that connects to rotary slip ring connection 1451 and cable 1437*b* that connects to stationary slip ring connection 1453. Mechanical equipment 1430 sends a fluid or gas coolant through incoming line 1434*a*, 1434*b* and slip ring system 1407, 1412 to heat exchanger 1433 and returns fluid or gas through outgoing line 1435a, 1435b and slip ring system 1407, 1412 to mechanical equipment 1430, thereby reducing heat of antenna 1424, 1425. In another embodiment, input data from sensor 1436 is received by computer 1460 or controller 1430 and adjusts flow or temperature of coolant to automatically control heat of antenna 1424, 1425.

Figure 14A:
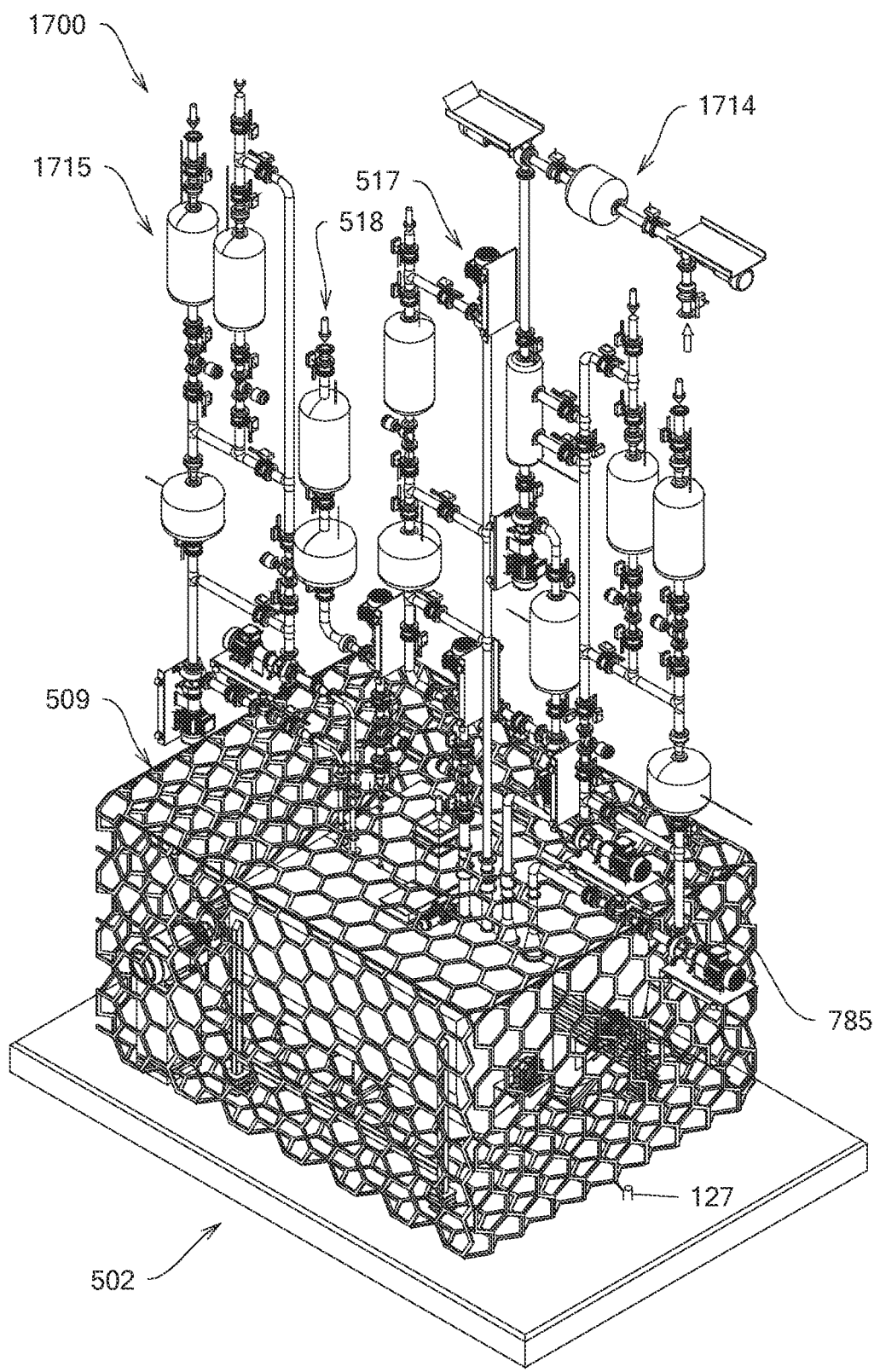
FIG. 14A is an isometric view of an electromagnet reactor according to the invention showing an isometric view of an electromagnetic reactor that depicts four different embodiments of a radio frequency (RF) signal generating circuitry system for radiating an electric or magnetic field inside of a housing system.

Gas system 1409 depicted in FIGS. 13A through 13C comprising gas mechanical equipment and controller 1470, a circuit 1471 between input bus 1461 and mechanical equipment 1470, a circuit 1472 between output bus 1462 and mechanical equipment 1470, a plasma chamber 1473 that receives gas via incoming gas line 1474a, 1474b from mechanical equipment 1470 and returns gas via return gas line 1475a, 1475b to mechanical equipment 1470. Incoming gas line 1474a connects slip ring rotary gas connection pin 1457 and plasma chamber 1473 and incoming gas line 1474b connects slip ring stationary gas connection pin 1458 and mechanical equipment 1470. Mechanical equipment and controller 1470 comprising storage for a gas storage, piping, and valves to supply gas to plasma chamber 1473 and a return or recycle piping and valves to return gas from plasma chamber 1473 to mechanical equipment 1470 Controller 1470 comprising any electronic circuitry or microprocessor primarily dedicated to operating mechanical equipment 1470 Sensor 1476 is positioned in or nearby plasma chamber 1473 to measure property data. Sensor 1476 communicates measurement property data to input bus 1461 through cable 1477a that connects to rotary slip ring connection 1451 and cable 1477b that connects to stationary slip ring connection 1453. Mechanical equipment 1470 sends a gas through incoming line 1474a, 1434b and slip ring system 1412 to plasma chamber 1473 and returns gas through return line 1475a, 1475b and slip ring system 1412 to mechanical equipment 1470, thereby reducing supplying gas to plasma chamber 1473. In another embodiment, input data from sensor 1476 is received by computer 1460 or controller 1470 and adjusts flow or temperature of gas to automatically control electron density in plasma chamber 1473 to adjust plasma antenna 1495 for tuning of RF signal circuitry 1420. FIGS. 14A, 14B, 14C, 14D, 14E, 14F, 14G, 14H, 14I, 14J, 14K, 14L and 14M:

FIG. 14A is an isometric view that shows an apparatus of an electromagnetic reactor 1700 that depicts four different embodiments of a radio frequency (RF) signal generating circuitry system 1701, 1710, 1711, 1712 for radiating an electric or magnetic field inside of housing system 503. The four different embodiments of a RF signal system 1701, 1710, 1711, 1712 can be used individually as a standalone RF signal source, or combination thereof. A support system 502 between earth ground and housing system 503. A convective type of mechanical mixing system 504 for movement of bulk volume of particles in a near-uniform or uniform state inside of housing system 503, and a power system 505 to rotate mixing system 504. An incoming gate system 506 regulates bulk volume of particles into EM reactor 500. An outgoing gate system 507 regulates bulk volume of particles exiting EM reactor 500. An EM field containment system 508 blocks, cancels, or diverts to earth ground electromagnetic fields within a prescribed area. A process fluid system 1714 provides gas to process chamber 540 to aid in flow of EM energy, or chemical reaction, or to form a plasma. A fluid supply system 1715 provides gas for inner fluid chamber 531. A fluid supply system 516 provides gas to middle fluid chamber 533. A fluid supply system 516 provides fluid to middle fluid chamber 533. A fluid supply system 517 provides fluid to outer fluid chamber 535. A fluid supply system 518 with spray manifold 478 to introduce gas or liquids into process chamber 540. Sensing system 519 to measure properties at one or more locations and communicate measurement data to computer system 509. A computer system 509 communicating with input sensor system 519, or using a preprogrammed algorithm, or combination thereof, generates an output to one or more systems to control reactor 1700. Reactor 1700 can refer to an apparatus or a method.

Figure 14B:
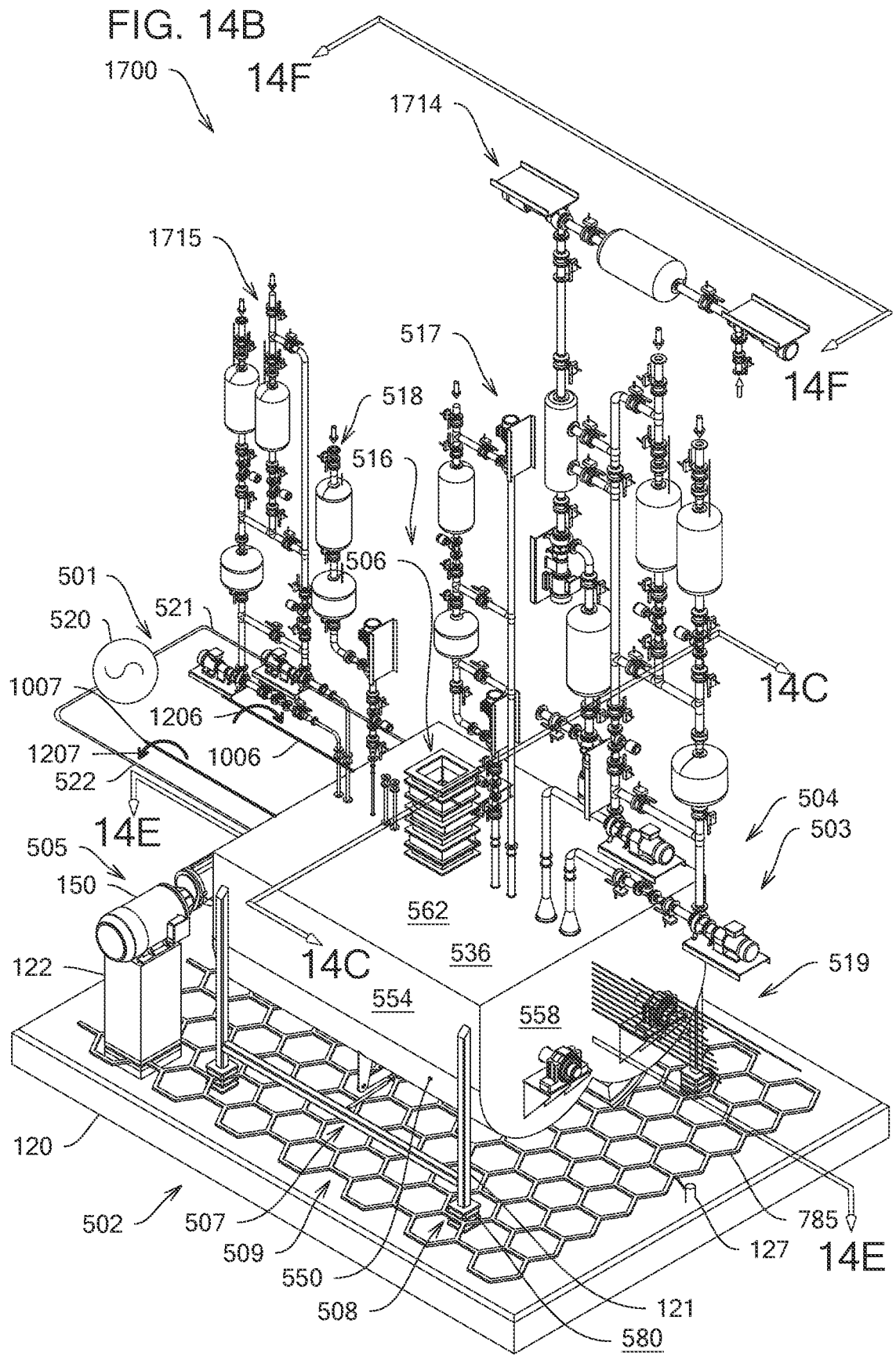
FIG. 14B is an isometric view that shows EM reactor with four sides and top of Faraday Cage removed to more clearly show EM reactor.

FIG. 14B is an isometric view that shows EM reactor 500 with four sides and top of Faraday Cage removed to more clearly show EM reactor 500.

FIG. 14C is a cut end elevational view of the area taken in the direction indicated by line 14C-14C of FIG. 14B to more clearly show systems 1702, 1703, 1704, 1705, 1707.

FIG. 14D is an enlarged end elevational view of the area in FIG. 14D indicated by line 14D of FIG. 14B to more clearly show systems 546, 547, 548, 549.

Figure 14E:
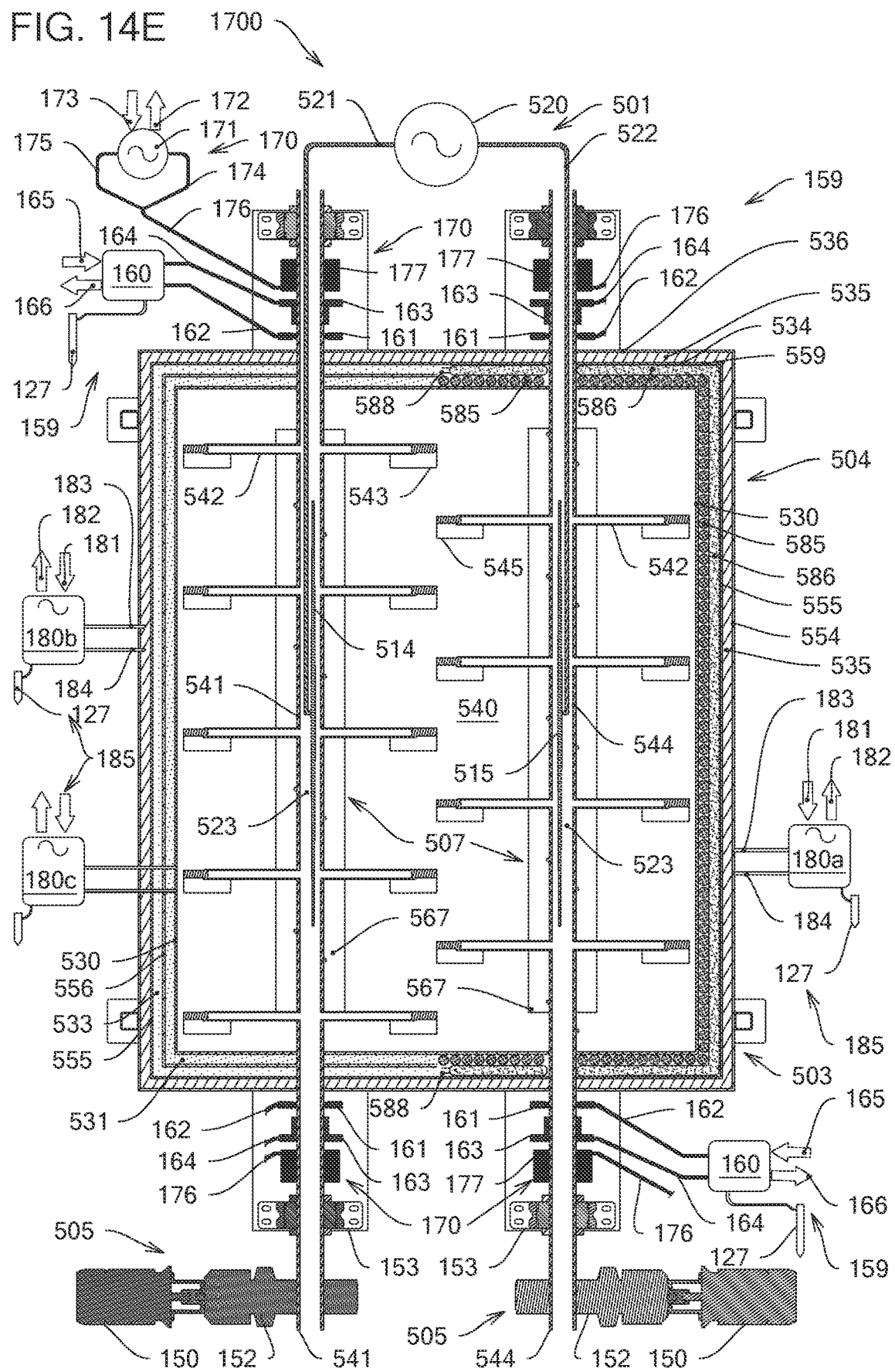
FIG. 14E is cut end top view of the area in FIG. 14E indicated by line 14E of FIG. 14B to more clearly show systems.

FIG. 14E is cut end top view of the area in FIG. 14E indicated by line 14E of FIG. 14B to more clearly show systems 159 170, 185, 1701, 1702, 1703, 1704, 1705, 1707, 1708.

Figure 14F:
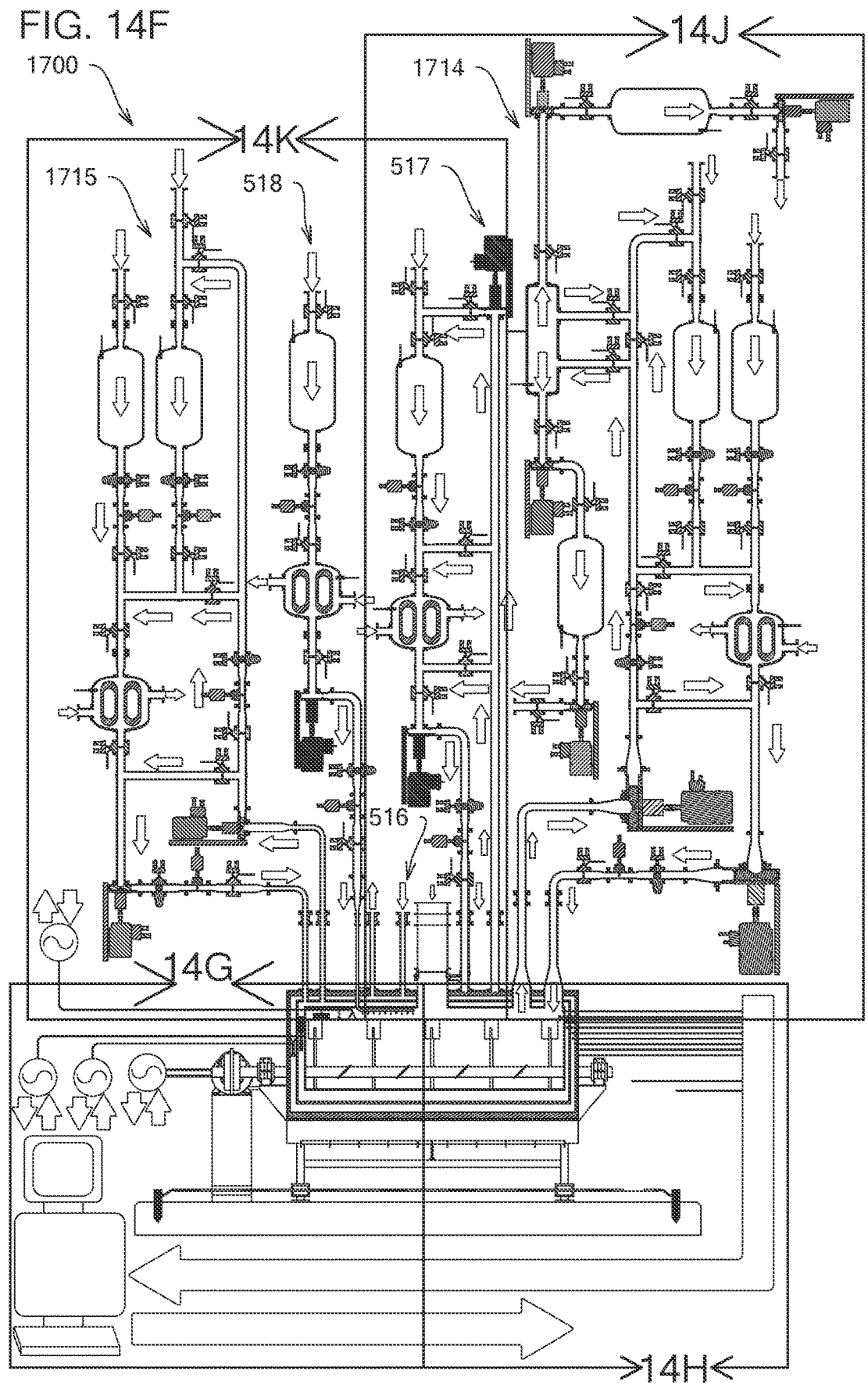
FIG. 14F is a cut front elevational view of the area in FIG. 14F indicated by line 14F of FIG. 13B to show locations of cut views 14G, 14H, 14J, and 14K.

FIG. 14F is a cut front elevational view of the area in FIG. 14F indicated by line 14F of FIG. 13B to show locations of cut views 14G, 14H, 14J, and 14K.

FIG. 14G is an enlarged front elevational cut view of the area in FIG. 14G indicated by line 14G of FIG. 14F to more clearly show systems 470, 1701, 1703, 1704, 1705, 1709, 1710, 1711, 1712.

Figures 14H, 14I:
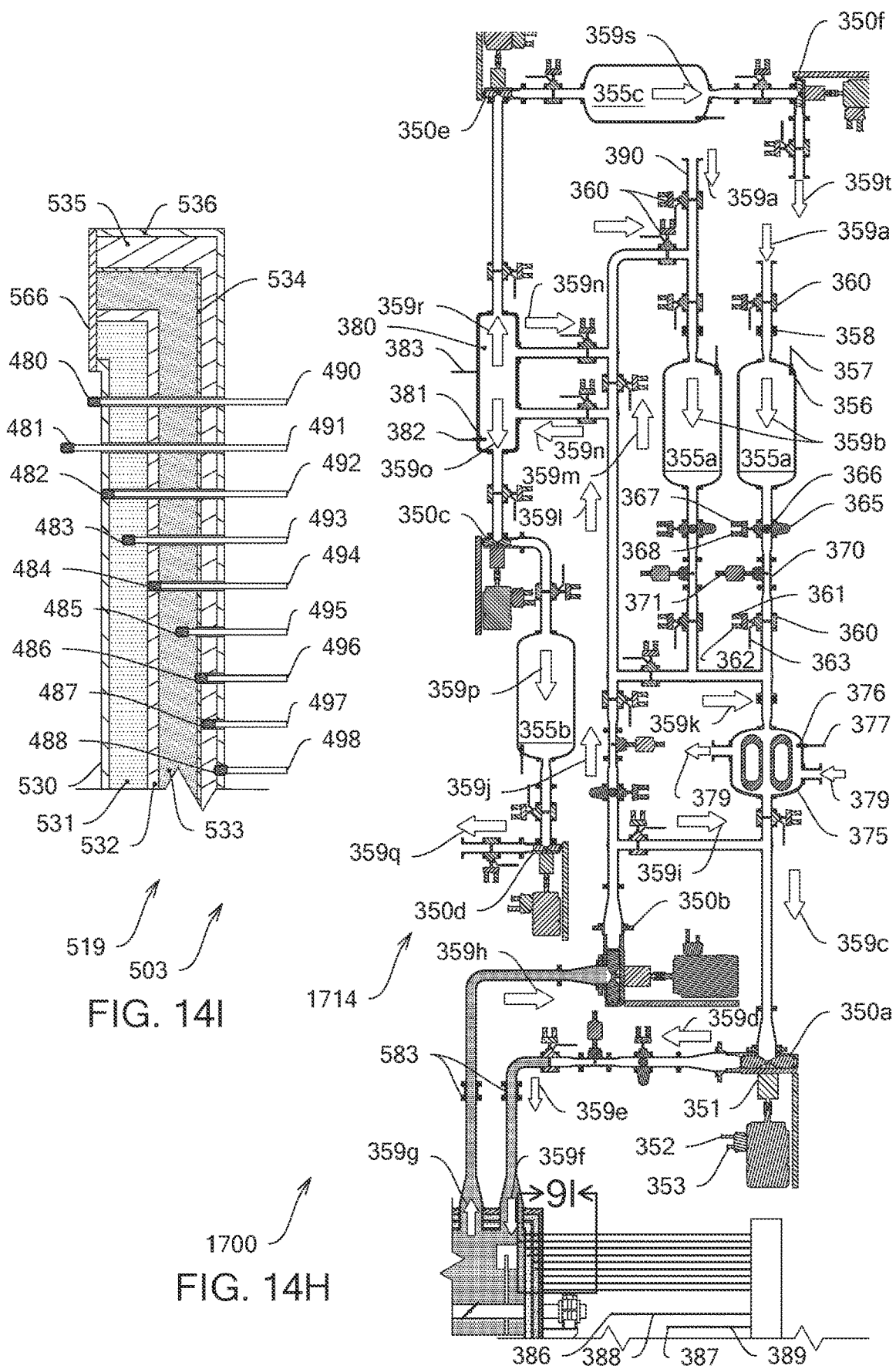
FIG. 14H is a cut view of an enlarged front elevational area in FIG. 14H indicated by line 14H of FIG. 14F to more clearly show system.
FIG. 14I is a cut view of an enlarged front elevational area in FIG. 14I indicated by line 14I of FIG. 14H to more clearly show system.

FIG. 14H is an enlarged front elevational cut view of the area in FIG. 14H indicated by line 14H of FIG. 14F to more clearly show system 1714.

FIG. 14I is an enlarged front elevational cut view of the area in FIG. 14I indicated by line 14I of FIG. 14H to more clearly show system 503, 519.

Figure 14J:
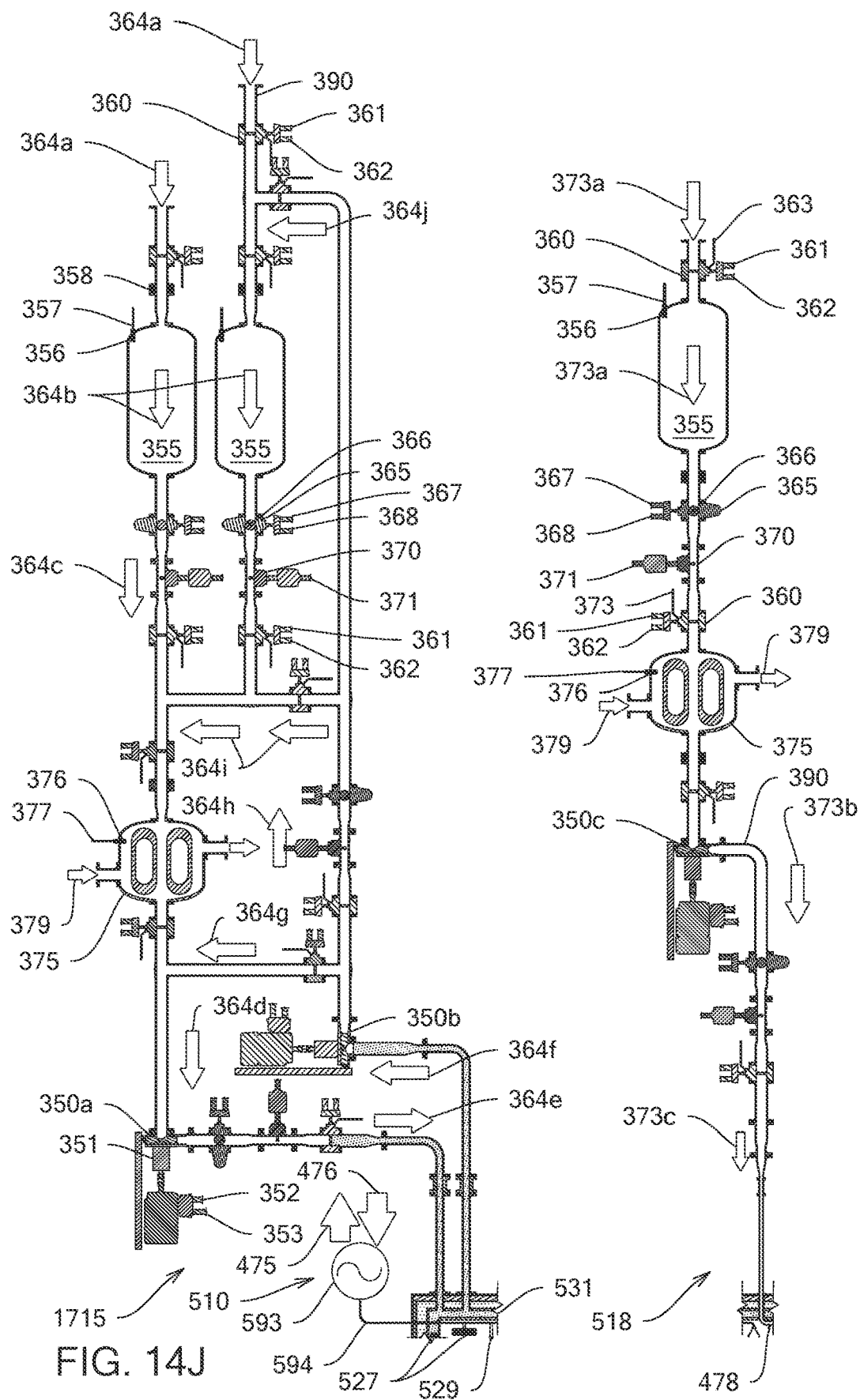
FIG. 14J is a cut view of an enlarged front elevational area in FIG. 14J indicated by line 14J of FIG. 14F to more clearly show system.

FIG. 14J is an enlarged front elevational cut view of the area in FIG. 14J indicated by line 14J of FIG. 14F to more clearly show system 515, 518.

Figure 14K:
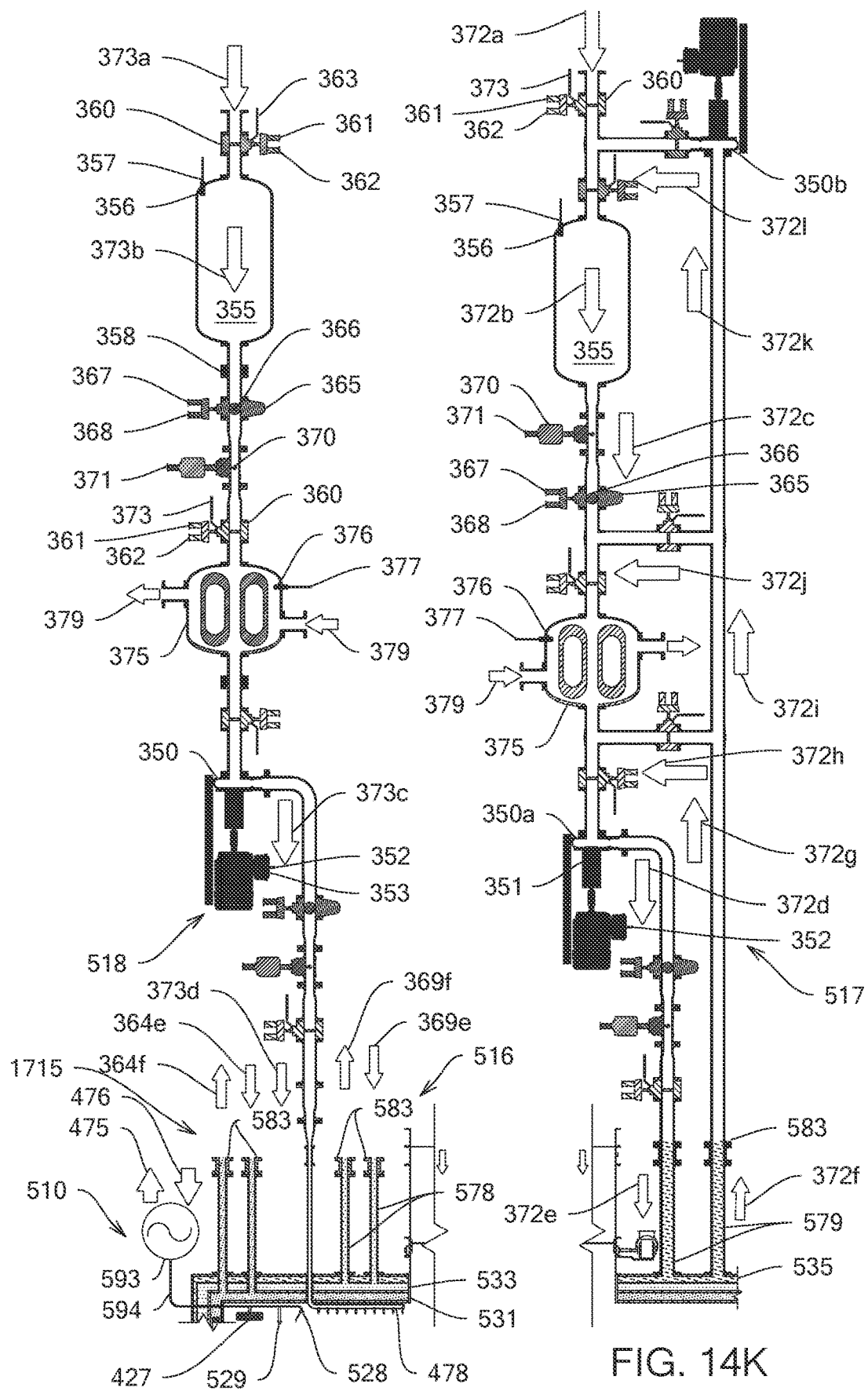
FIG. 14K is a cut view of an enlarged front elevational area in FIG. 14K indicated by line 14K of FIG. 14F to more clearly show system.

FIG. 14K is an enlarged front elevational cut view of the area in FIG. 14K indicated by line 14K of FIG. 14F to more clearly show system 517, 518.

FIG. 14L is an enlarged front elevational cut view of the area in FIG. 14L indicated by line 14L of FIG. 14F to more clearly show system 510, 511, 512.

FIG. 14M is a view of sensing system 519 circuit connections to input bus 472 and output bus 473 circuit connections to systems 1701, 1704, 1705, 1706, 1707, 1710, 1711, 1712, 1714, 1715, 516, 517, 518, 519.

RF signal system 501 depicted in FIGS. 14B and 14E comprising at least one RF signal source 520, circuits 521, 522 and two or more antennas 514, 515 in a dipole configuration. RF signal generating circuitry 520 comprising one or more selected from the group of: RF signal generator, multi-frequency synthesizer, RF signal output control, RF wave generator, RF generator with Silicon Carbide (SiC) transistors, power amplifier, broadband power amplifier, directional coupler, impedance matching system, power supply, power meter, an oscillator, an inverter, a pulse synthesizer, a transformer, a low-to-high frequency converter, or frequency tuning circuitry.

Supports system 502 depicted in FIGS. 14B, 14C, and 14E comprising all supports 121, 122 between earth ground 120 and housing system 503 as well as components of power system 505 such as bearings 153 and motor 150 when they are not mounted on housing system 503. Support system 502 is a can be a natural pathway to ground for RF signal or EM energy.

Housing system 503 depicted in FIGS. 14B, 14C, 14D, 14E, 14G comprising an inner housing 530 nested inside of an outer housing 536. Inner housing 530 and outer housing 536 can have one or more partitions 532, 534 in between themselves to form chambers 531, 533, 535 designed to hold a fluid (gas, liquid, plasma). Inner chamber 531 is between inner housing 530 and first partition 532. Middle chamber 533 is between first partition 532 and second partition 534. Outer chamber 535 is between second partition 534 and outer housing 536.

Only one housing, inner housing 530, is required for a housing system 503. However, some embodiments, especially those that need to absorb or insulate electromagnetic energy escaping chamber 540 can benefit from a multi-layered housing. In all embodiments the inner housing bottom half will be rounded or downwardly semi-circular that is closely spaced with the rotational path 1206 and 1207 of outer periphery 1359 of paddle style vane 543, 545. The upper half of inner housing can be extended to form a wall as shown in FIGS. 14B and 14C. It is not necessary for the outer housing 536 to have the same shape or periphery as the inner housing 530.

There are a wide variety of embodiments for inner housing 530, middle chambers 531, 533, 535, and outer housing 536 depending upon the application. If the bulk volume of particles to receive EM energy are a food product for human consumption, the inner housing 530 will have sanitation requirements that may not be compatible with a material suitable for insulating the radiation. Such an embodiment would require a sanitary inner housing 530 of a radome material that is transparent to radiation such as Teflon, or Corning HPFS® Fused Silica, or Pyrex. Middle chambers 531, 533, 535 and partitions 532, 534, 551, 555, 556, 559 selected for their insulation properties that correspond to EM energy of system, or as a radome if a chamber is to radiate an EM field, and an outer housing 536 typically for structural integrity such as alumina. If the bulk volume of particles to be radiated are highly abrasive or hard, then a suitable material will have to be selected for inner housing. In another embodiment inner housing 530 comprising a reflective surface or material to reflect EM energy back into process chamber 540. In another embodiment inner housing 530 comprises a porcelain material. In another embodiment middle chambers 531, 533, 535 and partitions 532, 534, 551, 555, 556, 559 comprising one or more fluid jackets to radiate, transmit, absorb, receive, or reflect RF signal, or EM energy, or thermal heat. In another embodiment middle chambers 531, 533, 535 and partitions 532, 534, 551, 555, 556, 559 comprising a fluid jacket to heat or cool process chamber 540, or a portion of housing system 503, or combination thereof. In another embodiment, inner housing 530 is lined or embedded with a superconductor sandwiched between two layers of graphene and connected to a RF signal system to transmit and receive THz RF signals in process chamber 540. In another embodiment, inner housing 530 is lined or embedded a wavelength converter, consisting of a plate with mineral fibers that absorbs the radiation which has passed through the process chamber 540 and radiates it back into the process chamber 540 at a different wavelength. The wavelength converter absorbs transmitted infrared radiation, heats up to 500-600° C. and then radiates back medium- and long wave radiation.

In another embodiment, housing system 503 comprising components such as inner housing 530, or outer housing 536, partitions 532, 534, 551, 555, 556, 559 with etching by femto-second laser pulses to etch housing or partition surfaces with nanoscale structures that selectively absorb light only selected wavelengths.

Mechanical movement system 504 comprising a twin shaft 541, 544 with paddles 543, 545 mounted in a 'w' shaped trough housing system 503. Overlapping motion and paddle design facilitates rapid fluidization and ensures excellent movement of particles. Twin shaft 541, 544, counter-rotating paddle vanes 543, 545 lift the particles in the center of the mixer trough, in the fluidized zone, where mixing takes place in a weightless state. Forward antenna 514 is located in cavity 523 within shaft 541 and reverse antenna 515 is located in cavity 523 within shaft 544. Any portion of shaft 541, 544 exposing radiation from antenna 514, 515 can be constructed of one or more radomes materials transparent to EM energy (RF signal flowing between dipole antennas 514, 515), such as Teflon, or Corning HPFS® Fused Silica, or Pyrex to allow RF signal communication between the two dipole antennas 514, 515. Flowing a RF signal between antennas 514, 515 in a dipole configuration creates an EM field in the fluidized zone of mixing system 504.

The mechanical movement of bulk volume of particles system 504 is positioned within the base (round bottom half) 553 of housing system 503 for rotation 1206, 1207 about lengthwise axis 1006, 1007 of shafts 541, 544 with outer periphery 1359 of paddle vane 543, 545 close to inside (facing process chamber 540) of inner housing 530. Shaft 541 and paddle vane 543 rotate clockwise 1206 around lengthwise axis 1006 of shaft 541. Shaft 544 and paddle vane 545 rotate 1207 counter-clockwise around lengthwise axis 1007 of shaft 544.

Power system 505 depicted in FIGS. 14B, 14E, 14F comprising at least one motor 150 for providing rotational movement to mechanical movement system 504, and an optional gearbox 152 between motor(s) 150 and shaft(s) 541, 544 for adjusting speed of rotational 1206, 1207 movement transferred to shaft(s) 541, 544. Power system 505 coupled or connected to shaft(s) 541, 544, each mounted on two more bearings 153 that are mounted on support 121. Whereby power system 505 provides mechanical rotation to mechanical movement system 504 to create forward movement of bulk volume of particles, or to create bulk volume of particles to be in a near-uniform or uniform state, or combination thereof, within process chamber 540.

Incoming gate system 506 depicted in FIGS. 14B, 14C, and 14L allows entry, or restricts entry, or meters entry, or combination thereof of bulk volume of particles into process chamber 540. Incoming system 506 comprising a gate housing 460 with motor 461 that moves gate slide 464 for allowing entry or closing entry of a bulk volume of particles into process chamber 540.

Outgoing (discharge) gate system 507 depicted in FIGS. 14C and 14E comprising 'drop-bottom' or 'bomb door' discharge gates to achieve a complete clear-out of the process chamber 540 between batches. The drop-bottom gate discharge design is rounded or downwardly semi-circular to mate with bottom half of inner-housing 553 when closed. Opening drop-gate 537, 538 virtually eliminates any residue in the mixer body, addressing the increasing concern over cross-contamination Outgoing system 507 comprising a drop door 537, 538 rotatably supported on a hinge arm 571 that is moved by actuator 572 for movement into outlet opening to close process chamber 540 and for movement out of outlet opening to open process chamber 540 which allows bulk volume of particles to fall out of reactor 500. Only one housing, inner housing 567 is required for drop-bottom gate 537, 538

Referring to FIG. 14C there are two embodiments of drop-gates 537, 538. The left drop-gate 537 is comprised of one or more fluid chambers 574, 575, 576. There is an inner fluid chamber 574, 531 comprising between inner housing 567 and first partition 568 for containing a gas used to form a plasma for transmitting, receiving, or absorbing EM energy or RF signals, or contain a coolant to thermally affect temperature in process chamber 540. Ports 577 connect inner chamber 574 to fluid system 1715. There is a middle fluid chamber 575, 533 comprising between first partition 568 and second partition 569 for containing a gas used to form a plasma for transmitting, receiving, or absorbing EM energy or RF signals, or contain a coolant to thermally affect temperature in process chamber 540 Ports 578 connect middle chamber 575, 533 to fluid system 516. There is an outer fluid chamber 576, 535 comprising between second partition 569 and outer housing 570 for containing fluid used to form a plasma for transmitting, receiving, or absorbing EM energy or RF signals, or contain a coolant to thermally affect temperature in process chamber 540. Ports 579 connect outer chamber 535, 576 to fluid system 517.

EM energy field (or RF signal) containment system 508 depicted in FIGS. 14A, 14B, 14C, 14G, 14H, 14K and 14L comprising a ground stake 127, Faraday cage 785, shaft grounding and monitoring system 159, shaft RF signal cancellation system 170, housing RF signal cancellation and ground system 185, insulator standoffs 580, 581, 582, 583, and inlet RF signal cancellation 953. One apparatus to contain RF signal or EM energy to a prescribed working location is a Faraday cage 785 with circuit to earth ground stake 127.

A RF/EM shaft grounding and monitoring system 159 depicted in FIG. 14E directs to earth ground RF signals or EM energy that have traveled on shaft 541 beyond chamber 540. A RF signal or EM energy diverter ring 161 on shaft 541, 544 directs RF/EM through circuit 162 to earth ground stake 127. Circuit 162 can direct monitor 160. A RF/EM shaft monitoring system 159 for sensing RF signals or EM energy that has traveled on shaft 541 beyond housing system 503. A sensor 163 on shaft 541, 544 with circuit 164 to monitor 160 for RF signal or EM energy and communicate data with computer 471 with input 165 to computer 471. Output 166 from computer 471 to monitor 160.

A RF/EM shaft cancellation system 170 presents an out-of-phase frequency to shaft 541, 544 with antenna 177, 953 to cancel radio frequency signals or electromagnetic energy that have traveled beyond housing 503 on shaft 541, 544. Phase cancellation occurs when two signals of the same frequency are out of phase with each other resulting in a net reduction in the overall level of the combined signal. If two identical signals are 100% or 180 degrees out of phase, they will completely cancel one another if combined. Shaft phase cancellation system 170 depicted in FIGS. 14C and 14E comprising RF signal generating circuitry 171, forward circuit 174, coaxial circuit 176 represents circuit 174, 175, reverse circuit 175, input bus 172, output bus 173, and cancellation antenna 177, 953. Cancellation antennas 177, 953 comprised of a metallic material or a formed plasma. A cancellation antenna 177, 953 can be located wherever a RF signal or EM energy might escape the confines of housing system 503 such as inlet antenna 953. Phase cancelling circuitry 170 comprising one or more selected from the group of: RF signal generator, multi-frequency synthesizer, RF signal output control, RF wave generator, RF generator with Silicon Carbide (SiC) transistors, power amplifier, broadband power amplifier, directional coupler, impedance matching system, power supply, power meter, an oscillator, an inverter, a pulse synthesizer, a transformer, a low-to-high frequency converter, frequency tuning circuitry, or network analyzer.

Depicted in FIGS. 14C and 14E a RF/EM monitoring, grounding, and cancellation system 185 connected to housing system 503 for sensing, grounding to earth, or phase cancellation of RF signals or EM energy beyond process chamber 540 such as inner housing 530, or middle chambers 531, 533, 535, or partitions 532, 534, 551, 555, 556, 559, or outer housing 536. System 185 forward circuit 183 and reverse circuit 184 connect outer housing 536 to monitor 180a. Forward circuit 183 and reverse circuit 184 connect outer chamber 535 to monitor 180b. Forward circuit 183 and reverse circuit 184 connect inner housing 530 to monitor 180c. Monitor 180a, 180b, 180c sensing housing, chambers, or partitions for RF signals or EM energy and communicating data with computer 741 via input bus 182 and receiving operation signals from output bus 181.

Monitor 180a, 180b, 180c connected to earth ground stake 127 to ground housing and can switch between grounded and electrically-isolated. It may not always be desirable for housing system 503 to always be grounded as the housing could be easier for a dipole antenna to communicate with than an opposing dipole antenna. In many such instances to electrically-isolate antenna 514, 515 will need to be electrically isolated during operation, which may require the housing 503 to be electrically isolated from earth ground. However, the housing 503 may build up static electric that will need to be discharged. Monitor 180a, 180b, 180c of system 185 can provide out-of-phase frequency to cancel radio frequency signals or electromagnetic energy that have traveled to inner housing 530, or chambers 531, 533, 535, or partitions 532, 534, 551, 555, 556, 559, or outer housing 536. Sub-systems 159, 170, 185 of containment system 508 can be used independently as standalone, or in combinations thereof.

Depicted in FIGS. 14C, 14G, 14K and 14L is an EM/RF containment system 508 further comprising insulator standoffs 580, 581, 582, 583 with high electrical resistance to prevent the unintentional flow of EM/RF to support system 502, inlet system 506, or fluid systems 516, 517, 518, 1714, 1715. Standoff 580 located on support structure 121. Standoff 581 located on inlet gate system 506. Standoff 582 located on power support structure 122. Standoff 583 located on fluid pipe on systems 516, 517, 518, 1714, 1715.

Direct femtosecond (fs) laser processing is a maskless fabrication technique that can effectively modify the optical, electrical, mechanical, and tribological properties of materials. In another embodiment of system 508, housing system 503 comprising components such as inner housing 530, or outer housing 536, partitions 532, 534, 551, 555, 556, 559 with etching by femto-second laser pulses to housing or partition surfaces with nanoscale structures that selectively only absorb selected wavelengths, such as EM fields escaping process chamber 540.

Computer system 509 depicted in FIGS. 14E, 14F, 14G, and 14M comprising one or more computer 741, an input bus 166, 172, 182, 472, 475, or an output bus 165, 173, 181, 473, 476, or combination thereof. Computer 741 for receiving and storing two or more property data measurements in stored memory of computer and determine one or more relationships between these two or more property measurements. By operation of computer 741 using one or more selected from the group comprising of: one or more relationships between sensed measurement data stored in memory of computer 741, or an algorithm programmed into stored memory of computer 741, or operational sequencing programmed into stored memory of computer 741, or a recently sensed measurement data signal, or combination thereof, to generate one or more output control signals to one or more systems selected from the group comprising of: RF signal generating system 501, or power system 505, or combination thereof, for operating EM reactor system 500. Thereby controlling a temperature or rate of heating, or combination thereof in bulk volume of particles located in process chamber 540 in response to a stored relationship, or a pre-programmed algorithm, or pre-programmed operational sequence, or a recently sensed property data signal, or combination thereof, thereby heating or causing a biological or chemical reaction in at least one substance residing in bulk volume of particles from exposure to EM energy, and defining a process chamber 540.

RF signal system 510 depicted in FIG. 14G comprising at least one RF signal source 593, circuits 594, 596 and one or more antennas 526, 527, 528, 529, 591, 590 of various configurations to depict other apparatuses and means for coupling a RF signal or radiating an electric field or magnetic field into process chamber 540. Antenna 526 comprising a LED emitter that radiates an infrared (IR), or visible, or ultra-violet (UVR) wavelength into process chamber 540.

Antenna 527 comprising a bulb that radiates an infrared (IR), or visible, or ultra-violet (UVR), or X-ray spectrum of radio frequency. A waveguide is a structure that guides waves, such as electromagnetic waves or sound, with minimal loss of energy by restricting the transmission of energy to one direction. There are different types of waveguides for different types of waves. The most common is a hollow conductive metal pipe used to carry high frequency radio waves, particularly microwaves. Dielectric waveguides are used at higher radio frequencies, and transparent dielectric waveguides and optical fibers serve as waveguides for light. Antenna 528 comprising a waveguide (hollow pipe or tube, dielectric, transparent, and optical fibers) that guides EM energy to process chamber 540. A laser is a device that emits light through a process of optical amplification based on the stimulated emission of electromagnetic radiation. In other words, a device that stimulates atoms or molecules to emit light at particular wavelengths and amplifies that light, typically producing a very narrow beam of radiation. A laser differs from other sources of light in that it emits light which is coherent. The laser EM energy emission generally covers an extremely limited range of visible, infrared, or ultraviolet wavelengths.

Antenna 590 comprising a dipole antenna with horn that directs EM energy in radiation chamber 540. Antenna 591 comprising a fiber optic that directs EM energy in radiation chamber 540. In another embodiment, RF signal system 510 and one or more antennas 526, 527, 528, 529, 591, 514, 515 can be an ionizer by providing an ionizing current or voltage to form a plasma in process chamber 540 from the ionizing material. In another embodiment, RF system 501 provides the ionizing current or voltage from its RF signal to form a plasma and system 510 couples a frequency to be transmitted by formed plasma throughout process chamber 540. A formed plasma in process chamber 540 while bulk volume of particles is in a state of fluidization can act as a conduit for each particle to be surrounded by a conductor so every particle regardless of shape gets evenly exposed to EM energy.

RF signal system 1711 depicted in FIG. 14G comprising at least one RF signal source 595, circuit 596 and one or more antennas 526, 527 (or not shown alternatives 527, 528, 529, 590, 591) of various configurations to depict other apparatuses and means for coupling a RF signal or radiating an EM field into inner chamber 531. In another embodiment, RF signal system 1711 and one or more antennas 528, 529, 590 (or not shown alternatives 527, 528, 529, 591) can be an ionizer by providing an ionizing current or voltage to form a plasma inside inner chamber 531 from the ionizing material.

RF signal system 1712 depicted in FIG. 14G comprising at least one RF signal source 597, circuit 598 and one or more antennas 528, 529, 590 (or not shown alternatives 527, 528, 529, 591) of various configurations to depict other apparatuses and means for coupling a RF signal or radiating an EM field into middle chamber 533. In another embodiment, RF signal system 1712 and one or more antennas 528, 529, 590 (or not shown alternatives 526, 527, 528, 529, 591) can be an ionizer by providing an ionizing current or voltage to form a plasma inside middle chamber 533 from the ionizing material.

RF signal generating circuitry 1710, 1711, 1712 comprising one or more selected from the group of: RF signal generator, ionizer circuitry, ionizer igniter, Tesla igniter, multi-frequency synthesizer, RF signal output control, RF wave generator, RF generator with Silicon Carbide (SiC) transistors, power amplifier, broadband power amplifier, directional coupler, impedance matching system, LED controller, bulb controller, power supply, power meter, an oscillator, an inverter, a pulse synthesizer, a transformer, a low-to-high frequency converter, or frequency tuning circuitry.

Process fluid mechanical system 1714 depicted in FIG. 14H comprising piping and mechanical equipment 390, valves 358, 360, 365, and sensors (351, 356, 366, 370, 376, 381) to receive 359a, store 355a, 355b 355c mix, condition 375 (heat exchanger), pump 350a, 350b, 350c fluid into process chamber 540, develop and hold process chamber 540 in a vacuum, negative, or positive pressure, reclaim fluid from process chamber 540, condition (heat exchanger 375), recycle/return to process chamber 359i, or return to storage, or go to separator 380 to be separated into at least two fractions, each of which can be stored, and pumped out of system 359q, 359t. In another embodiment mechanical system 1714 can provide cool or hot air or gas to process chamber 540 with heat exchanger 375. In another embodiment mechanical system 1714 can provide the gas and environment to form a plasma in chamber 540. Arrows 359a through 359t show flow through system 1714 depicted on FIG. 14H. Arrow 379 shows fluid entering and exiting heat exchanger 375 to change temperature of fluid going to process chamber 540 or to change temperature of fluid having exited chamber 540.

Process fluid mechanical system 1715 depicted in FIG. 14J comprising mechanical equipment 390, valves 358, 360, 365, and sensors (351, 356, 366, 370, 376, 381) to receive 359a, store 355 mix, condition 375 (heat exchanger), pump 350 fluid into inner fluid chamber 531, develop and hold inner fluid chamber 531 in a vacuum, negative, or positive Process fluid mechanical system 1715 depicted in FIG. 14J pressure, reclaim fluid from inner fluid chamber 531, condition (heat exchanger 375), recycle/return to process chamber 364g, 364i or return to storage 355. In another embodiment mechanical system 1715 can provide cool or hot air or gas to inner fluid chamber 531 with heat exchanger 375. In another embodiment mechanical system 1715 can provide the gas and environment to form a plasma in inner fluid chamber 531. Arrows 364a through 364i show flow through system 1715 depicted on FIG. 14J. Arrow 364i returning back to storage 355.

Only the ports 577, 578, 579, port standoff 583, and direction arrows 369e, 369f are shown in FIGS. 14K and 14L because process fluid mechanical system 516 suppling fluid to middle chamber 533 has similar characteristics as inner system 1715 and outer system 535 which are clearly illustrated and explained in this application. Process fluid mechanical system 516 comprising piping and mechanical equipment 390, valves 358, 360, 365, and sensors (351, 356, 366, 370, 376) to receive 372a, store 355a, 355b, 355c mix, condition 375 (heat exchanger), pump 350a, 350b fluid into middle fluid chamber 533, develop and hold middle fluid chamber 533 in a vacuum, negative, or positive pressure, reclaim fluid from middle fluid chamber 533, condition (heat exchanger 375), recycle/return to middle fluid chamber 533, or return to storage 355. In another embodiment mechanical system 516 can provide cool or hot air or gas to middle fluid chamber 533 with heat exchanger 375. In another embodiment mechanical system 516 can provide the gas and environment to form a plasma in middle fluid chamber 533. Arrows 369e through 369f show system 515 connection ports 578 to middle chamber 533 on FIGS. 14K and 14L.

Process fluid mechanical system 517 depicted in FIG. 14K comprising piping and mechanical equipment 390, valves 360, 365, and sensors (351, 356, 366, 370, 376) to receive 359a, store 355 mix, condition 375 (heat exchanger), pump 350 fluid into outer fluid chamber 535, develop and hold outer fluid chamber 535 in a vacuum, negative, or positive pressure, reclaim fluid from outer fluid chamber 535, condition (heat exchanger 375), recycle/return to process chamber 372h, 372j or return to storage 355. In another embodiment mechanical system 517 can provide cool or hot air or gas to outer fluid chamber 535 with heat exchanger 375. In another embodiment mechanical system 517 can provide the gas and environment to form a plasma in outer fluid chamber 535. On FIG. 14K arrows 372a-372l show flow through system 517.

Process fluid mechanical system 518 depicted in FIG. 14K comprising piping and mechanical equipment 390, valves 358, 360, 365, and sensors (351, 356, 366, 370, 376, 381) to receive 373a, store 355 mix, condition 375 (heat exchanger), pump 350 fluid into process chamber 540 with a spray nozzle or spray manifold 478. On FIG. 14K arrows 373a, 373b, 373c, 373d show flow through system 518.

Most of the components of mechanical system 516, 517, 518, 1714, 1715 can optionally have a sensor 351, 356, 366, 370, 376, 381, 386, 387 with circuit 352, 357, 361, 367, 371, 377, 382 to input bus 472. Most of the components of mechanical system 516, 517, 518, 1714, 1715 can optionally receive a control signal from output bus 473 with circuit 353, 362, 368, 383. The schematics of FIG. 14H is not intended to depict an exact mechanical system, but instead provide a very basic representation of an industrial grade system. System 516, 517, 518, 1714, 1715 can be as simple as a storage 355 tank with some piping 390 and a manual 363 flow valve 360. The actual equipment, simplicity, or complexity, or degree of automation will be dictated by process requirements, regulatory requirements, and owner requirements.

Sensor system 519 depicted in FIGS. 14B, 14H, 14I, and 14M comprising one or more sensor 386, 387, 480, 481, 482, 483, 454, 485, 486, 487, 458 with circuit 358, 389, 490, 491, 492, 493, 494, 495, 496, 497, 498 to input bus 472 for transferring sensor data signal to at least one computer 471. One or more sensors 386, 387, 480, 481, 482, 483, 454, 485, 486, 487, 458 for measuring at least one type of property data in one or more measurement locations and generating at least one measurement data signal. One or more measurement locations comprising one or more from the group of: environment of process chamber 540, bulk volume of particles in process chamber 540, e housing 530, or chambers 531, 533, 535, or partitions 532, 534, 551, 555, 556, 559, or outer housing 536, or system 159, 170, 180, 501, 504, 505, 506, 507, 509, 510, 516, 517, 518, 519, 546, 547, 548, 549, 1711, 1712, 1714, 1715 or combination thereof. Sensor 480 collects property data from area above mixing within process chamber 540 and communicates data with circuit 490 to input bus 472. Sensor 481 collects property data from mixing area within process chamber 490 and communicates data with circuit 491 to input bus 472. Sensor 482 collects property data from inner encasement 530 and communicates data with circuit 492 to input bus 472. Sensor 483 collects property data from inner chamber 531 and communicates data with circuit 493 to input bus 472. Sensor 484 collects property data from middle partition 532 and communicates data with circuit 494 to input bus 472. Sensor 485 collects property data from middle chamber 533 and communicates data with circuit 495 to input bus 472. Sensor 486 collects property data from outer partition 534 and communicates data with circuit 496 to input bus 472. Sensor 487 collects property data from outer chamber 535 and communicates data with circuit 497 to input bus 472. Sensor 488 collects property data from outside housing 536 and communicates data with circuit 498 to input bus 472.

Process monitoring sensor 386, 387, 480, 481, 482, 483, 484, 485, 486, 487, 488 generates a signal that correlates to a measurement property comprising one or more selected from the group of: temperature, radio frequency, dielectric characteristics, resonance frequency, pressure, electrical conductivity, voltage, current, electrical permittivity, magnetic permeability, electrical field intensity, magnetic field intensity, magnetic flux density, infrared, electron density, spectral absorption, or chemical composition.

In another embodiment inner housing 530, or chamber 531, 533, 535, or partition 532, 534, 551, 555, 556, 559, or outer housing 536, or shaft 541, 544 or support bar 542, or vane 543, 545 or combination thereof, is lined or embedded with a superconductor sandwiched between two layers of graphene that act as sensors to sense and transmit THz frequency signals in process chamber 540 to input bus 472. It is made of a graphene-superconductor hybrid, where electrons and Cooper pairs couple by Coulomb forces. The transistor operates via the propagation of surface plasmons in both layers, and the origin of amplification is the quantum capacitance of graphene. It leads to THz waves amplification, the negative power absorption, and as a result, the system yields positive gain, and the hybrid acts like an optical transistor, operating with the terahertz light.

In another embodiment inner housing 530, or fluid chamber 531, 533, 535, or partition 532, 534, 551, 555, 556, 559, or outer housing 536, or shaft 541, 544 or support bar 542, or vane 543, 545 or combination thereof, is lined or embedded with a transistor channel, made of bilayer graphene, is sandwiched between two crystals of hexagonal boron nitride. This structure is placed on an oxidized silicon substrate. The two sleeves of a terahertz antenna are connected between the source and electrodes resulting in a compact terahertz spectrometer, several microns in size, with the resonant frequency controlled via voltage tuning. By measuring the current in the detector at various frequencies and electron densities, plasmon properties can be revealed. A sensitive detector and a spectrometer operating in the terahertz range, and as a tool for studying plasmons.

RF signal system 546 depicted in FIG. 14D comprising at least one RF signal source (not shown), circuits 588, 589 and located in middle chamber 533 is one or more tubes 586 filled with a gas suitable to form a plasma. Circuit 588 connecting RF signal source to Helmholz coil 587 that provides a primary RF signal to form a plasma in tube 586. Laser 529 provides a second RF signal to plasma tube 586 that transmits second RF signal to process chamber 540. In another embodiment, laser 529 provides primary RF signal to form plasma in tube 586 and Helmholz coil 587 provides a second RF signal to plasma tube 586 that transmits second RF signal to process chamber 540.

RF signal system 547 depicted in FIG. 14D comprising at least one RF signal source (not shown), circuit 589 and located in inner chamber 531 is one or more tube 585 filled with a gas suitable to form a plasma. Circuit 588 connecting RF signal source to Helmholz coil 587 that provides a primary RF signal to form a plasma in tube 585. Circuit 588 connecting a second RF signal source to filament 584 in plasma tube 585 that transmits second RF signal to process chamber 540. In another embodiment, filament 584 provides primary RF signal to form plasma in tube 585 and Helmholz coil 587 provides a second RF signal to plasma tube 585 that transmits second RF signal to process chamber 540.

RF signal system 548 depicted in FIG. 14D comprising at least one RF signal source (not shown), circuit 588 and located in inner chamber 531 is one or more tubes 585 filled with a gas suitable to form a plasma. Circuit 558 connecting RF signal source to Helmholtz coil 587 that provides a primary RF signal to form a plasma in tube 585. Dipole antenna 590 provides a second RF signal to plasma tube 585 that transmits second RF signal to process chamber 540. In another embodiment, dipole antenna 590 provides primary RF signal to form plasma in tube 585 and Helmholtz coil 587 provides a second RF signal to plasma tube 585 that transmits second RF signal to process chamber 540.

RF signal system 549 depicted in FIG. 14D comprising of at least one RF signal source (not shown), circuits 588 and located in middle chamber 533 is one or more tubes 586 filled with a gas suitable to form a plasma. Circuit 588 connecting RF signal source to Helmholz coil 587 that provides a primary RF signal to form a plasma in tube 586. Waveguide antenna 528 provides a second RF signal to plasma tube 586 that transmits second RF signal to process chamber 540. In another embodiment, Waveguide antenna 528 provides primary RF signal to form plasma in tube 586 and Helmholz coil 587 provides a second RF signal to plasma tube 586 that transmits second RF signal to process chamber 540.

Figure 15B:
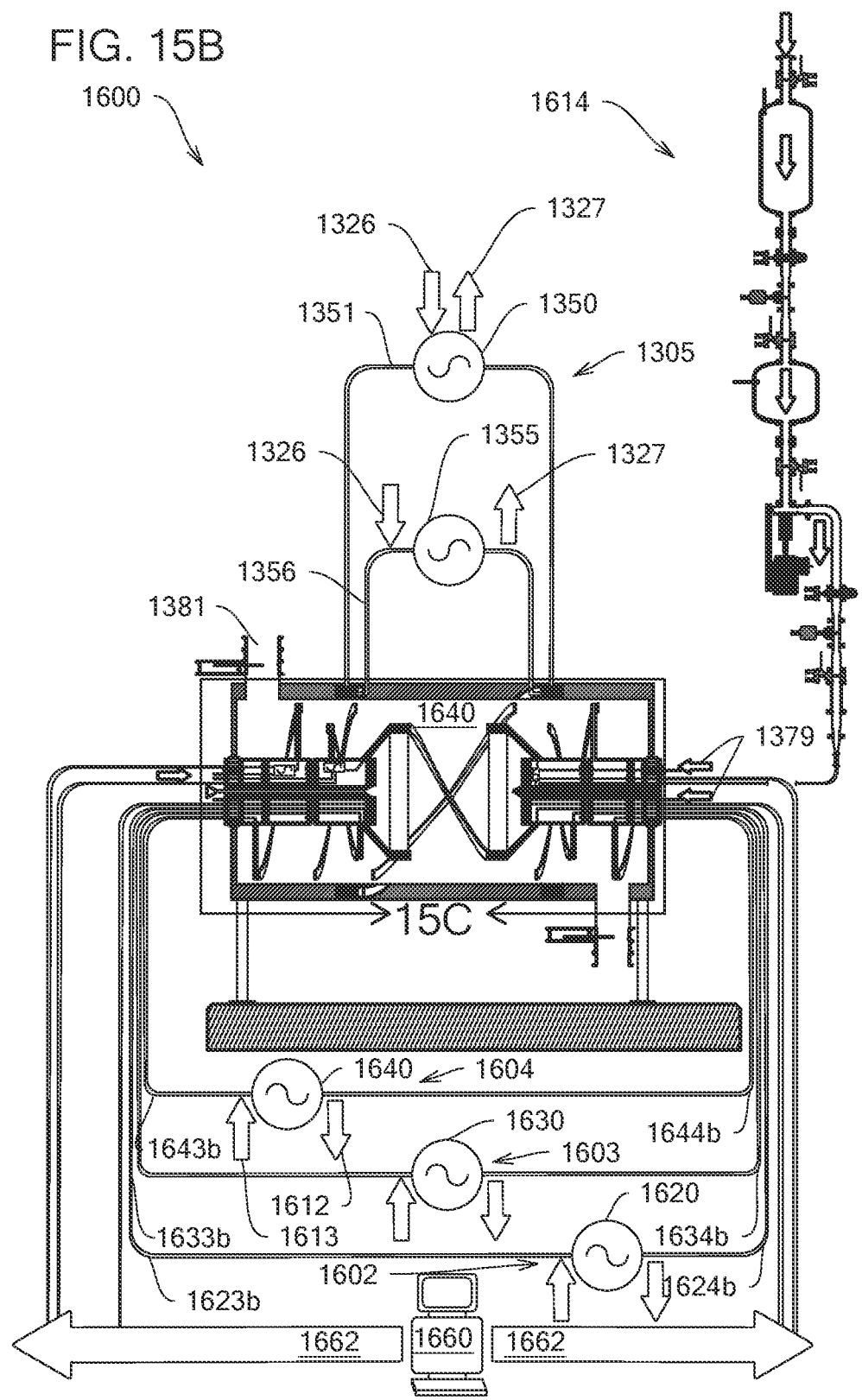
FIG. 15B is a cut view of the area taken in the direction indicated by line 15B-15B of FIG. 15A to more clearly show the internal components.
Figure 15C:
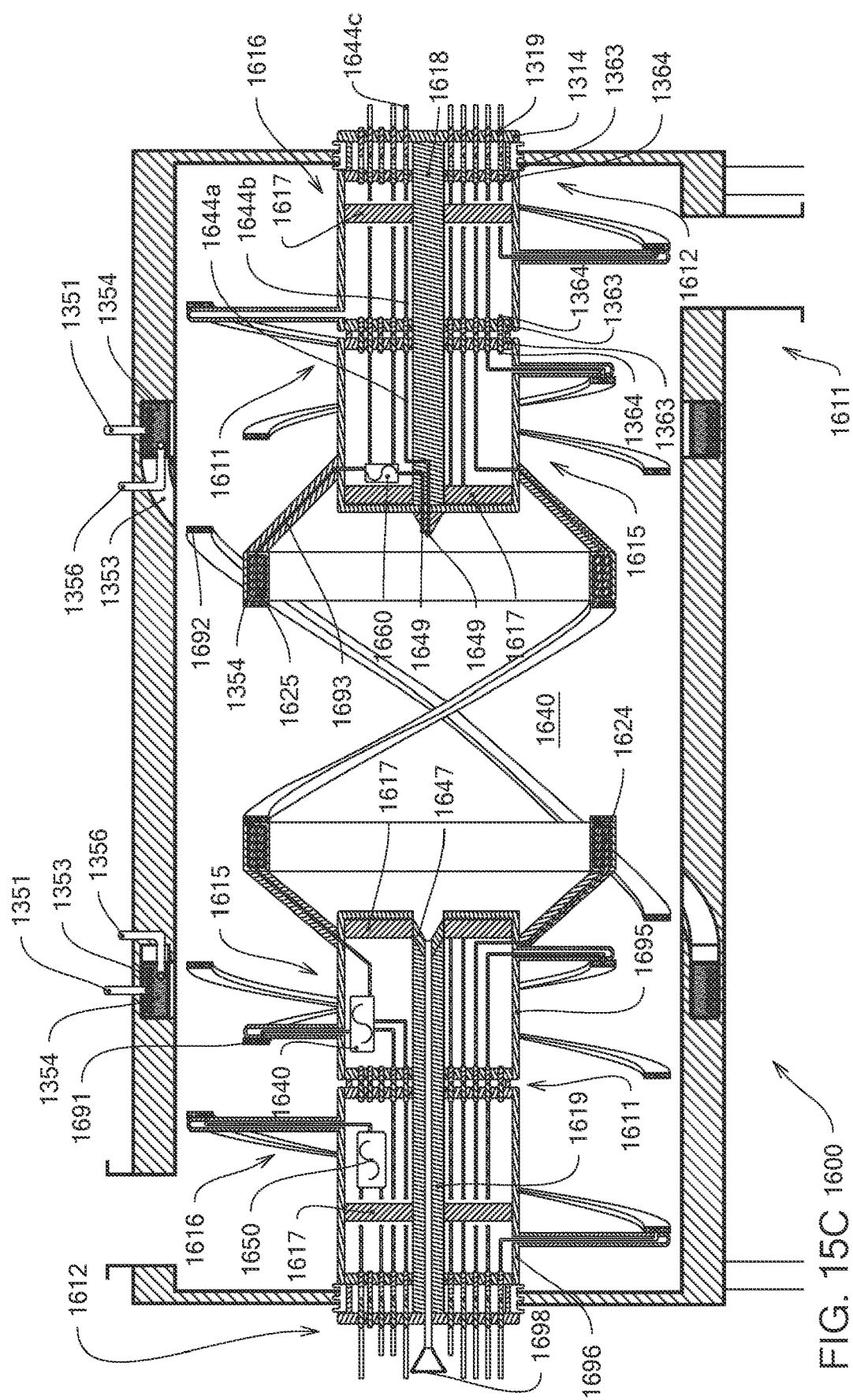
FIG. 15C is an enlarged front elevational view of the area in FIG. 15C indicated by line 15C of FIG. 15B to more clearly show the internal components.

FIGS. 15A, 15B, and 15C:

FIG. 15A is an isometric view of a radiation reactor 1600 that depicts five different embodiments of a radio frequency (RF) signal generating circuitry system 1602, 1603, 1604, 1605 to provide electromagnetic energy, RF signal systems 1620, 1630, 1305, 1660, 1670, 1680 can be used individually as a standalone RF source, or combination thereof, to provide electromagnetic energy to bulk volume of particles, a support system 1301 between earth ground and housing system 1307, a mixing system 1609 that is mounted in housing system 1307 and energized by power system 1610. A computer system 1607 communicating with sensor system 1339 or using a preprogrammed algorithm, or combination thereof, generates an output to systems 1602, 1603, 1604, 1605, 1305 to operate reactor 1600. A slip ring system 1313 allows the transmission of electric AC/DC power, RF signals, fluid, or gas from stationary equipment to antenna 1324, 1325, 1346, 1349 inside of rotating mixing system 1609.

Radio frequency (RF) signal source system 1602 depicted in FIGS. 15A through 15C comprising at least one RF signal generating circuitry 1620 and one or more antennas 1624 and 1625 in a dual Helicon coil configuration. Antennas 1624 and 1625 are comprised of a metallic material or a formed plasma. Antenna 1624 and 1625 are connected to ribbon vane.

Computer system 1606 depicted in FIGS. 15A through 15B comprising of one or more computer 1660 and an output bus 1661. Computer 1660 for receiving and storing two or more property data measurements in stored memory of computer and determine one or more relationships between these two or more property measurements. By operation of computer 1660 using one or more selected from the group comprising of: one or more relationships between sensed measurement data stored in memory of computer 1660, or an algorithm programmed into stored memory of computer 1660, or a recently sensed measurement data signal, or combination thereof, to generate one or more output control signals to one or more systems selected from the group comprising of: RF signal generating system 1602, or 1603, or 1604, or 1605, or 1305 or power system 1609, or combination thereof, for operating EM reactor system 1600.

Mechanical movement system 1609 depicted in FIGS. 15B and 15C comprises an inner shaft 1618, 1619 connected to at least one internal motor 1617 that is connected to at least one outer shaft 1695. Outer shaft 1695 connected to at least one vane 1691, 1692. In some embodiments shaft 1695 or vane 1691, 1692, or combination thereof comprise at least one aperture made of a material transparent to EM energy, such as Teflon, a castable ceramic, a 3d printed material, or Pyrex.

The mechanical movement of bulk volume of particles system 1609 is positioned within the base (bottom half) portion of housing system 1608 for rotation about lengthwise axis of shaft 1618, 1619 with outer periphery of vane 1691, 1692 close to inside (facing process chamber 1640) of inner housing. The angle of vane 1691, 1692 defines the rotational path of the mechanical movement system 1609. The vane 1691, 1692 may be angled with respect to the axial dimension of the bottom half inner housing for promoting movement, agitation, or mixing, or combination thereof, of bulk volume of particles within chamber 1640.

Power system 1610 depicted in FIGS. 15B through 15C comprising at least one motor 1617 for providing mechanical rotational movement. Shaft 1618, 1619 is mounted to housing. Whereby power system 1610 provides mechanical rotation to mechanical movement system 1609 to create forward movement of bulk volume of particles or to create bulk volume of particles to be in a near-uniform or uniform state, or combination thereof, within process chamber 1640.

A unique aspect of the embodiment of EM reactor 1600 compared to previous examples in this application is the use of a slip ring system 1611, 1612 which allows the transmission of electric AC/DC power, RF signals, fluid, from stationary equipment to rotating mixing system 1609. Slip ring system 1612 is similar to previously disclosed systems. Slip ring system 1611 is different in that it comprises two rotating ends 1363 with rotating connection (fluid, RF signal, and electric) 1364. Slip ring system 1611 allows passage of electrical power, RF signals, or fluid from one outer rotating shaft 1696 to another outer rotating shaft 1695. With both outer rotating shafts 1695 and 1696 being powered by an internal motor 1617 mounted on and rotating about the lengthwise axis of inner shaft 1618, 1619 that is stationary, the two outer shafts 1695 and 1696 and their respective vanes 1691, 1692 and antenna(s) 1624, 1625, 1691, 1692 are able to rotate around each other. An inner movement system 1615 comprising an outer shaft 1695 connected to vane 1691 and helicon antenna 1624 and 1625. An outer movement system 1616 comprising an outer shaft 1695 connected to vane 1692. The inner movement system 1615 can rotate 1215 around lengthwise axis 1016 within outer movement system 1616. Outer system 1616 rotates 1216 around lengthwise axis 1016. In another embodiment, the ribbon vanes 1691 and 1692 can be angled to act as a fan to pressurize the process chamber 1640. With the correct configuration of angle of ribbon vanes 1691 and 1692 and pressure ball can be established in the center of the process chamber 1640 where the gas nozzle 1692 and antenna 1649 are located to form a high-pressure, or extremely-hot ball of plasma. The ball of plasma can provide extremely high heat to bulk volume of particles in process chamber 1640, albeit the chamber 1640 may be only partially filled.

Gas system 1614 depicted in FIGS. 15A through 15B is similar to system 518 except that it is providing a fluid through slip ring systems 1611 and 1612 and circuit tube 1644a, 1644b, 1644c and nozzle 1649 into to the process chamber 1640. Magnetic gate 1647 provides controlled release of contents from process chamber 1640. Magnetic nozzle 1698 provides controlled release of contents in process chamber 1640 from reactor 1600.

Radio frequency (RF) signal source system 1660 depicted in FIG. 15C providing RF signal to dual spiral Helicon coils 1624 and 1625 as well as to antenna 1692 that radiates EM energy into process chamber 1640, and in conjunction with gas system 1614 can form a plasma in process chamber 1640.

CONCLUSION, RAMIFICATIONS, AND SCOPE

Although the description above contains many specificities, these should not be construed as limiting the scope of the invention but as merely providing illustrations of some of the presently-preferred embodiments of this invention. Thus, the scope of the invention should be determined by the appended claims and their legal equivalents, rather than by the examples given.

SUMMARY

In accordance with the present invention, an electromagnetic reactor apparatus, means, and method for exposing bulk volumes of particles, such as free-flowing or semi-flowable grain or powders, so all of the particles receive near-uniform exposure to a radio frequency electric or magnet field, preferably without any preference of exposure to a surface or side of particulate. Electromagnetic reactor electrically isolates antennas and EM energy from earth, to a prescribed area inside or outside of reactor housing and supporting structures. EM reactor electrically isolates one or more RF signal sources, such as a magnet or antenna of an electric or magnetic field in a system that moves a mass of materials in a uniform or near-uniform state for a period of time within process chamber for optimum absorption and minimal EM energy leakage outside of reactor.

In one aspect, the invention relates to an antenna and a process for employing the antenna is provided for transmitting radio frequency (RF) electromagnetic radiation into a mechanical mechanism used to convey, or preferably to mix bulk volumes of particles to heat at least one substance in the particles or to cause a chemical reaction. The antenna is generally located within a transparent shaft, shaft support bars, or vanes that extends into a process chamber.

The antenna(s) is designed to emit EM radiation, at one or more physical locations along its length into a process chamber where heating, a biological reaction, or a chemical reaction is desired. The EM reactor is designed to produce the desired level of electromagnetic fields within the process chamber required of a process. Embodiments of the design include the ability to alter the level of EM radiation to achieve varying levels of process chamber heating in order to control either or both the magnitude of temperature rise and the rate of temperature rise, or to control either or both the magnitude of chemical reaction or rate of reaction. This is intended to address both the operational requirements as well as ensure a capability to not exceed material temperature limit conditions. The use of different materials of construction of the shaft, support bars, and vanes will result in different values of temperature limitation. Materials suitable for operation at temperatures from 90° C. to 1250° C. are required, depending upon the application.

An electromagnet reactor comprising a radio frequency (RF) signal generating circuitry system to provide electromagnetic energy, a support system between earth ground and a housing system, a mechanical movement system that is primarily mounted within the housing system and energized by a power system. A convective type of mechanical movement system for movement of bulk volume of particles in a near-uniform or uniform state inside of housing system, and a power system to rotate mechanical movement system. An incoming gate system regulates bulk volume of particles into EM reactor. An outgoing gate system regulates bulk volume of particles exiting EM reactor. An EM field containment system blocks, cancels, or diverts to earth ground electromagnetic fields within a prescribed area. A sensing system to measure properties at one or more locations and communicate measurement data to computer system. A RF/EM cancellation system that couples an out-of-phase frequency to various locations to cancel radio frequency signals or electromagnetic energy that has traveled beyond chamber, such as housing system, or support system, or openings into housing, such as for an inlet, discharge, or ducting to chamber. An air or gas circulation system aids in controlling temperature of process chamber and its contents by flowing air or process gas into process chamber. A process fluid system provides gas to process chamber to aid in flow of EM energy, or chemical reaction, or to form a plasma. A fluid supply system provides gas for inner fluid chamber. A fluid supply system provides gas to middle fluid chamber. A fluid supply system provides fluid to middle fluid chamber. A fluid supply system provides fluid to outer fluid chamber. A fluid supply system with spray manifold to introduce gas or liquids into process chamber. A computer system communicating with input sensor system, or using a preprogrammed algorithm, or preprogrammed sequence, or combination thereof, generates an output to systems to control reactor. EM Reactor can refer to an apparatus, or a means, or a method.

I claim:

1. An electromagnetic reactor for radiating electromagnetic energy into a moving bulk volume of flowable or semi-flowable particles, comprising:
   a housing apparatus, said housing apparatus having a process chamber for radiating the electromagnetic energy with at least one antenna to at least one substance residing in said bulk volume of flowable or semi-flowable particles;

at least one mechanical apparatus partially located inside said housing apparatus, said mechanical apparatus causing movement of said bulk volume of flowable or semi-flowable particles, said mechanical apparatus comprising at least one shaft having at least one vane extending from said at least one shaft, wherein when said at least one shaft is rotated said vane rotates and moves said bulk volume of flowable or semi-flowable particles, wherein some portion of said at least one shaft or said at least one vane is constructed of a material transparent to the electromagnetic energy to be radiated into said process chamber, said at least one shaft comprising at least one shaft cavity for placement of the at least one antenna;

at least one energy apparatus connected to said at least one antenna to radiate said electromagnetic energy into the process chamber, said energy apparatus comprising the electromagnetic energy connected to said at least one antenna, said at least one energy apparatus comprising a radio frequency (RF) signal generator, multi-frequency synthesizer, RF signal output control, RF wave generator, RF generator having silicon carbide transistors, power amplifier, broadband power amplifier, directional coupler, impedance matching system, power supply, power meter, oscillator, inverter, pulse synthesizer, transformer, low-to-high frequency converter, magnetron, and/or frequency tuning circuitry, said at least one antenna comprising a monopole, dipole, tri-wave, Helmholtz coil, Maxwell coil, Helicon coil, bulb, LED emitter, and/or waveguide; wherein the at least one antenna comprises a metallic material, and/or a plasma material, wherein the plasma material is produced by passing an ionizing current to an ionizable substance, wherein said at least one antenna is located inside said at least one shaft cavity of said at least one shaft, wherein said at least one antenna is connected to a source of the electromagnetic energy, and wherein said electromagnetic energy is radiated from said at least one antenna through the at least one shaft into said bulk volume of flowable or semi-flowable particles in said process chamber;

at least one power apparatus to rotate said at least one shaft and said at least one vane, said at least one power apparatus comprising a motor and at least two bearings, wherein said motor applies mechanical rotation to said at least one shaft to rotate said at least one shaft and the at least one vane to move the bulk volume of flowable or semi-flowable particles; and whereby by radiating an electric or magnetic field from said at least one antenna through a transparent portion of said at least one shaft into said process chamber while rotating said at least one shaft and said at least one vane to move said bulk volume of flowable or semi-flowable particles in said process chamber, said bulk volume of flowable or semi-flowable particles receiving the electromagnetic energy.

2. The electromagnetic reactor of claim 1 further comprising at least one support apparatus located between said housing apparatus and earth, said at least one support apparatus comprising structural supports between said housing apparatus and the earth, wherein said at least one support apparatus, and/or said housing apparatus electrically insulates said at least one antenna from the earth.

3. The electromagnetic reactor of claim 2 wherein said electromagnetic radiation in said process chamber is electrically isolated by said support and/or said housing apparatus.

4. The electromagnetic reactor of claim 1 wherein said at least one shaft has a support bar projecting outward that is between said at least one shaft and attached to said at least one vane to increase effective radius of mechanical movement of said bulk volume of flowable or semi-flowable particles, said support bar having a support bar cavity.

5. The electromagnetic reactor of claim 1 wherein said at least one vane comprises a screw conveyor fighting, cut and folded fighting, ribbon fighting, dual ribbon fighting, and/or paddles.

6. The electromagnetic reactor of claim 1 further comprising air flow equipment.

7. The electromagnetic reactor of claim 1 wherein said housing apparatus further comprises an inlet gate, wherein said inlet gate restricts or allows entry of said bulk volume of flowable or semi-flowable particles into said process chamber.

8. The electromagnetic reactor of claim 1 wherein said housing further comprises a discharge gate, wherein said discharge gate restricts or allows discharge of said bulk volume of flowable or semi-flowable particles out of said process chamber.

9. The electromagnetic reactor of claim 1 wherein said at least one mechanical apparatus to cause movement of said bulk volume of particles is a batch style of mixer.

10. The electromagnetic reactor of claim 1 wherein said at least one mechanical apparatus to cause movement of said bulk volume of particles is a continuous style of mixer.

11. The electromagnetic reactor of claim 1 wherein said housing apparatus further comprises an inside cylindrical shape that is closely spaced with outer periphery of said vane.

12. The electromagnetic reactor of claim 1 wherein said at least one shaft further comprises a slip-ring apparatus, said slip-ring having a rotating side, said rotating side having rotating pins for electromagnetic, alternating current or direct current electrical energy, said slip-ring having a stationary side, said stationary side having stationary pins for the electromagnetic, alternating current-or direct current electrical energy, said rotating side and said rotating pins connect with said stationary side and said stationary pins, whereby by an electromagnetic, alternating, or direct current can transfer from the stationary pins to the rotating pins, or vice versa.

13. The electromagnetic reactor of claim 4 wherein said at least one antenna is located inside of said cavity inside said support bar, said support bar is at least partly constructed of a transparent material to allow electromagnetic radiation to pass through into said process chamber, whereby said at least one antenna rotates in said chamber while radiating the electromagnetic energy into said moving bulk volume of particles.

14. The electromagnetic reactor of claim 12 wherein said at least one antenna is located inside of said cavity inside said at least one vane, said at least one vane is at least partly constructed of a transparent material to allow electromagnetic radiation to pass through into said process chamber, whereby said at least one antenna rotates in said chamber while radiating the electromagnetic energy into said moving bulk volume of particles.

15. The electromagnetic reactor of claim 12 wherein said at least one antenna is located inside of said at least one shaft cavity inside said at least one shaft, said at least one shaft is at least partly constructed of a transparent material to allow electromagnetic radiation to pass through into said process chamber whereby said at least one antenna rotates around lengthwise axis of said at least shaft while radiating electromagnetic energy into said moving bulk volume of flowable or semi-flowable particles.

16. The electromagnetic reactor of claim 1 wherein said at least one antenna further comprises the plasma material.

17. The electromagnetic reactor of claim 1 wherein said electromagnetic energy apparatus further comprises a frequency controller to adjust frequency of the electromagnetic energy between different of the frequencies;

an impedance sensor to sense an impedance of said at least one substance; and a computer programmed to receive impedance data from said impedance sensor, to process the impedance data, and to apply a control signal to the frequency controller to adjust the frequency of the electromagnetic energy to match the sensed impedance to a predetermined impedance.

18. The electromagnetic reactor of claim 1 wherein said mechanical apparatus causing the movement of said bulk volume of flowable or semi-flowable particles comprises a convective style of mixer.

19. An electromagnetic reactor for radiating electromagnetic energy into a bulk volume of flowable or semi-flowable particles in motion within an operating mixer, comprising:

a mixer housing apparatus for containing said electromagnetic energy radiated by at least one antenna, said mixer housing apparatus has an interior cavity that acts as a process chamber for radiating the electromagnetic energy to at least one substance residing in said bulk volume of flowable or semi-flowable particles in motion, said mixer housing apparatus having at least one inlet for said bulk volume of flowable or semi-flowable particles to enter said process chamber and at least one discharge for said bulk volume of particles to exit said process chamber;

at least one support apparatus between said mixer housing apparatus and earth, said at least one support apparatus includes all structural supports between said mixer housing apparatus and the earth;

at least one mixing apparatus located inside said mixer housing apparatus, said at least one mixing apparatus to cause movement of said bulk volume of particles to mix the bulk volume of particles, said at least one mixing apparatus comprising at least one shaft with at least one vane extending from said at least one shaft, when said at least one shaft is rotated said at least one vane rotates and moves said bulk volume of flowable or semi-flowable particles, some portion of said at least one shaft or said at least one vane is constructed of a material transparent to the electromagnetic energy to be radiated into said process chamber, said at least one shaft comprising at least one shaft cavity for the placement of said at least one antenna;

at least one energy apparatus connected to said at least one antenna to radiate said electromagnetic energy into the process chamber, said at least one energy apparatus comprising an electromagnetic source connected to said at least one antenna, said at least one energy apparatus comprising a radio frequency (RF) signal generator, multi-frequency synthesizer, RF signal output control, RF wave generator, RF generator having silicon carbide transistors, power amplifier, broadband power amplifier, directional coupler, impedance matching system, power supply, power meter, oscillator, inverter, pulse synthesizer, transformer, low-to-high frequency converter, and/or frequency tuning circuitry, said at least one antenna comprising a monopole, dipole, tri-wave, Helmholtz coil, Maxwell coil, Helicon coil, bulb, LED emitter, and/or waveguide, wherein the at least one antenna comprises a metallic material, and/or a plasma material, wherein the plasma material is produced by passing an ionizing current to an ionizable substance, wherein said at least one antenna is located inside said at least one shaft cavity of said at least one shaft, said at least one antenna is connected to a source of the electromagnetic energy, said electromagnetic energy is radiated from said at least one antenna through the at least one shaft into said bulk volume of flowable or semi-flowable particles in said process chamber;

at least one power apparatus to rotate said at least one shaft and said at least one vane, said at least one power apparatus comprising an electric motor, a gearbox, and at least two bearings, said at least one power apparatus supported by said mixer housing apparatus or said at least one support apparatus, or combination thereof, wherein said electric motor applies mechanical rotation to said gearbox, and said gearbox transfers mechanical rotation to said at least one shaft; and whereby by radiating an electric or magnetic field from said at least one antenna through said at least one shaft into said process chamber while rotating said at least one shaft and said at least one vane to mix said bulk volume of flowable or semi-flowable particles within said process chamber, said bulk volume of flowable or semi-flowable particles will receive near-uniform of the electromagnetic energy.

20. An electromagnetic reactor for radiating electromagnetic energy into a bulk volume of flowable or semi-flowable particles in motion within an operating screw conveyor, comprising:

a screw conveyor housing apparatus for containing said electromagnetic energy radiated by at least one antenna, said screw conveyor housing apparatus has an interior cavity that acts as a process chamber for radiating the electromagnetic energy to at least one substance residing in said bulk volume of flowable or semi-flowable particles in motion, said screw conveyor housing apparatus having at least one inlet for said bulk volume of flowable or semi-flowable particles to enter said process chamber and at least one discharge for said bulk volume of flowable or semi-flowable particles to exit said process chamber;

at least one support apparatus between said screw conveyor housing apparatus and earth, said at least one support apparatus includes all structural supports between said screw conveyor housing apparatus and the earth;

at least one mechanical screw conveyor apparatus located inside said screw conveyor housing apparatus, said at least one mechanical screw conveyor apparatus to cause movement of said bulk volume of flowable or semi-flowable particles from the at least one inlet to the at least one discharge, said at least one mechanical screw conveyor apparatus comprising at least one shaft with at least one vane extending from said at least one shaft, when said at least one shaft is rotated said at least one vane rotates and moves said bulk volume of flowable or semi-flowable particles, some portion of said at least one shaft or said at least one vane is constructed of a material transparent to the electromagnetic energy to be radiated into said process chamber, said at least one shaft comprising at least one cavity for the placement of said at least one antenna;

at least one energy apparatus connected to said at least one antenna to radiate said electromagnetic energy into the process chamber, said at least one energy apparatus comprising an electromagnetic source connected to said at least one antenna, said at least energy apparatus comprising a radio frequency (RF) signal generator, multi-frequency synthesizer, RF signal output control, RF wave generator, RF generator having silicon carbide transistors, power amplifier, broadband power amplifier, directional coupler, impedance matching system, power supply, power meter, oscillator, an inverter, pulse synthesizer, transformer, low-to-high frequency converter, and/or frequency tuning circuitry, said at least one antenna comprising a monopole, dipole, tri-wave, Helmholtz coil, Maxwell coil, Helicon coil, bulb, LED emitter, and/or waveguide, wherein the at least one antenna comprises a metallic material, and/or a plasma material, wherein the plasma material is produced by passing an ionizing current to an ionizable substance, said at least one antenna is located inside said cavity of said at least one shaft, said at least one antenna is connected to a source of the electromagnetic energy with a circuit, said electromagnetic energy is radiated from said at least one antenna through the at least one shaft into said bulk volume of flowable or semi-flowable particles in said chamber;

at least one power apparatus to rotate said at least one shaft and said at least one vane, said at least one power apparatus comprising an electric motor and at least two bearings, said power apparatus supported by said screw conveyor housing apparatus or said at least one support apparatus, or combination thereof, said electric motor applies mechanical rotation to said at least one shaft; and whereby by radiating an electric or magnetic field from said at least one antenna through said at least one shaft into said process chamber while rotating said at least one shaft and at least one vane to move said bulk volume of flowable or semi-flowable particles from said incoming end to said discharging end of said process chamber, said bulk volume of flowable or semi-flowable particles will receive the electromagnetic energy.

* * * * *